US006553343B1

(12) United States Patent
Kagoshima et al.

(10) Patent No.: US 6,553,343 B1
(45) Date of Patent: Apr. 22, 2003

(54) SPEECH SYNTHESIS METHOD

(75) Inventors: Takehiko Kagoshima, Yokohama (JP); Masami Akamine, Yokosuka (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/984,254

(22) Filed: Oct. 29, 2001

Related U.S. Application Data

(62) Division of application No. 09/722,047, filed on Nov. 27, 2000, now Pat. No. 6,332,121, which is a continuation of application No. 08/758,772, filed on Dec. 3, 1996, now Pat. No. 6,240,384.

(30) Foreign Application Priority Data

| | | |
|---|---|---|
| Dec. 4, 1995 | (JP) | 7-315431 |
| Mar. 12, 1996 | (JP) | 8-054714 |
| Mar. 25, 1996 | (JP) | 8-068785 |
| Mar. 29, 1996 | (JP) | 8-077393 |
| Sep. 20, 1996 | (JP) | 8-250150 |

(51) Int. Cl.$^7$ .......................... G01L 13/02; G01L 19/04
(52) U.S. Cl. ........................................ 704/262; 704/265
(58) Field of Search ................................ 704/207, 208, 704/219, 220, 258, 261, 262, 264, 265, 268

(56) References Cited

U.S. PATENT DOCUMENTS

| | | | | | |
|---|---|---|---|---|---|
| 4,618,982 | A | * | 10/1986 | Horvath et al. | 704/207 |
| 4,797,930 | A | | 1/1989 | Goudie | |
| 4,912,764 | A | * | 3/1990 | Hartwell et al. | 704/261 |
| 4,979,216 | A | | 12/1990 | Malsheen et al. | |
| 5,119,424 | A | * | 6/1992 | Asakawa et al. | 704/208 |
| 5,278,943 | A | | 1/1994 | Gasper et al. | |
| 5,327,521 | A | | 7/1994 | Savic et al. | |
| 5,469,527 | A | | 11/1995 | Drogo De Iacovo et al. | |
| 5,613,056 | A | | 3/1997 | Gasper et al. | |
| 5,617,507 | A | * | 4/1997 | Lee et al. | 704/200 |
| 5,642,466 | A | | 6/1997 | Narayan | |

(List continued on next page.)

FOREIGN PATENT DOCUMENTS

| | | |
|---|---|---|
| JP | 57-179899 | 11/1982 |
| JP | 58-80699 | 5/1983 |
| JP | 58-88798 | 5/1983 |
| JP | 61-20997 | 1/1986 |
| JP | 61-148500 | 7/1986 |
| JP | 1-304499 | 12/1989 |
| JP | 4-125700 | 4/1992 |
| JP | 5-143099 | 6/1993 |
| JP | 6-175675 | 6/1994 |
| JP | 6-250685 | 9/1994 |
| JP | 7-152787 | 6/1995 |
| JP | 7-177031 | 7/1995 |
| JP | 8-129400 | 5/1996 |

*Primary Examiner*—Marsha D. Banks-Harold
*Assistant Examiner*—Martin Lerner
(74) *Attorney, Agent, or Firm*—Oblon, Spivak, McClelland, Maier & Neustadt, P.C.

(57) ABSTRACT

A speech synthesis method subjects a reference speech signal to windowing to extract an aperiodic speech pitch wave from the reference speech signal. A linear prediction coefficient is generated by subjecting the reference speech signal to a linear prediction analysis. The aperiodic speech pitch wave is subjected to inverse-filtering based on the linear prediction coefficient to produce a residual pitch wave. Information regarding the residual pitch wave is stored as information of a speech synthesis unit and a voiced period in the storage. The speech is then synthesized using the information of the speech synthesis unit.

1 Claim, 33 Drawing Sheets

U.S. PATENT DOCUMENTS

| | | | | | |
|---|---|---|---|---|---|
| 5,659,658 | A | | 8/1997 | Vanska | |
| 5,698,807 | A | | 12/1997 | Massie et al. | |
| 5,717,827 | A | | 2/1998 | Narayan | |
| 5,727,125 | A | | 3/1998 | Bergstrom et al. | |
| 5,740,320 | A | | 4/1998 | Itoh | |
| 5,752,228 | A | | 5/1998 | Yumura et al. | |
| 5,787,398 | A | * | 7/1998 | Lowry | 704/268 |
| 5,796,916 | A | | 8/1998 | Meredith | |
| 5,857,170 | A | | 1/1999 | Kondo | |
| 5,884,253 | A | * | 3/1999 | Kleijn | 704/223 |
| 5,970,440 | A | * | 10/1999 | Veldhuis et al. | 704/203 |
| 5,970,453 | A | | 10/1999 | Sharman | |

* cited by examiner

SPEECH SYNTHESIS METHOD

The present application is a divisional of U.S. application Ser. No. 09/722,047, filed Nov. 27, 2000, now U.S. Pat. No. 6,332,121, which in turn is a continuation of U.S. application Ser. No. 08/758,772, filed Dec. 3, 1996, now U.S. Pat. No. 6,240,384, the entire contents of each of which are hereby inorporated herein by reference.

BACKGROUND OF THE INVENTION

1. Field of the Invention

The present invention relates generally to a speech synthesis method for text-to-speech synthesis, and more particularly to a speech synthesis method for generating a speech signal from information such as a phoneme symbol string, a pitch and a phoneme duration.

2. Description of the Related Art

A method of artificially generating a speech signal from a given text is called "text-to-speech synthesis." The text-to-speech synthesis is generally carried out in three stages comprising a speech processor, a phoneme processor and a speech synthesis section. An input text is first subjected to morphological analysis and syntax analysis in the speech processor, and then to processing of accents and intonation in the phoneme processor. Through this processing, information such as a phoneme symbol string, a pitch and a phoneme duration is output. In the final stage, the speech synthesis section synthesizes a speech signal from information such as a phoneme symbol string, a pitch and phoneme duration. Thus, the speech synthesis method for use in the text-to-speech synthesis is required to speech-synthesize a given phoneme symbol string with a given prosody.

According to the operational principle of a speech synthesis apparatus for speech-synthesizing a given phoneme symbol string, basic characteristic parameter units (hereinafter referred to as "synthesis units") such as CV, CVC and VCV (V=vowel; C=consonant) are stored in a storage and selectively read out. The read-out synthesis units are connected, with their pitches and phoneme durations being controlled, whereby a speech synthsis is performed. Accordingly, the stored synthesis units substantially determine the quality of the synthesized speech.

In the prior art, the synthesis units are prepared, based on the skill of persons. In most cases, synthesis units are sifted out from speech signals in a trial-and-error method, which requires a great deal of time and labor. Jpn. Pat. Appln. KOKAI Publication No. 64-78300 ("SPEECH SYNTHESIS METHOD") discloses a technique called "context-oriented clustering (COC)" as an example of a method of automatically and easily preparing synthesis units for use in speech synthesis.

The principle of COC will now be explained. Labels of the names of phonemes and phonetic contexts are attached to a number of speech segments. The speech segments with the labels are classified into a plurality of clusters relating to the phonetic contexts on the basis of the distance between the speech segments. The centroid of each cluster is used as a synthesis unit. The phonetic context refers to a combination of all factors constituting an environment of the speech segment. The factors are, for example, the name of phoneme of a speech segment, a preceding phoneme, a subsequent phoneme, a further subsequent phoneme, a pitch period, power, the presence/absence of stress, the position from an accent nucleus, the time from a breathing spell, the speed of speech, feeling, etc. The phoneme elements of each phoneme in an actual speech vary, depending on the phonetic context. Thus, if the synthesis unit of each of clusters relating to the phonetic context is stored, a natural speech can be synthesized in consideration of the influence of the phonetic context.

As has been described above, in the text-to-speech synthesis, it is necessary to synthesize a speech by altering the pitch and duration of each synthesis unit to predetermined values. Owing to the alternation of the pitch and duration, the quality of the synthesized speech becomes slightly lower than the quality of the speech signal from which the synthesis unit was sifted out.

On the other hand, in the case of the COC, the clustering is performed on the basis of only the distance between speech segments. Thus, the effect of variation in pitch and duration is not considered at all at the time of synthesis. As a result, the COC and the synthesis units of each cluster are not necessarily proper in the level of a synthesized speech obtained by actually altering the pitch and duration.

An object of the present invention is to provide a speech synthesis method capable of efficiently enhancing the quality of a synthesis speech generated by text-to-speech synthesis.

Another object of the invention is to provide a speech synthesis method suitable for obtaining a high-quality synthesis speech in text-to-speech synthesis.

Still another object of the invention is to provide a speech synthesis method capable of obtaining a synthesis speech with a less spectral distortion due to alternation of a basic frequency.

SUMMARY OF THE INVENTION

The present invention provides a speech synthesis method wherein synthesis units, which will have less distortion with respect to a natural speech when they become a synthesis speech, are generated in consideration of influence of alteration of a pitch or a duration, and a speech is synthesized by using the synthesis units, thereby generating a synthesis speech close to a natural speech.

According to a first aspect of the invention, there is provided a speech synthesis method comprising the steps of: generating a plurality of synthesis speech segments by changing at least one of a pitch and a duration of each of a plurality of second speech segments in accordance with at least one of a pitch and a duration of each of a plurality of first speech segments; selecting a plurality of synthesis units from the second speech segments on the basis of a distance between the synthesis speech segments and the first speech segments; and generating a synthesis speech by selecting predetermined synthesis units from the synthesis units and connecting the predetermined synthesis units to one another to generate a synthesis speech.

The first and second speech segments are extracted from a speech signal as speech synthesis units such as CV, VCV and CVC. The speech segments represent extracted waves or parameter strings extracted from the waves by some method. The first speech segments are used for evaluating a distortion of a synthesis speech. The second speech segments are used as candidates of synthesis units. The synthesis speech segments represent synthesis speech waves or parameter strings generated by altering at least the pitch or duration of the second speech segments.

The distortion of the synthesis speech is expressed by the distance between the synthesis speech segments and the first speech segments. Thus, the speech segments, which reduce the distance or distortion, are selected from the second speech segments and stored as synthesis units. Predetermined synthesis units are selected from the synthesis units and are connected to generate a high-quality synthesis speech close to a natural speech.

According to a second aspect of the invention, there is provided a speech synthesis method comprising the steps of: generating a plurality of synthesis speech segments by changing at least one of a pitch and a duration of each of a plurality of second speech segments in accordance with at least one of a pitch and a duration of each of a plurality of first speech segments; selecting a plurality of synthesis speech segments using information regarding a distance between the synthesis speech segments; forming a plurality of synthesis context clusters using the information regarding the distance and the synthesis units; and generating a synthesis speech by selecting those of the synthesis units, which correspond to at least one of the phonetic context clusters which includes phonetic contexts of input phonemes, and connecting the selected synthesis units.

The phonetic contexts are factors constituting environments of speech segments. The phonetic context is a combination of factors, for example, a phoneme name, a preceding phoneme, a subsequent phoneme, a further subsequent phoneme, a pitch period, power, the presence/absence of stress, the position from accent nucleus, the time of breadth, the speed of speech, and feeling. The phonetic context cluster is a mass of phonetic contexts, for example, "phoneme of segment=/ka/; preceding phoneme=/i/ or /u/; and pitch frequency=200 Hz."

According to a third aspect of the invention, there is provided a speech synthesis method comprising the steps of: generating a plurality of synthesis speech segments by changing at least one of a pitch and a duration of each of a plurality of second speech segments and a plurality of second speech segments in accordance with at least one of the pitch and duration of each of a plurality of first speech segments labeled with phonetic contexts; generating a plurality of phonetic context clusters on the basis of a distance between the synthesis speech segments and the first speech segments; selecting a plurality of synthesis units corresponding to the phonetic context clusters from the second speech segments on the basis of the distance; and generating a synthesis speech by selecting those of the synthesis units, which correspond to the phonetic context clusters including phonetic contexts of input phonemes, and connecting the selected synthesis units.

According to the first to third aspects, the synthesis speech segments are generated and then spectrum-shaped. The spectrum-shaping is a process for synthesizing a "modulated" clear speech and is achieved by, e.g. filtering by means of a adaptive post-filter for performing formant emphasis or pitch emphasis.

In this way, the speech synthesized by connecting the synthesis units is spectrum-shaped, and the synthesis speech segments are similarly spectrum-shaped, thereby generating the synthesis units, which will have less distortion with respect to a natural speech when they become a final synthesis speech after spectrum shaping. Thus, a "modulated" clearer synthesis speech is obtained.

In the present invention, speech source signals and information on combinations of coefficients of a synthesis filter for receiving the speech source signals and generating a synthesis speech signal may be stored as synthesis units. In this case, if the speech source signals and the coefficients of the synthesis filter are quantized and the quantized speech source signals and information on combinations of the coefficients of the synthesis filter are stored, the number of speech source signals and coefficients of the synthesis filter, which are stored as synthesis units, can be reduced. Accordingly, the calculation time needed for learning synthesis units is reduced and the memory capacity needed for actual speech synthesis is decreased.

Moreover, at least one of the number of the speech source signals stored as the synthesis units and the number of the coefficients of the synthesis filter stored as the synthesis units can be made less than the total number of speech synthesis units or the total number of phonetic context clusters. Thereby, a high-quality synthesis speech can be obtained.

According to a fourth aspect of the invention, there is provided a speech synthesis method comprising the steps of: prestoring information on a plurality of speech synthesis units including at least speech spectrum parameters; selecting predetermined information from the stored information on the speech synthesis units; generating a synthesis speech signal by connecting the selected predetermined information; and emphasizing a formant of the synthesis speech signal by a formant emphasis filter whose filtering coefficient is determined in accordance with the spectrum parameters of the selected information.

According to a fifth aspect of the invention, there is provided a speech synthesis method comprising the steps of: generating linear prediction coefficients by subjecting a reference speech signal to a linear prediction analysis; producing a residual pitch wave from a typical speech pitch wave extracted from the reference speech signal, using the linear prediction coefficients; storing information regarding the residual pitch wave as information of a speech synthesis unit in a voiced period; and synthesizing a speech, using the information of the speech synthesis unit.

According to a sixth aspect of the invention, there is provided a speech synthesis method comprising the steps of: storing information on a residual pitch wave generated from a reference speech signal and a spectrum parameter extracted from the reference speech signal; driving a vocal tract filter having the spectrum parameter as a filtering coefficient, by a voiced speech source signal generated by using the information on the residual pitch wave in a voiced period, and by an unvoiced speech source signal in an unvoiced period, thereby generating a synthesis speech; and generating the residual pitch wave from a typical speech pitch wave extracted from the reference speech signal, by using a linear prediction coefficient obtained by subjecting the reference speech signal to linear prediction analysis.

A speech synthesis apparatus shown in FIG. 1, according to a first embodiment of the present invention, mainly comprises a synthesis unit training section 1 and a speech synthesis section 2. It is the speech synthesis section 2 that actually operates in text-to-speech synthesis. The speech synthesis is also called "speech synthesis by rule." The synthesis unit training section 1 performs learning in advance and generates synthesis units.

More specifically, the residual pitch wave can be generated by filtering the speech pitch wave through a linear prediction inverse filter whose characteristics are determined by a linear prediction coefficient.

In this context, the typical speech pitch wave refers to a non-periodic wave extracted from a reference speech signal so as to reflect spectrum envelope information of a quasi-periodic speech signal wave. The spectrum parameter refers to a parameter representing a spectrum or a spectrum envelope of a reference speech signal. Specifically, the spectrum parameter is an LPC coefficient, an LSP coefficient, a PARCOR coefficient, or a kepstrum coefficient.

If the residual pitch wave is generated by using the linear prediction coefficient from the typical speech pitch wave extracted from the reference speech signal, the spectrum of the residual pitch wave is complementary to the spectrum of the linear prediction coefficient in the vicinity of the formant frequency of the spectrum of the linear prediction coefficient. As a result, the spectrum of the voiced speech source signal generated by using the information on the residual pitch wave is emphasized near the formant frequency.

Accordingly, even if the spectrum of a voiced speech source signal departs from the peak of the spectrum of the linear prediction coefficient due to change of the fundamental frequency of the synthesis speech signal with respect to the reference speech signal, a spectrum distortion is reduced, which will make the amplitude of the synthesis speech signal extremely smaller than that of the reference speech signal at the formant frequency. In other words, a synthesis speech with a less spectrum distortion due to change of fundamental frequency can be obtained.

In particular, if pitch synchronous linear prediction analysis synchronized with the pitch of the reference speech signal is adopted as linear prediction analysis for reference speech signal, the spectrum width of the spectrum envelope of the linear prediction coefficient becomes relatively large at the formant frequency. Accordingly, even if the spectrum of a voiced speech source signal departs from the peak of the spectrum of the linear prediction coefficient due to change of the fundamental frequency of the synthesis speech signal with respect to the reference speech signal, a spectrum distortion is similarly reduced, which will make the amplitude of the synthesis speech signal extremely smaller than that of the reference speech signal at the formant frequency.

Furthermore, in the present invention, a code obtained by compression-encoding a residual pitch wave may be stored as information on the residual pitch wave, and the code may be decoded for speech synthesis. Thereby, the memory capacity needed for storing information on the residual pitch wave can be reduced, and a great deal of residual pitch wave information can be stored with a limited memory capacity. For example, inter-frame prediction encoding can be adopted as compression-encoding.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
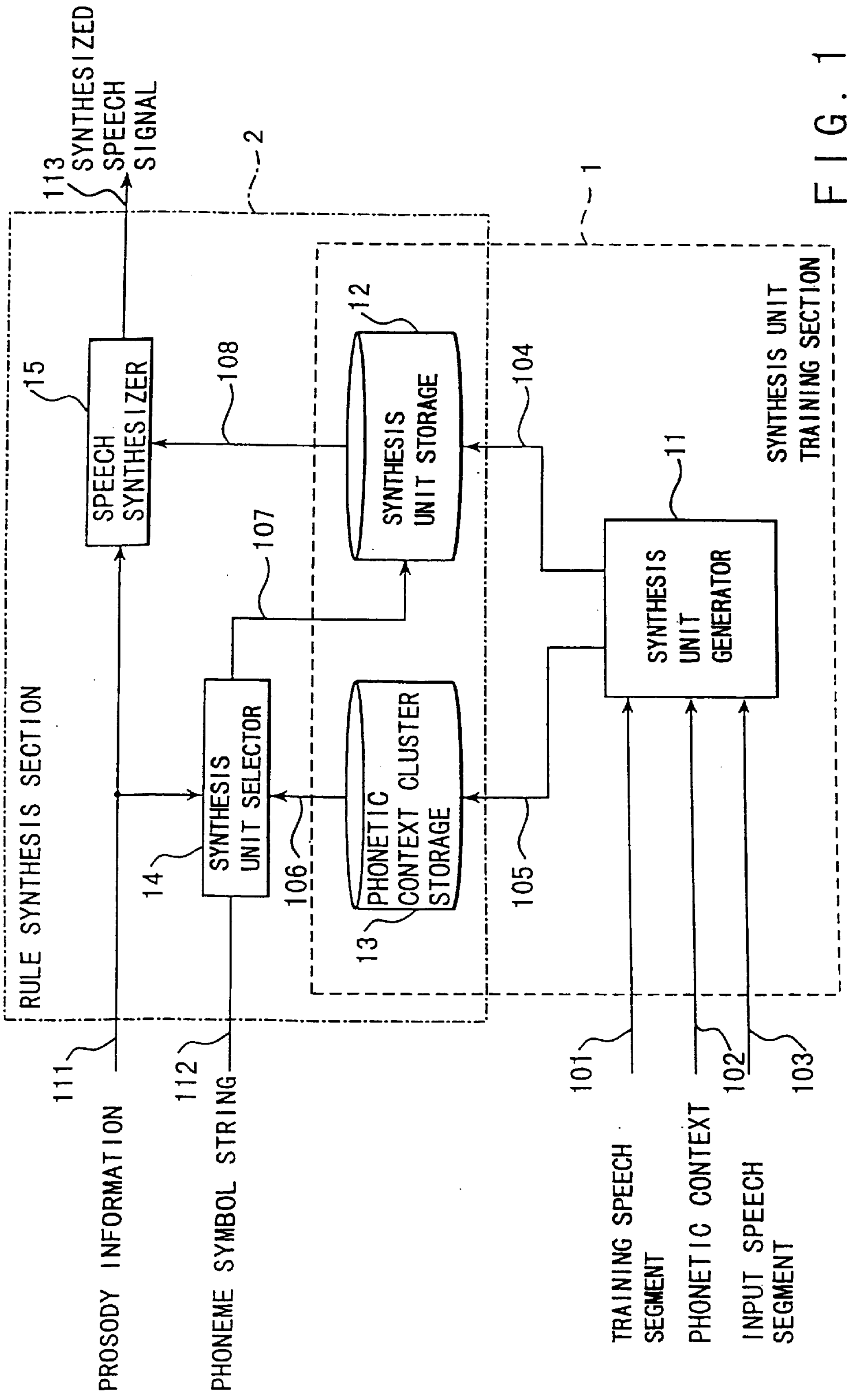
FIG. 1 is a block diagram showing the structure of a speech synthesis apparatus according to a first embodiment of the present invention.

A speech synthesis apparatus shown in FIG. 1, according to a first embodiment of the present invention, mainly comprises a synthesis unit training section and a speech synthesis section 2. It is the speech synthesis section 2 that actually operates in text-to-speech synthesis. The speech synthesis is also called "speech synthesis by rule." The synthesis unit training section 1 performs learning in advance and generates synthesis units.

The synthesis unit training section 1 will first be described.

The synthesis unit training section 1 comprises a synthesis unit generator 11 for generating a synthesis unit and a phonetic context cluster accompanying the synthesis unit; a synthesis unit storage 12; and a storage 13. A first speech segment or a training speech segment 101, a phonetic context 102 labeled on the training speech segment 101, and a second speech segment or an input speech segment 103.

The synthesis unit generator 11 internally generates a plurality of synthesis speech segments of altering the pitch period and duration of the input speech segment 103, in accordance with the information on the pitch period and duration contained in the phonetic context 102 labeled on the training speech segment 101. Furthermore, the synthesis unit generator 11 generates a synthesis unit 104 and a phonetic context cluster 105 in accordance with the distance between the synthesis speech segment and the training speech segment 101. The phonetic context cluster 105 is generated by classifying training speech segments 101 into clusters relating to phonetic context, as will be described later.

The synthesis unit 104 is stored in the synthesis unit storage 12, and the phonetic context cluster 105 is associated with the synthesis unit 104 and stored in the storage 13. The processing in the synthesis unit generator 11 will be described later in detail.

The speech synthesis section 2 will now be described.

The speech synthesis section 2 comprises the synthesis unit storage 12, the storage 13, a synthesis unit selector 14 and a speech synthesizer 15. The synthesis unit storage 12 and storage 13 are shared by the synthesis unit training section 1 and speech synthesis section 2.

The synthesis unit selector 14 receives, as input phoneme information, prosody information 111 and phoneme symbol string 112, which are obtained, for example, by subjecting an input text to morphological analysis and syntax analysis and then to accent and intonation processing for text-to-speech synthesis. The prosody information 111 includes a pitch pattern and a phoneme duration. The synthesis unit selector 14 internally generates a phonetic context of the input phoneme from the prosody information 111 and phoneme. symbol string 112.

The synthesis unit selector 14 refers to phonetic context cluster 106 read out from the storage 13, and searches for the phonetic context cluster to which the phonetic context of the input phoneme belongs. Typical speech segment selection information 107 corresponding to the searched-out phonetic context cluster is output to the synthesis unit storage 12.

On the basis of the phoneme information 111, the speech synthesizer 15 alters the pitch periods and phoneme durations of the synthesis units 108 read out selectively from the synthesis unit storage 12 in accordance with the synthesis unit selection information 107, and connects the synthesis units 108 thereby outputting a synthesized speech signal 113. Publicly known methods such as a residual excitation LSP method and a waveform editing method can be adopted as methods for altering the pitch periods and phoneme durations, connecting the resultant speech segments and synthesizing a speech.

Figure 2:
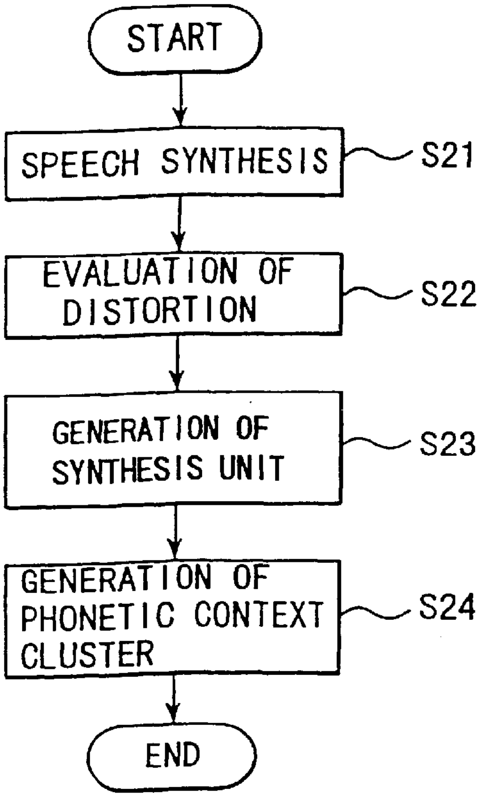
FIG. 2 is a flow chart illustrating a first processing procedure in a synthesis unit generator shown in FIG. 1.

The processing procedure of the synthesis unit generator 11 characterizing the present invention will now be described specifically. The flow chart of FIG. 2 illustrates a first processing procedure of the synthesis unit generator 11.

In a preparatory stage of the synthesis unit generating process according to the first processing procedure, each phoneme of many speech data pronounced successively is labeled, and training speech segments $T_i$(i=1, 2, 3, . . . , $N_T$) are extracted in synthesis units of CV, VCV, CVC, etc. In addition, phonetic contexts $P_i$ (i=1, 2, 3, . . . , $N_T$) associated with the training speech segments $T_i$ are extracted. Note that $N_T$ denotes the number of training speech segments. The phonetic context $P_i$ includes at least information on the phoneme, pitch and duration of the training speech segment $T_i$ and, where necessary, other information such as preceding and subsequent phonemes.

A number of input speech segments $S_i$ (j=1, 2, 3, . . . , Ns) are prepared by a method similar to the aforementioned method of preparing the training speech segments $T_i$. Note that Ns denotes the number of input speech segments. The same speech segments as training speech segments $T_i$ may be used as input speech segments $S_j$ (i.e., $T_i$=$S_j$), or speech segments different from the training speech segments $T_i$ may be prepared. In any case, it is desirable that as many as possible training speech segments and input speech segments having copious phonetic contexts be prepared.

Following the preparatory stage, a speech synthesis step S21 is initiated. The pitch and duration of the input speech segment $S_j$ are altered to be equal to those included in the phonetic context $P_i$, thereby synthesizing training speech segments $T_i$ and input speech segments $S_j$. Thus, synthesis speech segments $G_{ij}$ are generated. In this case, the pitch and duration are altered by the same method as is adopted in the speech synthesizer 15 for altering the pitch and duration. A speech synthesis is performed by using the input speech segments $Sj_j$ (j=1, 2, 3, . . . , $N_s$) in accordance with all phonetic contexts $P_i$ (i=1, 2, 3, . . . , $N_T$). Thereby, $N_t$x$N_S$ synthesis speech segments $G_{ij}$ (i=1, 2, 3, . . . , $N_T$, j=1, 2, 3, . . . . , $N_S$) are generated.

For example, when synthesis speech segments of Japanese kana-character "Ka" are generated, $Ka_1$, $Ka_2$, $Ka_3$, . . . $Ka_j$ are prepared as input speech segments $S_j$ and $Ka_1'$, $Ka_2'$, $Ka_3'$, . . . $Ka_j'$ are prepared as training speech segments $T_i$, as shown in the table below. These input speech segments and training speech segments are synthesized to generate synthesis speech segments $G_{ij}$. The input speech segments and training speech segments are prepared so as to have different phonetic contexts, i.e. different pitches and durations. These input speech segments and training speech segments are synthesized to generate a great number of synthesis speech segments $G_{ij}$, i.e. synthesis speech segments $Ka_{11}$, $Ka_{12}$, $Ka_{13}$, $Ka_{14}$, . . . , $Ka_{1i}$.

| | $Ka_1'$ $Ka_2'$ $Ka_3'$ $Ka_4'$ . . . $Ka_i'$ |
|---|---|
| $Ka_1$ | $Ka_{11}$ $Ka_{12}$ $Ka_{13}$ $Ka_{14}$ . . . $Ka_{1i}$ |
| $Ka_2$ | $Ka_{21}$ $Ka_{22}$ $Ka_{23}$ $Ka_{24}$ . . . $Ka_{2i}$ |
| $Ka_3$ | $Ka_{31}$ $Ka_{32}$ $Ka_{33}$ $Ka_{34}$ . . . $Ka_{3i}$ |
| $Ka_4$ | $Ka_{41}$ $Ka_{42}$ $Ka_{43}$ $Ka_{44}$ . . . $Ka_{4i}$ |
| | " |
| | " |
| $Ka_j$ | $Ka_{i1}$ $Ka_{j2}$ $Ka_{j3}$ $Ka_{j4}$ . . . $Ka_{j1}$ |

In the subsequent distortion evaluation step S22, a distortion $e_{ij}$ of synthesis speech segment $G_{ij}$ is evaluated. The evaluation of distortion $e_{ij}$ is performed by finding the distance between the synthesis speech segment $G_{ij}$ and training speech segment $T_i$. This distance may be a kind of spectral distance. For example, power spectra of the synthesis speech segment $G_{ij}$ and training speech segment $T_i$ are found by means of fast Fourier transform, and a distance between both power spectra is evaluated. Alternatively, LPC or LSP parameters are found by performing linear prediction analysis, and a distance between the parameters is evaluated. Furthermore, the distortion $e_{ij}$ may be evaluated by using transform coefficients of, e.g. short-time Fourier transform or wavelet transform, or by normalizing the powers of the respective segments. The following table shows the result of the evaluation of distortion:

| | $Ka_1'$ $Ka_2'$ $Ka_3'$ $Ka_4'$ . . . $Ka_i'$ |
|---|---|
| $Ka_1$ | $e_{11}$ $e_{12}$ $e_{13}$ $e_{14}$ . . . $e_{1i}$ |
| $Ka_2$ | $e_{21}$ $e_{22}$ $e_{23}$ $e_{24}$ . . . $e_{2i}$ |
| $Ka_3$ | $e_{31}$ $e_{32}$ $e_{33}$ $e_{34}$ . . . $e_{3i}$ |
| $Ka_4$ | $e_{41}$ $e_{42}$ $e_{43}$ $e_{44}$ . . . $e_{4i}$ |
| | " |
| | " |
| $Ka_j$ | $e_{i1}$ $e_{j2}$ $e_{j3}$ $e_{j4}$ . . . $e_{j1}$ |

In the subsequent synthesis unit generation step S23, a synthesis unit $D_k$ (k=1, 2, 3, . . . , N) is selected from synthesis units of number N designated from among the input speech segments $S_j$, on the basis of the distortion $e_{ij}$ obtained in step S22.

An example of the synthesis unit selection method will now be described. An evaluation function $E_{D1}(U)$ representing the sum of distortion for the set U={$u_k$|$u_k$=$S_j$ (k=1, 2, 3, . . . , N)} of N-number of speech segments selected from among the input speech segments $S_j$ is given by $$E_{D1}(U) = \sum_{i=1}^{N_T} \min(e_{ij1}, e_{ij2}, e_{ij3}, \cdots, e_{ijN} \tag{1}$$

where min ($e_{ij1}$, $e_{ij2}$, $e_{ij3}$, . . . , $e_{ijN}$) is a function representing the minimum value among ($e_{ij1}$, $e_{ij2}$, $e_{ij3}$, . . . , $e_{ijN}$). The number of combinations of the set U is given by Ns!/{N!($N_s$−N)!}. The set U, which minimizes the evaluation function $E_{D1}(U)$, is found from the speech segment sets U, and the elements $u_k$ thereof are used as synthesis units $D_k$.

Finally, in the phonetic context cluster generation step S24, clusters relating to phonetic contexts (phonetic context clusters) $C_k$ (k=1, 2, 3, . . . , N) are generated from the phonetic contexts $P_i$, distortion $e_{ij}$ and synthesis unit $D_k$. The phonetic context cluster $C_k$ is obtained by finding a cluster which minimizes the evaluation function $E_{c1}$ of clustering, expressed by, e.g. the following equation (2):

$$E_{el} = \sum_{k=1}^{N} \sum_{Pi \in C_k} e_{ijk} \tag{2}$$

The synthesis units $D_k$ and phonetic context clusters $C_k$ generated in steps S23 and S24 are stored in the synthesis unit storage 12 and storage 13 shown in FIG. 1, respectively.

Figure 3:
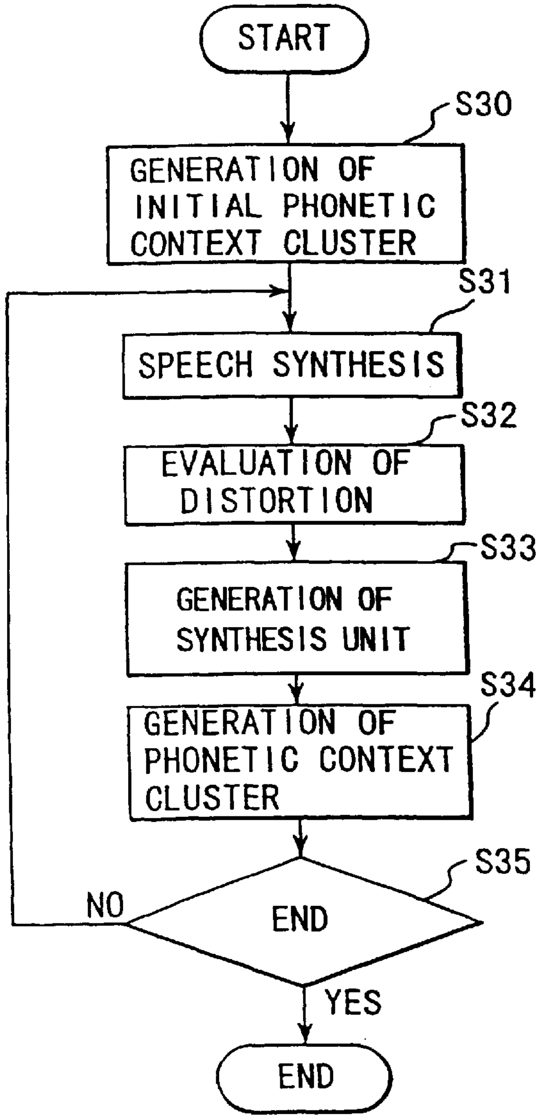
FIG. 3 is a flow chart illustrating a second processing procedure in the synthesis unit generator shown in FIG. 1.

The flow chart of FIG. 3 illustrates a second processing procedure of the synthesis unit generator 11.

In this synthesis unit generation process according to the second processing procedure, phonetic contexts are clustered on the basis of some empirically obtained knowledge in step S30 for initial phonetic context cluster generation. Thus, initial phonetic context clusters are generated. The phonetic contexts can be clustered, for example, by means of phoneme clustering.

Speech synthesis (synthesis speech segment generation) step S31, distortion evaluation step S32, synthesis unit generation step S33 and phonetic context cluster generation step S34, which are similar to the steps S21, S22, S23 and S24 in FIG. 2, are successively carried out by using only the speech segments among the input speech segments $S_j$ and training speech segments $T_i$, which have the common phonemes. The same processing operations are repeated for all initial phonetic context clusters. Thereby, synthesis units and the associated phonetic context clusters are generated. The generated synthesis units and phonetic context clusters are stored in the synthesis unit storage 12 and storage 13 shown in FIG. 1, respectively.

If the number of synthesis units in each initial phonetic context cluster is one, the initial phonetic context cluster becomes the phonetic context cluster of the synthesis unit. Consequently, the phonetic context cluster generation step S34 is not required, and the initial phonetic context cluster may be stored in the storage 13.

Figure 4:
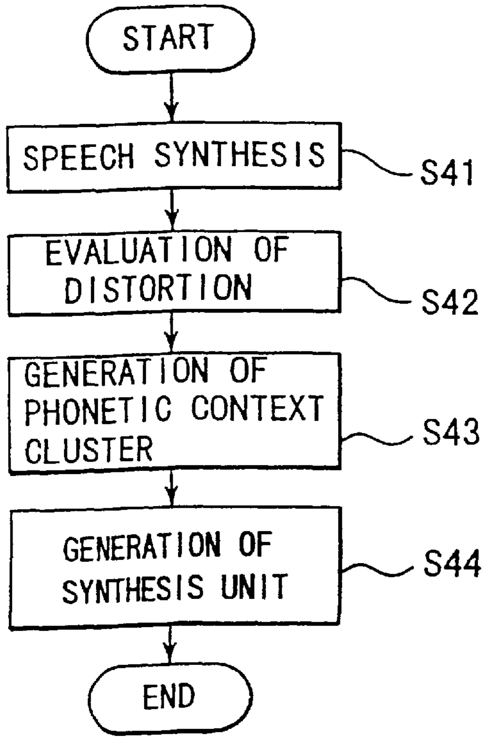
FIG. 4 is a flow chart illustrating a third processing procedure in the synthesis unit generator shown in FIG. 1.

The flow chart of FIG. 4 illustrates a third processing procedure of the synthesis unit generator 11.

In this synthesis unit generation process according to the third processing procedure, a speech synthesis step S41 and a distortion evaluation step S42 are successively carried out, as in the first processing procedure illustrated in FIG. 2. Then, in the subsequent phonetic context cluster generation step S43, clusters $C_k$ (k=1, 2, 3, . . . , N) relating to phonetic contexts are generated from the phonetic contexts $P_i$ and distortion $e_{ij}$. The phonetic context cluster $C_k$ is obtained by finding a cluster which minimizes the evaluation function $E_{c2}$ of clustering, expressed by, e.g. the following equations (3) and (4):

$$E_{c2} = \sum_{k=1}^{N} \min\{f(k, 1), f(k, 2), f(k, 3), \cdots, f(k, N)\} \quad (3)$$

$$f(k, j) = \sum_{Pi \in C_k} e_{ij} \quad (4)$$

In the subsequent synthesis unit generation step S44, the synthesis unit $D_k$ corresponding to each of the phonetic context clusters $C_k$ is selected from the input speech segment $S_j$ on the basis of the distortion $e_{ij}$. The synthesis unit $D_k$ is obtained by finding, from the input speech segments $S_j$, the speech segment which minimizes the distortion evaluation function $E_{D2}(j)$ expressed by, e.g. equation (5):

$$E_{D2}(j) = \sum_{Pi \in C_k} e_{ij} \quad (5)$$

It is possible to modify the synthesis unit generation process according to the third processing procedure. For example, like the second processing procedure, on the basis of empirically obtained knowledge, the synthesis unit and the phonetic context cluster may be generated for each pre-generated initial phonetic context cluster.

In other words, according to the above embodiment, when one speech segment is to be selected, a speech segment which minimizes the sum of distortions $e_{ij}$ is selected. When a plurality of speech segments are to be selected, some speech segments which, when combined, have a minimum total sum of distortions $e_{ij}$ are selected. Furthermore, in consideration of the speech segments preceding and following a speech segment, a speech segment to be selected may be determined.

A second embodiment of the present invention will now be described with reference to FIGS. 5 to 9.

Figure 5:
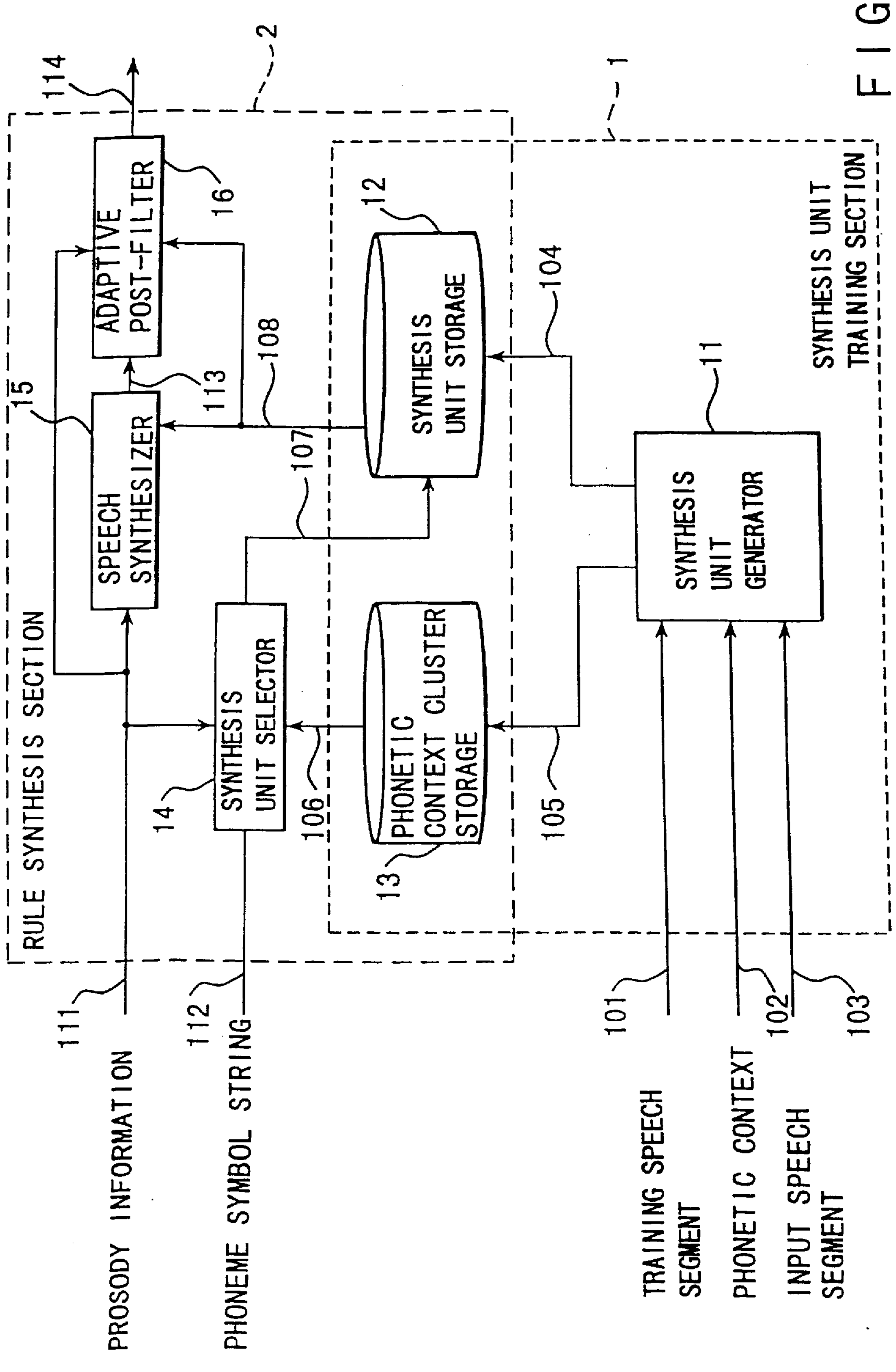
FIG. 5 is a block diagram showing the structure of a speech synthesis apparatus according to a second embodiment of the present invention.

In FIG. 5 showing the second embodiment, the structural elements common to those shown in FIG. 1 are denoted by like reference numerals. The difference between the first and second embodiments will be described principally. The second embodiment differs from the first embodiment in that an adaptive post-filter 16 is added in rear of the speech synthesizer 15. In addition, the method of generating a plurality of synthesis speech segments in the synthesis unit generator 11 differs from the methods of the first embodiment.

Like the first embodiment, in the synthesis unit generator 11, a plurality of synthesis speech segments are internally generated by altering the pitch period and duration of the input speech segment 103 in accordance with the information on the pitch period and duration contained in the phonetic context 102 labeled on the training speech segment 101. Then, the synthesis speech segments are filtered through an adaptive post-filter and subjected to spectrum shaping. In accordance with the distance between each spectral-shaped synthesis speech segment output from the adaptive post-filter and the training speech segment 101, the synthesis unit 104 and context cluster 105 are generated. Like the preceding embodiment, the phonetic context clusters 105 are generated by classifying the training speech segments 101 into clusters relating to phonetic contexts.

The adaptive post-filter provided in the synthesis unit generator 11, which performs filtering and spectrum shaping of the synthesis speech segments 103 generated by altering the pitch periods and durations of input speech segments 103 in accordance with the information on the pitch periods and durations contained in the phonetic contexts 102, may have the same structure as the adaptive post-filter 16 provided in a subsequent stage of the speech synthesizer 15.

Like the first embodiment, on the basis of the phoneme information 111, the speech synthesizer 15 alters the pitch periods and phoneme durations of the synthesis units 108 read out selectively from the synthesis unit storage 12 in accordance with the synthesis unit selection information 107, and connects the synthesis units 108, thereby outputting the synthesized speech signal 113. In this embodiment, the synthesized speech signal 113 is input to the adaptive post-filter 16 and subjected therein to spectrum shaping for enhancing sound quality. Thus, a finally synthesized speech signal 114 is output.

Figure 6:
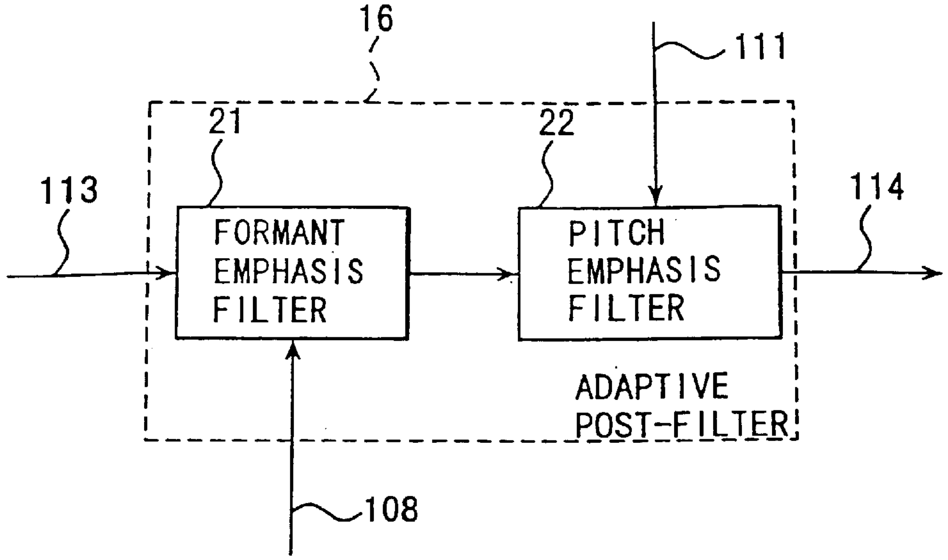
FIG. 6 is a block diagram showing an example of the structure of an adaptive post-filter in FIG. 5.

FIG. 6 shows an example of the structure of the adaptive post-filter 16. The adaptive post-filter 16 comprises a formant emphasis filter 21 and a pitch emphasis filter 22 which are cascade-connected.

The formant emphasis filter 21 filters the synthesized speech signal 113 input from the speech synthesizer 15 in accordance with a filtering coefficient determined on the basis of an LPC coefficient obtained by LPC-analyzing the synthesis unit 108 read out selectively from the synthesis unit storage 12 in accordance with the synthesis unit selection information 107. Thereby, the formant emphasis filter 21 emphasizes a formant of a spectrum. On the other hand, the pitch emphasis filter 22 filters the output from the formant emphasis filter 21 in accordance with a parameter determined on the basis of the pitch period contained in the prosody information 111, thereby emphasizing the pitch of the speech signal. The order of arrangement of the formant emphasis filter 21 and pitch emphasis filter 22 may be reversed.

The spectrum of the synthesized speech signal is shaped by the adaptive post-filter, and thus a synthesized speech signal 114 capable of reproducing a "modulated" clear speech can be obtained. The structure of the adaptive post-filter 16 is not limited to that shown in FIG. 6. Various conventional structures used in the field of speech coding and speech synthesis can be adopted.

As has been described above, in this embodiment, the adaptive post-filter 16 is provided in the subsequent stage of the speech synthesizer 15 in speech synthesis section 2. Taking this into account, the synthesis unit generator 11 in synthesis unit training section 1, too, filters by means of the adaptive post-filter the synthesis speech segments generated by altering the pitch periods and durations of input speech segments 103 in accordance with the information on the pitch period and durations contained in the phonetic contexts 102. Accordingly, the synthesis unit generator 11 can generate synthesis units with such a low-level distortion of natural speech, as with the finally synthesized speech signal 114 output from the adaptive post-filter 16. Therefore, a synthesized speech much closer to the natural speech can be generated.

Processing procedures of the synthesis unit generator 11 shown in FIG. 5 will now be described in detail.

Figure 7:
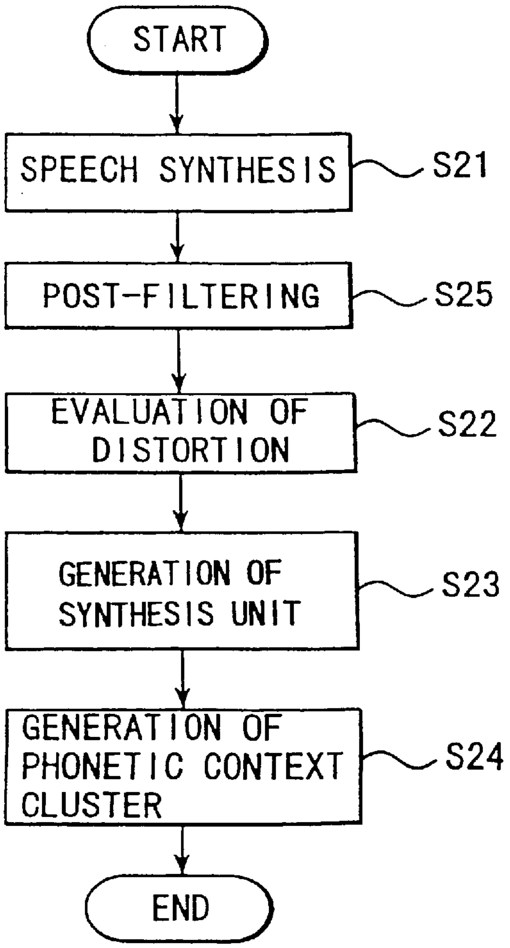
FIG. 7 is a flow chart illustrating a first processing procedure in a synthesis unit generator shown in FIG. 5.
Figure 8:
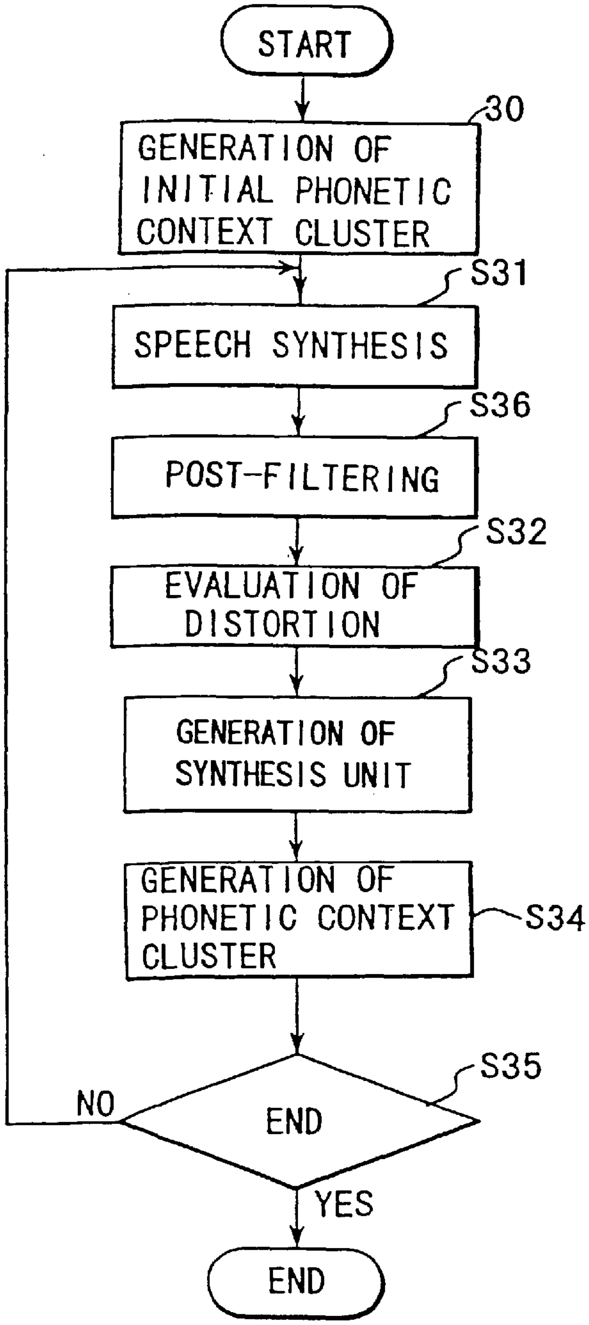
FIG. 8 is a flow chart illustrating a second processing procedure in the synthesis unit generator shown in FIG. 5.
Figure 9:
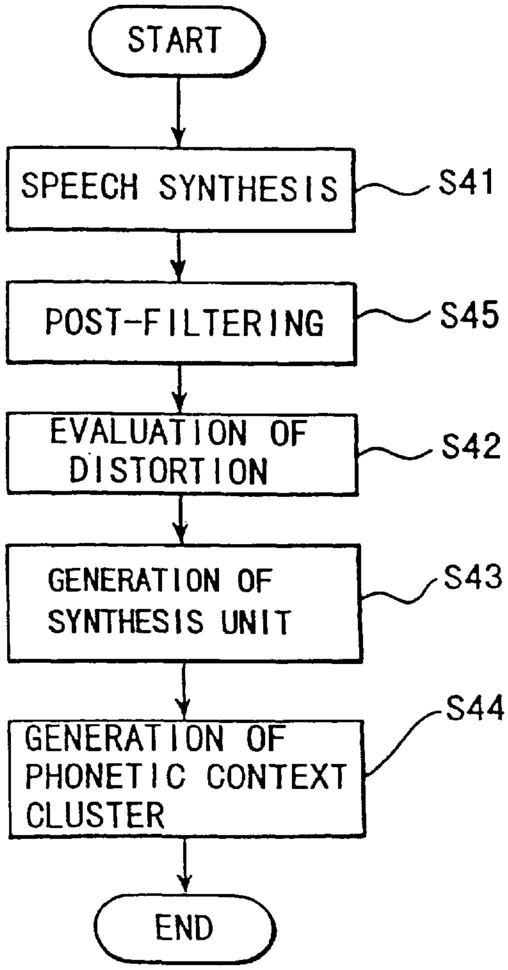
FIG. 9 is a flow chart illustrating a third processing procedure in the synthesis unit generator shown in FIG. 5.

The flow charts of FIGS. 7, 8 and 9 illustrate first to third processing procedures of the synthesis unit generator 11 shown in FIG. 5. In FIGS. 7, 8 and 9, post-filtering steps S25, S36 and S45 are added after the speech synthesis steps S21, S31 and S41 in the above-described processing procedures illustrated in FIGS. 2, 3 and 4.

In the post-filtering steps S25, S36 and S45, the above-described filtering by means of the adaptive post-filter is performed. Specifically, the synthesis speech segments $G_{ij}$ generated in the speech synthesis steps S21, S31 and S41 are filtered in accordance with a filtering coefficient determined on the basis of an LPC coefficient obtained by LPC-analyzing the input speech segment $S_i$. Thereby, the formant of the spectrum is emphasized. The formant-emphasized synthesis speech segments are further filtered for pitch emphasis in accordance with the parameter determined on the basis of the pitch period of the training speech segment $T_i$.

In this manner, the spectrum shaping is carried out in the post-filtering steps S25, S36 and S45. In the post-filtering steps S25, S36 and S45, the learning of synthesis units is made possible on the presupposition that the post-filtering for enhancing sound quality is carried out by spectrum-shaping the synthesized speech signal 113, as described above, by means of the adaptive post-filter 16 provided in the subsequent stage of the speech synthesizer 15 in the speech synthesis section 2. The post-filtering in steps S25, S36 and S45 is combined with the processing by the adaptive post-filter 16, thereby finally generating the "modulated" clear synthesized speech signal 114.

Figure 11:
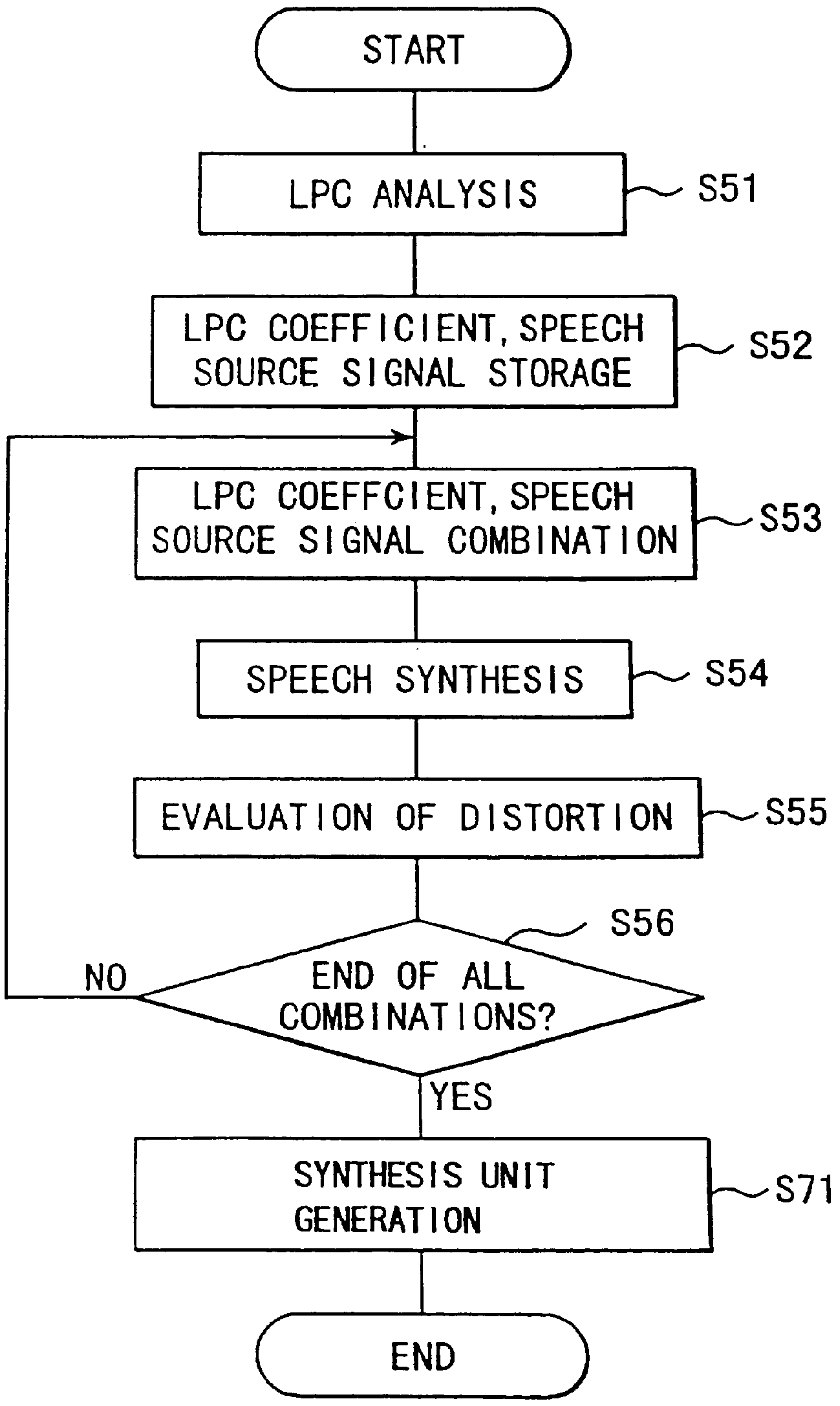
FIG. 11 is a flow chart illustrating a processing procedure of the synthesis unit training section in FIG. 10.
Figure 12:
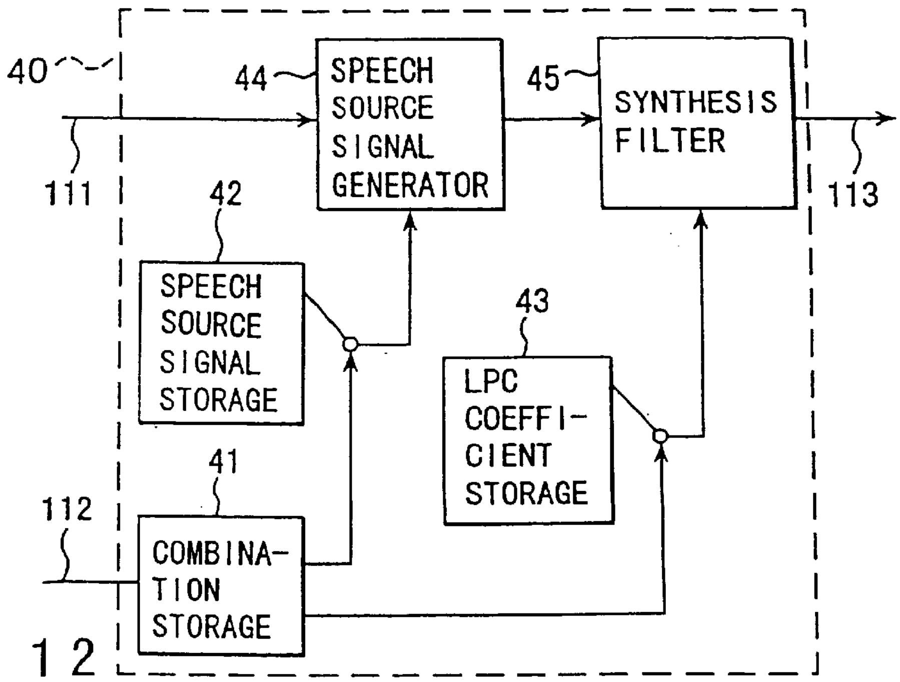
FIG. 12 is a block diagram showing the structure of a speech synthesis section in a speech synthesis apparatus according to a third embodiment of the invention.

A third embodiment of the present invention will now be described with reference to FIGS. 10 to 12.

Figure 10:
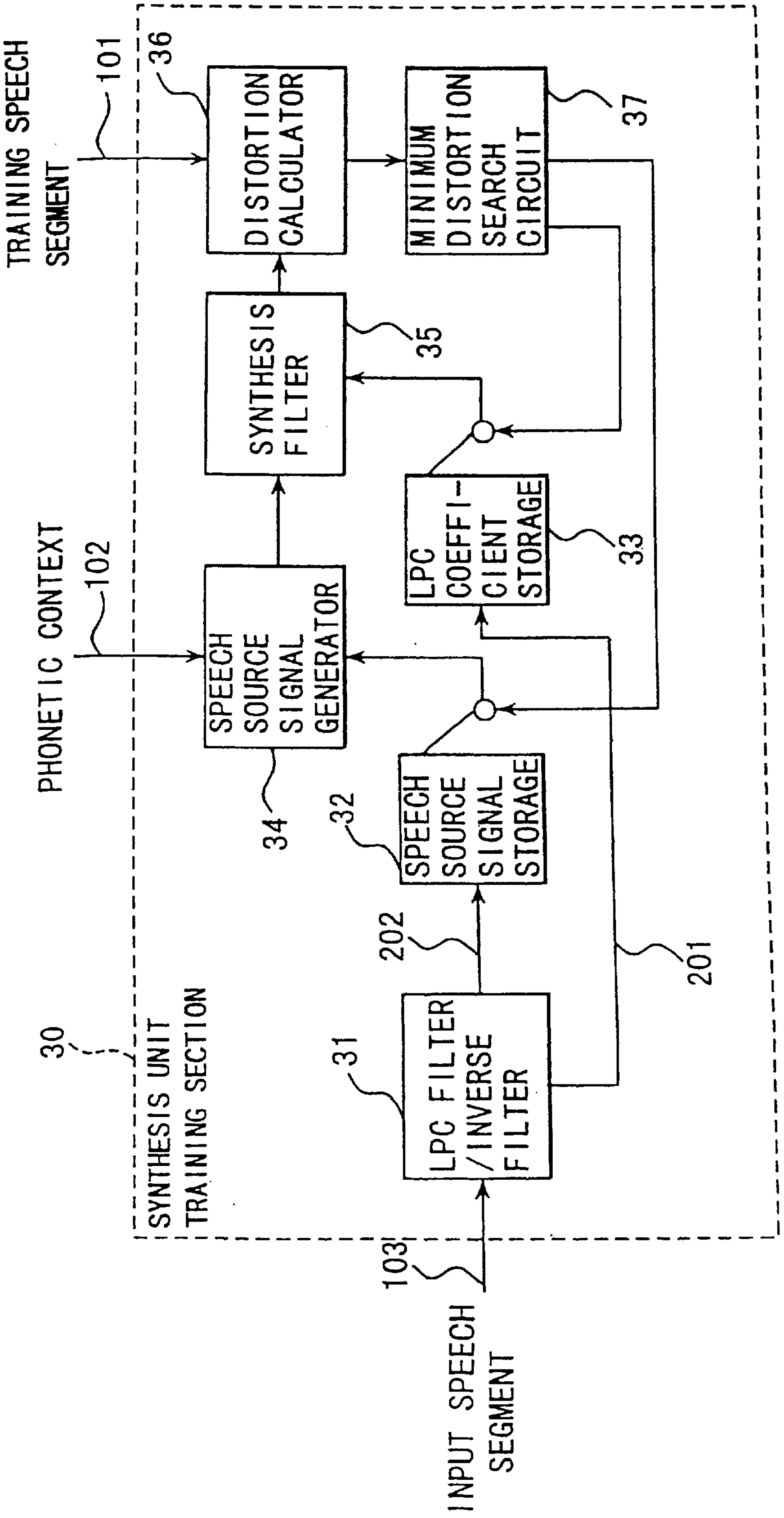
FIG. 10 is a block diagram showing the structure of a synthesis unit training section in a speech synthesis apparatus according to a third embodiment of the invention.

FIG. 10 is a block diagram showing the structure of a synthesis unit training section in a speech synthesis apparatus according to a third embodiment of the present invention.

The synthesis unit training section 30 of this embodiment comprises an LPC filter/inverse filter 31, a speech source signal storage 32, an LPC coefficient storage 33, a speech source signal generator 34, a synthesis filter 35, a distortion calculator 36 and a minimum distortion search circuit 37. The training speech segment 101, phonetic context 102 labeled on the training speech segment 101, and input speech segment 103 are input to the synthesis unit training section 30. The input speech segments 103 are input to the LPC filter/inverse filter 31 and subjected to LPC analysis. The LPC filter/inverse filter 31 outputs LPC coefficients 201 and prediction residual signals 202. The LPC coefficients 201 are stored in the LPC coefficient storage 33, and the prediction residual signals 202 are stored in the speech source signal storage 32.

The prediction residual signals stored in the speech source signal storage 32 are read out one by one in accordance with the instruction from the minimum distortion search circuit 37. The pitch pattern and phoneme duration of the prediction residual signal are altered in the speech source signal generator 34 in accordance with the information on the pitch pattern and phoneme duration contained in the phonetic context 102 of training speech segment 101. Thereby, a speech source signal is generated. The generated speech source signal is input to the synthesis filter 35, the filtering coefficient of which is the LPC coefficient read out from the LPC coefficient storage 33 in accordance with the instruction from the minimum distortion search circuit 37. The synthesis filter 35 outputs a synthesis speech segment.

The distortion calculator 36 calculates an error or a distortion of the synthesis speech segment with respect to the training speech segment 101. The distortion is evaluated in the minimum distortion search circuit 37. The minimum distortion search circuit 37 instructs the output of all combinations of LPC coefficients and prediction residual signals stored respectively in the LPC coefficient storage 33 and speech source signal storage 32. The synthesis filter 35 generates synthesis speech segments in association with the combinations. The minimum distortion search circuit 37 finds a combination of the LPC coefficient and prediction residual signal, which provides a minimum distortion, and stores this combination.

The operation of the synthesis unit training section 30 will now be described with reference to the flow chart of FIG. 11.

In the preparatory stage, each phoneme of many speech data pronounced successively is labeled, and training speech segments $T_i$(i=1, 2, 3, . . . , $N_T$) are extracted in synthesis units of CV, VCV, CVC, etc. In addition, phonetic contexts $P_i$ (i=1, 2, 3, . . . , $N_T$) associated with the training speech segments $T_i$ are extracted. Note that $N_T$ denotes the number of training speech segments. The phonetic context includes at least information on the phoneme, pitch pattern and duration of the training speech segment and, where necessary, other information such as preceding and subsequent phonemes.

A number of input speech segments Si=1, 2, 3, . . . , Ns) are prepared by a method similar to the aforementioned method of preparing the training speech segments. Note that Ns denotes the number of input speech segments $S_i$. In this case, the synthesis unit of the input speech segment $S_i$ coincides with that of the training speech segment $T_i$. For example, when a synthesis unit of a CV syllable "ka" is prepared, the input speech segment $S_i$ and training speech segment $T_i$ are set from among syllables "ka" extracted from many speech data. The same speech segments as training speech segments may be used as input speech segments $S_j$ (i.e. $T_i$=$S_i$), or speech segments different from the training speech segments may be prepared. In any case, it is desirable that as many as possible training speech segments and input speech segments having copious phonetic contexts be prepared.

Following the preparatory stage, the input speech segments $S_i$ (i=1, 2, 3, . . . , Ns) are subjected to LPC analysis in an LPC analysis step S51, and the LPC coefficient $a_i$ (i=1, 2, 3, . . . , Ns) is obtained. In addition, inverse filtering based on the LPC coefficient is performed to find the prediction residual signal $e_i$ (i=1, 2, 3, . . . , Ns). In this case, "a" is a spectrum having a p-number of elements (p=the degree of LPC analysis).

In step S52, the obtained prediction residual signals are stored as speech source signals, and also the LPC coefficients are stored.

In step S53 for combining the LPC coefficient and speech source signal, one combination ($a_i$, $e_j$) of the stored LPC coefficient and speech source signal is prepared.

In speech synthesis step S54, the pitch and duration of $e_j$ are altered to be equal to the pitch pattern and duration of $P_k$. Thus, a speech source signal is generated. Then, filtering calculation is performed in the synthesis filter having LPC coefficient $a_i$, thus generating a synthesis speech segment $G_k$ (i,j).

In this way, speech synthesis is performed in accordance with all $P_k$ (k=1, 2, 3, . . . , $N_T$), thus generating an $N_T$ number of synthesis speech segments $G_k$ (i,j), (k=1, 2, 3, . . . , $N_T$).

In the subsequent distortion evaluation step S55, the sum E of a distortion $E_k$ (i,j) between the synthesis speech segment $G_k$ (i,j) and training speech segment $T_k$ and a distortion relating to $P_k$ is obtained by equations (6) and (7):

$$E_k(i,j)=D(Tk,\ G_k(i,j)) \tag{6}$$

$$E_k(i,\ j) = \sum_{k=1}^{N_T} E_k(i,\ j) \tag{7}$$

In equation (6), D is a distortion function, and some kind of spectrum distance may be used as D. For example, power spectra are found by means of FFTs and a distance therebetween is evaluated. Alternatively, LPC or LSP parameters are found by performing linear prediction analysis, and a distance between the parameters is evaluated. Furthermore, the distortion may be evaluated by using transform coefficients of, e.g. short-time Fourier transform or wavelet transform, or by normalizing the powers of the respective segments.

Steps S53 to S55 are carried out for all combinations ($a_i$, $e_j$) (i, j=1, 2, 3, . . . , Ns) of LPC coefficients and speech source signals. In distortion evaluation step S55, the combination of i and j for providing a minimum value of E (i,j) is searched.

In the subsequent step S57 for synthesis unit generation, the combination of i and j for providing a minimum value of E (i,j), or the associated ($a_i$, $e_j$) or the waveform generated from ($a_i$, $e_j$) is stored as synthesis unit. In this synthesis unit generation step, one combination of synthesis units is generated for each synthesis unit. An N-number of combinations can be generated in the following manner.

A set of An N-number of combinations selected from Ns*Ns combinations of ($a_i$, $e_i$) is given by equation (8) and the evaluation function expressing the sum of distortion is defined by equation (9):

$$U=\{(a_1,\ e_j)^m,\ m=1,\ 2,\ .\ .\ .\ ,\ N\} \tag{8}$$

$$ED(U) = \sum_{k=1}^{N_T} \min(E_k(i,\ j)^m,\ E_k(i,\ j)^2,\ \cdots\ ,\ E_k(i,\ j)^N) \tag{9}$$

where min ( ) is a function indicating a minimum value. The number of combinations of the set U is $Ns{*}NsC_N$. The set U minimizing the evaluation function ED(U) is searched from the sets U, and the element $(a_i, e_j)^k$ is used as synthesis unit.

A speech synthesis section 40 of this embodiment will now be described with reference to FIG. 12.

The speech synthesis section 40 of this embodiment comprises a combination storage 41, a speech source signal storage 42, an LPC coefficient storage 43, a speech source signal generator 44 and a synthesis filter 45. The prosody information 111, which is obtained by the language processing of an input text and the subsequent phoneme processing, and the phoneme symbol string 112 are input to the speech synthesis section 40. The combination information (i,j) of LPC coefficient and speech source signal, the speech source signal $e_j$, and the LPC coefficient $a_i$, which have been obtained by the synthesis unit, are stored in advance in the combination storage 41, speech source signal storage 42 and LPC coefficient storage 43, respectively.

The combination storage 41 receives the phoneme symbol string 112 and outputs the combination information of the LPC coefficient and speech source signal which provides a synthesis unit (e.g. CV syllable) associated with the phoneme symbol string 112. The speech source signals stored in the speech source signal storage 42 are read out in accordance with the instruction from the combination storage 41. The pitch periods and durations of the speech source signals are altered on the basis of the information on the pitch patterns and phoneme durations contained in the prosody information 111 input to the speech source signal generator 44, and the speech source signals are connected.

The generated speech source signals are input to the synthesis filter 45 having the filtering coefficient read out from the LPC coefficient storage 43 in accordance with the instruction from the combination storage 41. In the synthesis filter 45, the interpolation of the filtering coefficient and the filtering arithmetic operation are performed, and a synthesized speech signal 113 is prepared.

A fourth embodiment of the present invention will now be described with reference to FIGS. 13 and 14.

Figure 13:
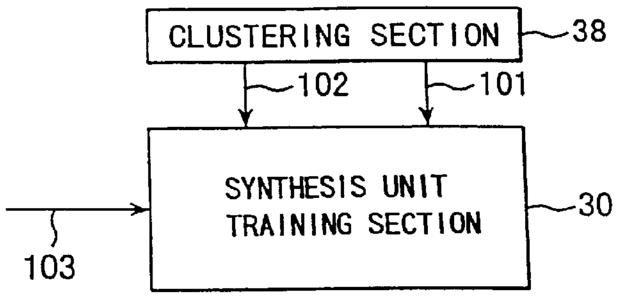
FIG. 13 is a block diagram showing the structure of a synthesis unit training section in a speech synthesis apparatus according to a fourth embodiment of the invention.

FIG. 13 schematically shows the structure of the synthesis unit training section of the fourth embodiment. A clustering section 38 is added to the synthesis unit training section 30 according to the third embodiment shown in FIG. 10. In this embodiment, unlike the third embodiment, the phonetic context is clustered in advance in the clustering section 38 on the basis of some empirically acquired knowledge, and the synthesis unit of each cluster is generated. For example, the clustering is performed on the basis of the pitch of the segment. In this case, the training speech segment 101 is clustered on the basis of the pitch, and the synthesis unit of the training speech segment of each cluster is generated, as described in connection with the third embodiment.

Figure 14:
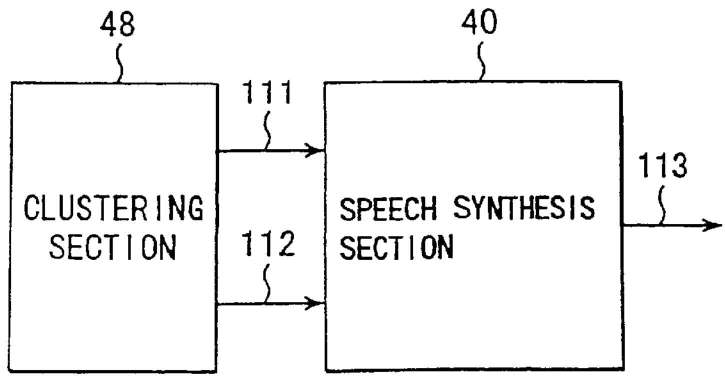
FIG. 14 is a block diagram showing the structure of a speech synthesis section in a speech synthesis apparatus according to the fourth embodiment of the invention.

FIG. 14 schematically shows the structure of a speech synthesis section according to the present embodiment. A clustering section 48 is added to the speech synthesis section 40 according to the third embodiment as shown in FIG. 12. The prosody information 111, like the training speech segment, is subjected to pitch clustering, and a speech is synthesized by using the speech source signal and LPC coefficient corresponding to the synthesis unit of each cluster obtained by the synthesis unit training section 30.

A fifth embodiment of the present invention will now be described with reference to FIGS. 15 to 17.

Figure 15:
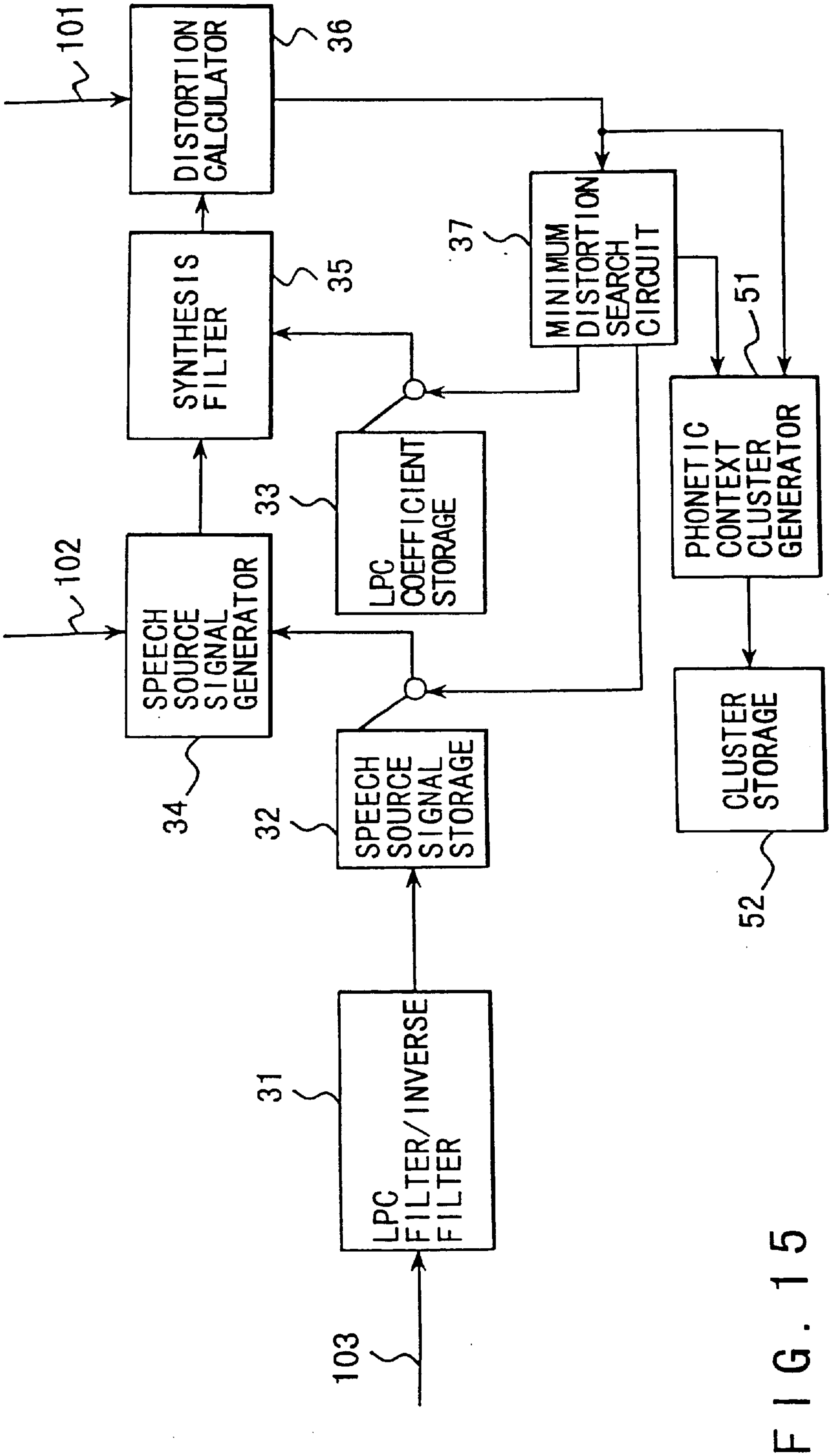
FIG. 15 is a block diagram showing the structure of a synthesis unit training section in a speech synthesis apparatus according to a fifth embodiment of the invention.
Figure 16:
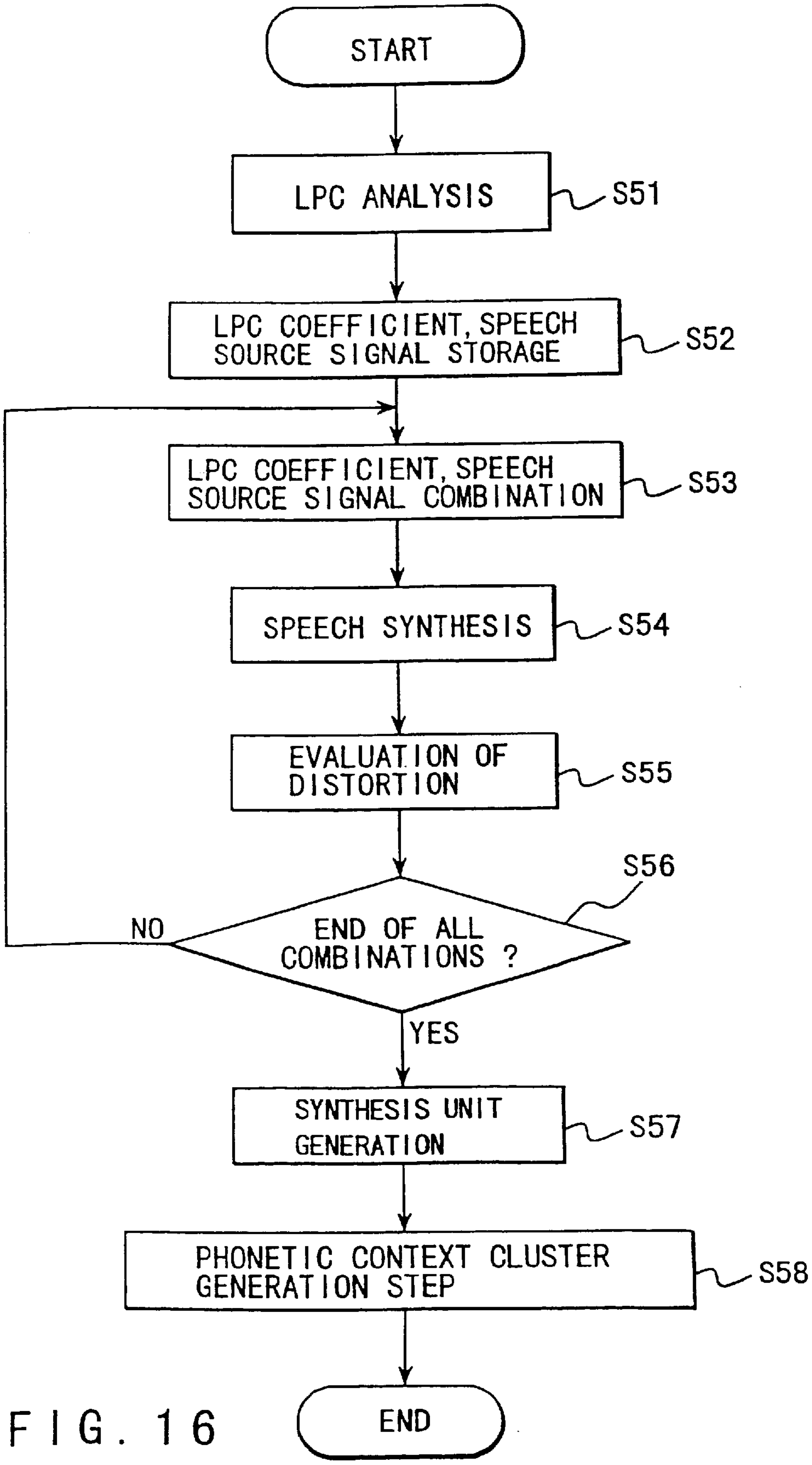
FIG. 16 is a flow chart illustrating a first processing procedure of the synthesis unit training section shown in FIG. 15.

FIG. 15 is a block diagram showing a synthesis unit training section according to the fifth embodiment, wherein clusters are automatically generated on the basis of the degree of distortion with respect to the training speech segment. In the fifth embodiment, a phonetic context cluster generator 51 and a cluster storage 52 are added to the synthesis unit training section 30 shown in FIG. 10.

A first processing procedure of the synthesis unit training section of the fifth embodiment will now be described with reference to the flow chart of FIG. 16. A phonetic context cluster generation step S58 is added to the processing procedure of the third embodiment illustrated in FIG. 11. In step S58, clusters $C_m$ (m=1, 2, 3, . . . , N) relating to the phonetic context is generated on the basis of the phonetic context $P_k$, distortion $E_k$ (i,j) and synthesis unit Dm. The phonetic context cluster $C_m$ is obtained, for example, by searching the cluster which minimizes the evaluation function $E_{cm}$ of clustering given by equation (10):

$$E_{cm} = \sum_{m=1}^{N} \sum_{P_k \in C_m} E_k(i, j) \tag{10}$$

Figure 17:
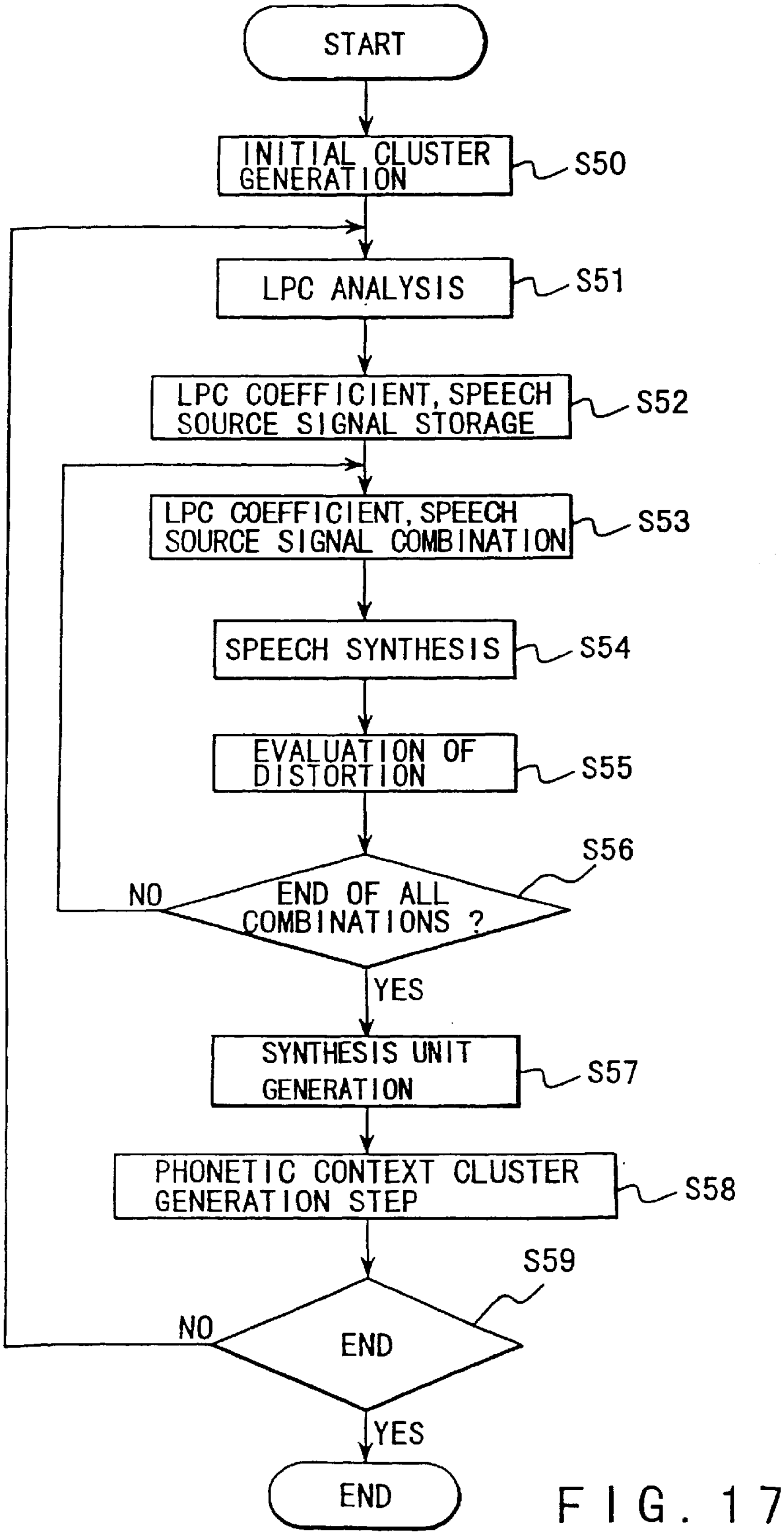
FIG. 17 is a flow chart illustrating a second processing procedure of the synthesis unit training section shown in FIG. 15.

FIG. 17 is a flow chart illustrating a second processing procedure of the synthesis unit training section shown in FIG. 15. In an initial phonetic context cluster generation step S50, the phonetic contexts are clustered in advance on the basis of some empirically acquired knowledge, and initial phonetic context clusters are generated. This clustering is performed, for example, on the basis of the phoneme of the speech segment. In this case, only speech segments or training speech segments having equal phonemes are used to generate the synthesis units and phonetic contexts as described in the third embodiment. The same processing is repeated for all initial phonetic context clusters, thereby generating all synthesis units and the associated phonetic context clusters.

If the number of synthesis units in each initial phonetic context cluster is one, the initial phonetic context cluster becomes the phonetic context cluster of the synthesis unit. Consequently, the phonetic context cluster generation step S58 is not required, and the initial phonetic context cluster may be stored in the cluster storage 52 shown in FIG. 15.

In this embodiment, the speech synthesis section is the same as the speech synthesis section 40 according to the fourth embodiment as shown in FIG. 14. In this case, the clustering section 48 performs processing on the basis of the information stored in the cluster storage 52 shown in FIG. 15.

Figure 18:
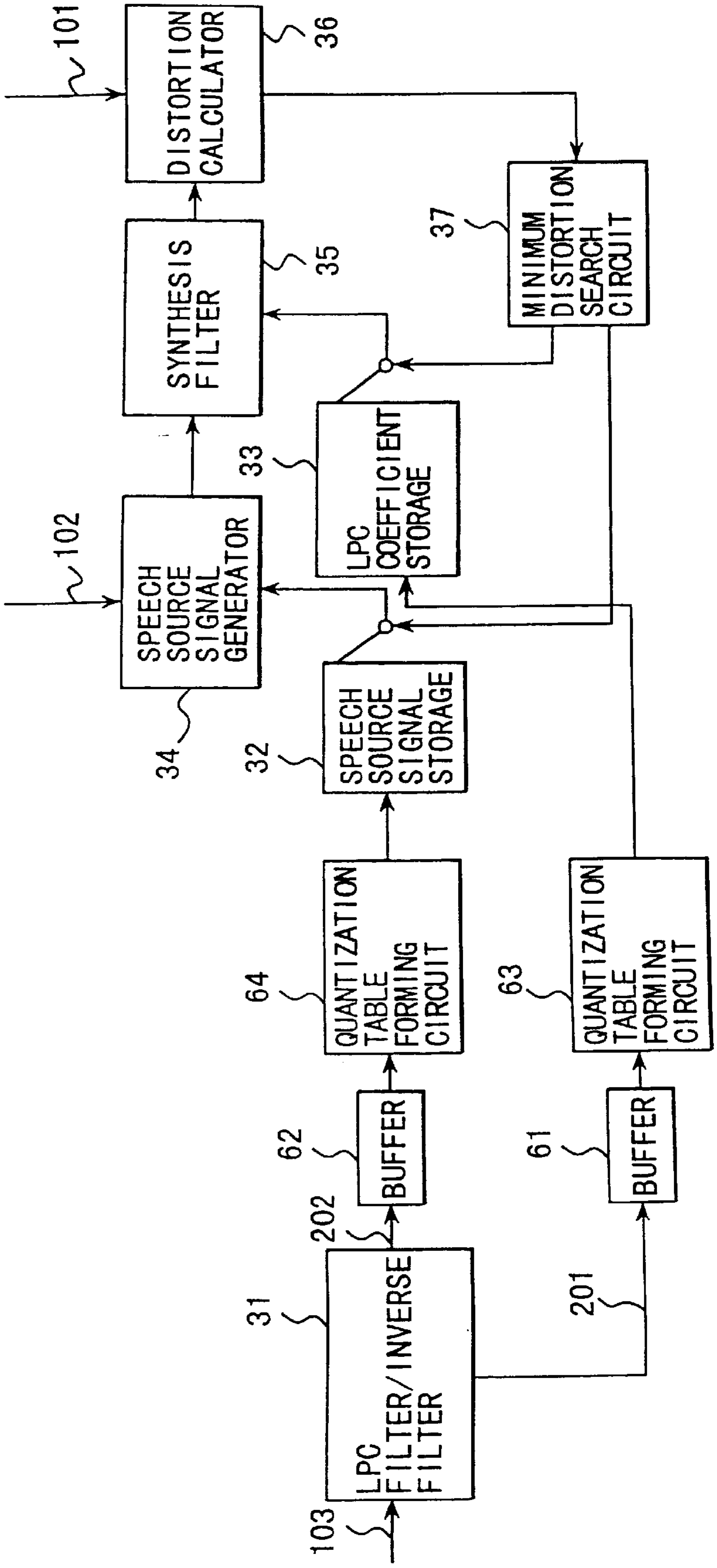
FIG. 18 is a block diagram showing the structure of a synthesis unit training section in a speech synthesis apparatus according to a sixth embodiment of the invention.

FIG. 18 shows the structure of a synthesis unit training section according to a sixth embodiment of the present invention. In this embodiment, buffers 61 and 62 and quantization table forming circuits 63 and 64 are added to the synthesis unit learning circuit 30 shown in FIG. 10.

In this embodiment, the input speech segment 103 is input to the LPC filter/inverse filter 31. The LPC coefficient 201 and prediction residual signal 202 generated by LPC analysis are temporarily stored in the buffers 61 and 62 and then quantized in the quantization table forming circuits 63 and 64. The quantized LPC coefficient and prediction residual signal are stored in the LPC coefficient storage 33 and speech source signal storage 34.

Figure 19:
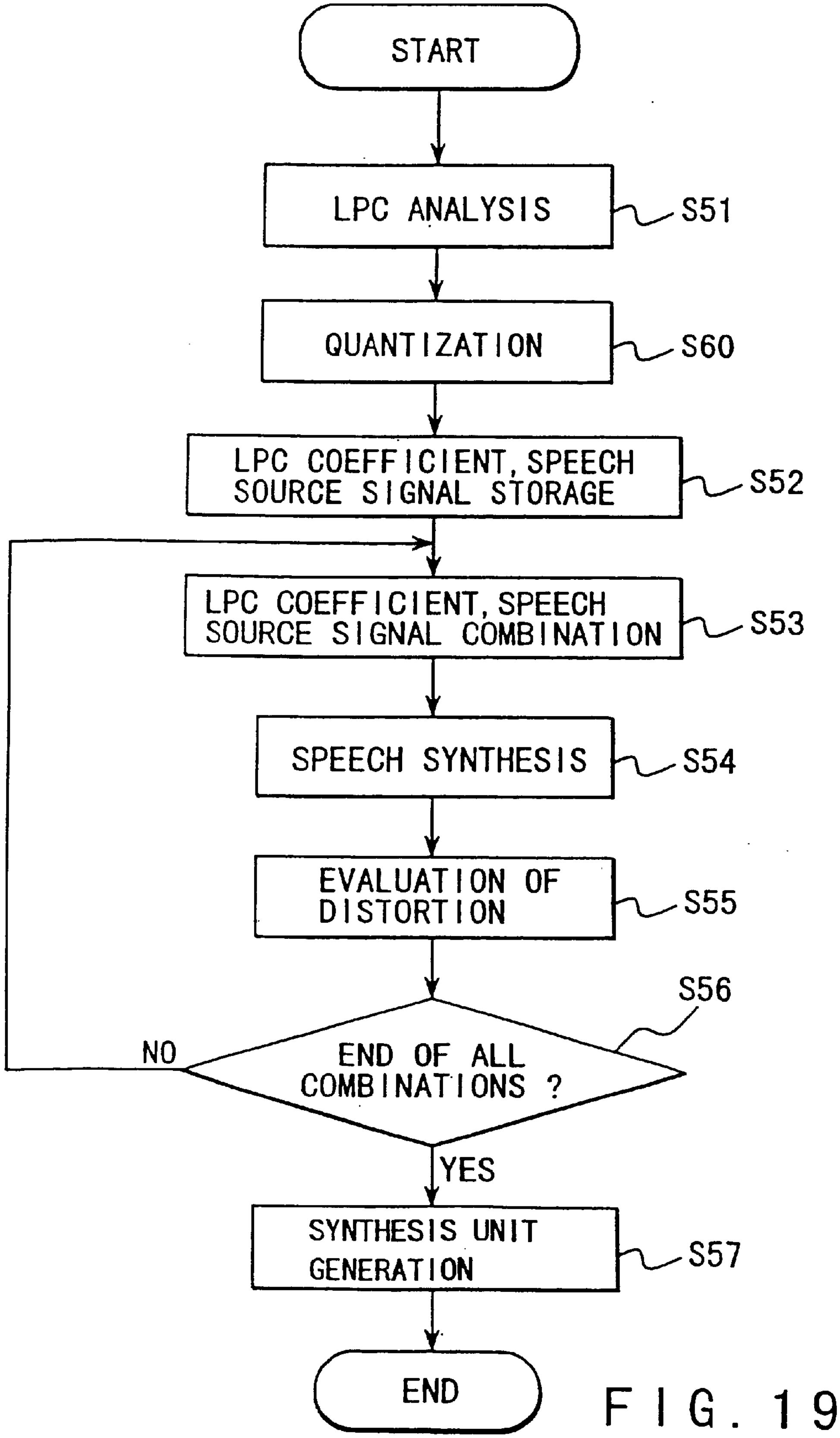
FIG. 19 is a flow chart illustrating a processing procedure of the synthesis unit training section shown in FIG. 18.

FIG. 19 is a flow chart illustrating the processing procedure of the synthesis unit training section shown in FIG. 18. This processing procedure differs from the processing procedure illustrated in FIG. 11 in that a quantization step S60 is added after the LPC analysis step S51. In the quantization step S60, the LPC coefficient $a_i$ (i=1, 2, 3, . . . , Ns) and prediction residual signal $e_i$ (i=1, 2, 3, . . . , Ns) obtained in the LPC analysis step S51 are temporarily stored in the buffers, and then quantization tables are formed by using conventional techniques of LBG algorithms, etc. Thus, the LPC coefficient and prediction residual signal are quantized. In this case, the size of the quantization table, i.e. the number of typical spectra for quantization is less than Ns. The quantized LPC coefficient and prediction residual signal are stored in the next step S52. The subsequent processing is the same as in the processing procedure of FIG. 11.

Figure 20:
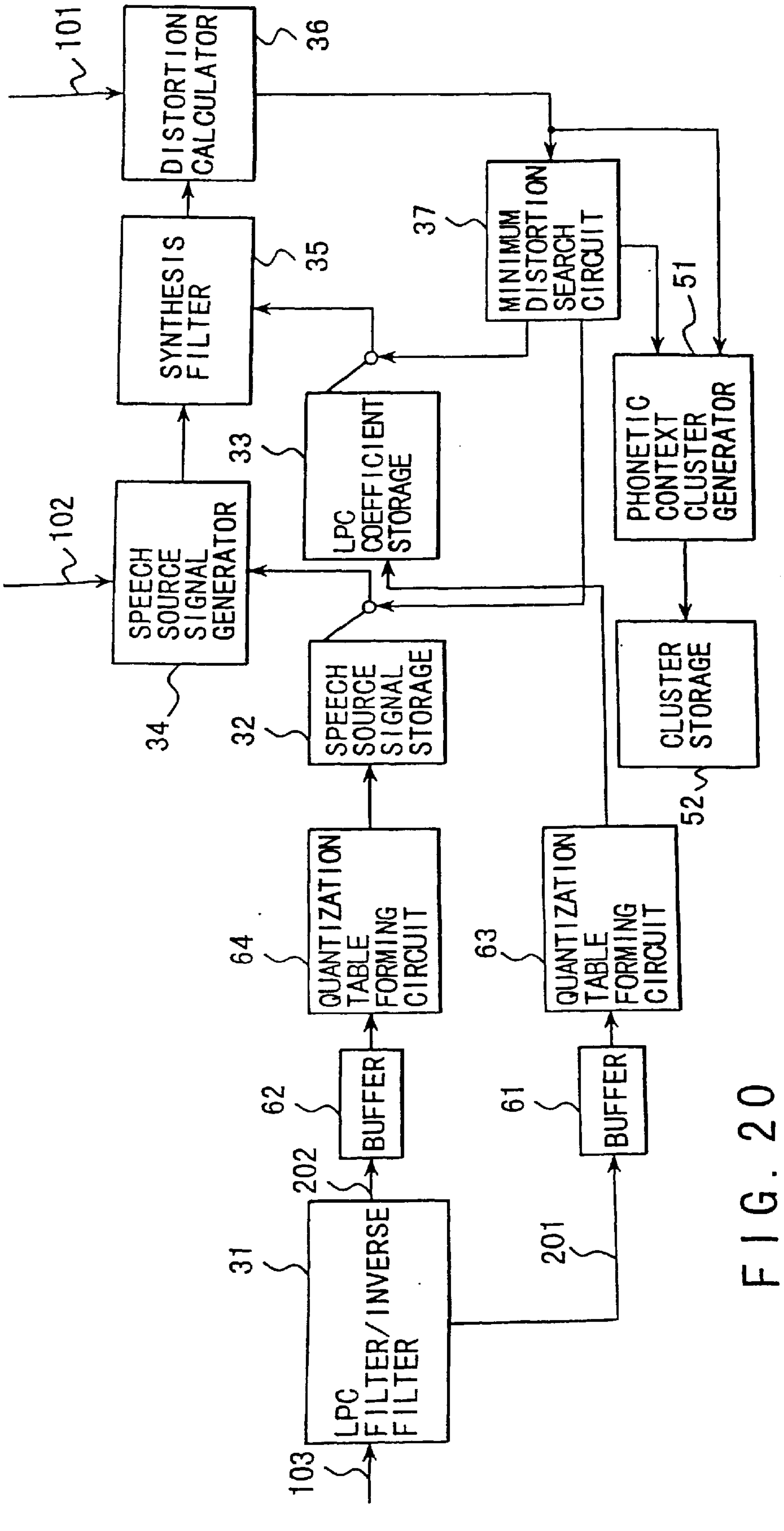
FIG. 20 is a block diagram showing the structure of a synthesis unit training section in a speech synthesis apparatus according to a seventh embodiment of the invention.

FIG. 20 is a block diagram showing a synthesis unit learning system according to a seventh embodiment of the present invention, wherein clusters are automatically generated on the basis of the degree of distortion with respect to the training speech segments. The clusters can be generated in the same manner as in the fifth embodiment. The structure of the synthesis unit training section in this embodiment is a combination of the fifth embodiment shown in FIG. 15 and the sixth embodiment shown in FIG. 18.

Figure 21:
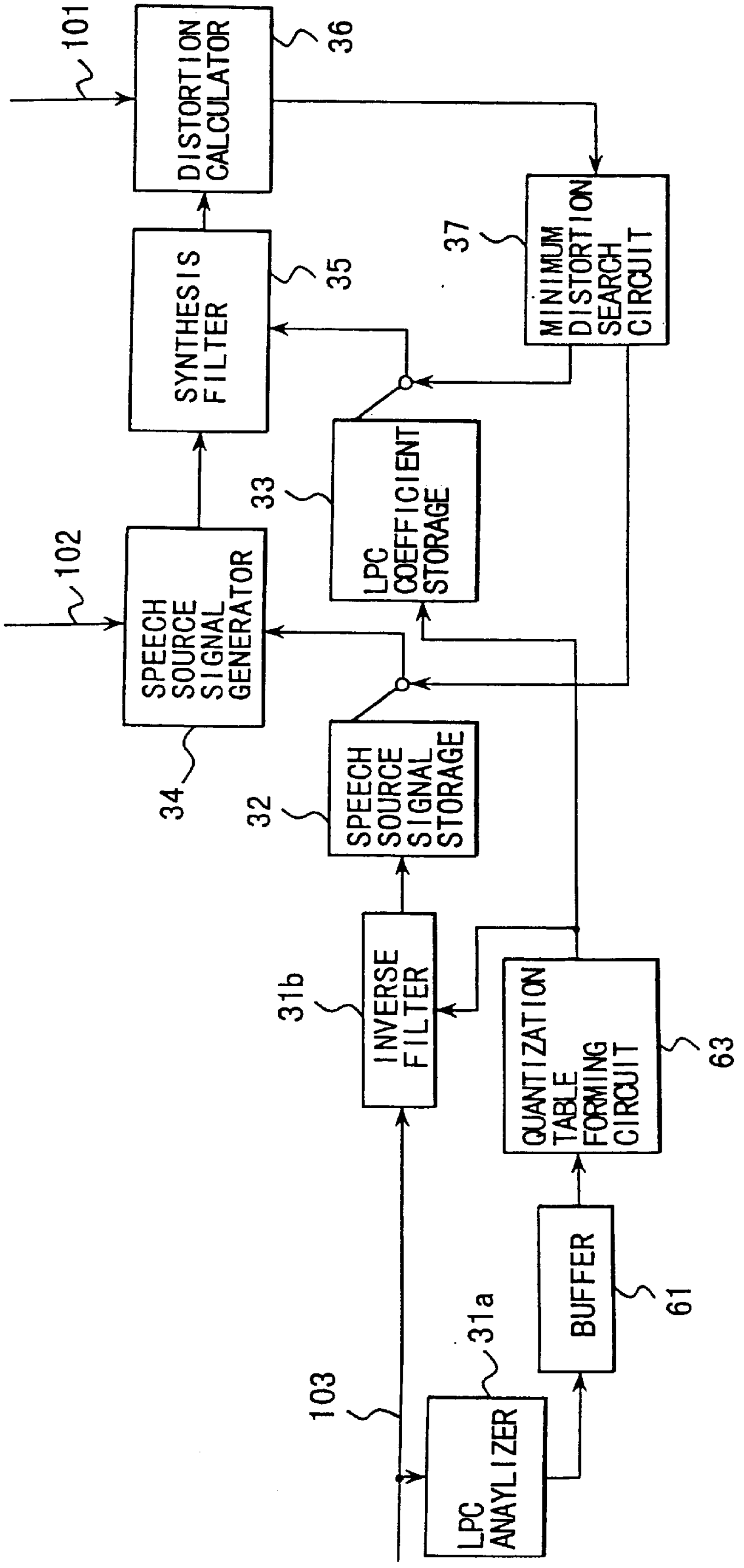
FIG. 21 is a block diagram showing the structure of a synthesis unit training section in a speech synthesis apparatus according to an eighth embodiment of the invention.

FIG. 21 shows a synthesis unit training section according to an eighth embodiment of the invention. An LPC analyzer 31*a* is separated from an inverse filter 31*b*. The inverse filtering is carried out by using the LPC coefficient quantized through the buffer 61 and quantization table forming circuit 63, thereby calculating the prediction residual signal. Thus, the synthesis units, which can reduce the degradation in quality of synthesis speech due to quantization distortion of the LPC coefficient, can be generated.

Figure 22:
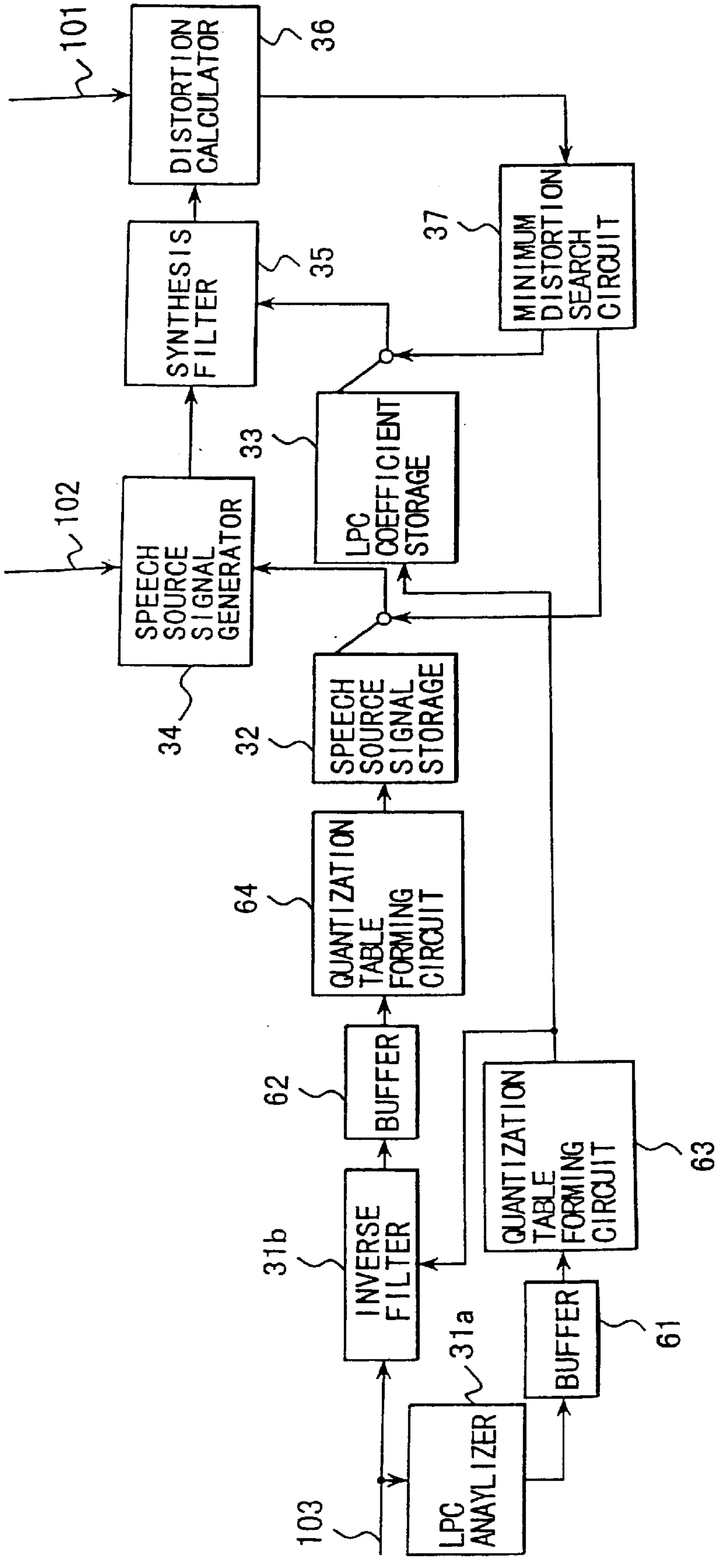
FIG. 22 is a block diagram showing the structure of a synthesis unit training section in a speech synthesis apparatus according to a ninth embodiment of the invention.

FIG. 22 shows a synthesis unit training section according to a ninth embodiment of the present invention. This embodiment relates to another example of the structure wherein like the eighth embodiment, the inverse filtering is performed by using the quantized LPC coefficient, thereby calculating the prediction residual signal. This embodiment, however, differs from the eighth embodiment in that the prediction residual signal, which has been inverse-filtered by the inverse filter 31*b*, is input to the buffer 62 and quantization table forming circuit 64 and then the quantized prediction residual signal is input to the speech source signal storage 32.

In the sixth to ninth embodiments, the size of the quantization table formed in the quantization table forming circuit 63, 64, i.e. the number of typical spectra for quantization can be made less than the total number (e.g. the sum of CV and VC syllables) of clusters or synthesis units. By quantizing the LPC coefficients and prediction residual signals, the number of LPC coefficients and speech source signals stored as synthesis units can be reduced. Thus, the calculation time necessary for learning of synthesis units can be reduced, and the memory capacity for use in the speech synthesis section can be reduced.

In addition, since the speech synthesis is performed on the basis of combinations ($a_i$, $e_j$) of LPC coefficients and speech source signals, an excellent synthesis speech can be obtained even if the number of synthesis units of either LPC coefficients or speech source signals is less than the sum of clusters or synthesis units (e.g. the total number of CV and VC syllables).

In the sixth to ninth embodiments, a smoother synthesis speech can be obtained by considering the distortion of connection of synthesis segments as the degree of distortion between the training speech segments and synthesis speech segments.

Besides, in the learning of synthesis units and the speech synthesis, an adaptive post-filter similar to that used in the second embodiment may be used in combination with the synthesis filter. Thereby, the spectrum of synthesis speech is shaped, and a "modulated" clear synthesis speech can be obtained.

In a general speech synthesis apparatus, even if modeling has been carried out with high precision, a spectrum distortion will inevitably occur at the time of synthesizing a speech having a pitch period different from the pitch period of a natural speech analyzed to acquire the LPC coefficients and residual waveforms.

Figure 35A:
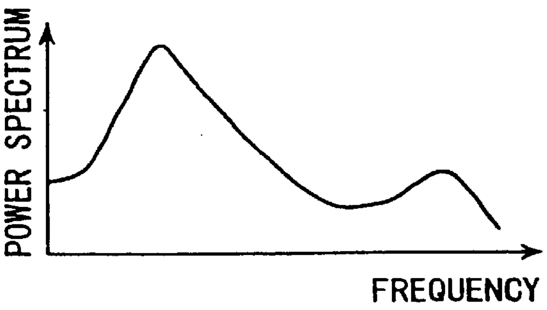
FIG. 35A to FIG. 35C illustrate relationships among spectra of speech signals, spectrum envelopes and fundamental frequencies.
Figure 35B:
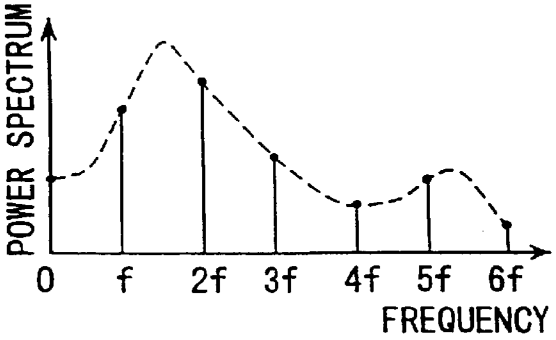
Figure 35C:
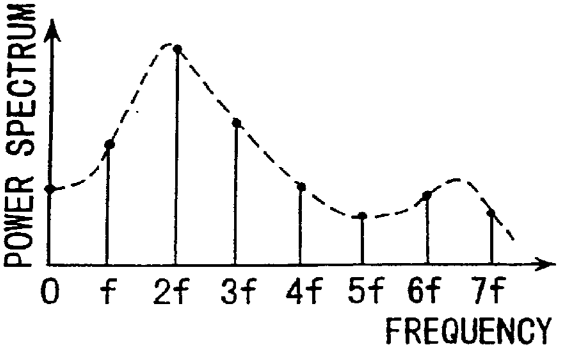

For example, FIG. 35A shows a spectrum envelope of a speech with given phonemes. FIG. 35B shows a power spectrum of a speech signal obtained when the phonemes are generated at a fundamental frequency f. Specifically, this power spectrum is a discrete spectrum obtained by sampling the spectrum envelope at a frequency f. Similarly, FIG. 35C shows a power spectrum of a speech signal generated at a fundamental frequency f'. Specifically, this power spectrum is a discrete spectrum obtained by sampling the spectrum envelope at a frequency f'.

Figure 36A:
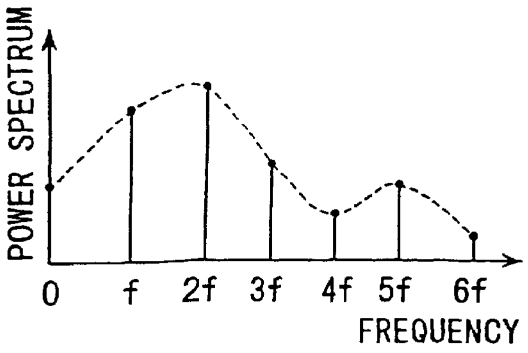
FIG. 36A to FIG. 36C illustrate relationships between spectra of analyzed speech signals and spectra of synthesis speeches synthesized by altering fundamental frequencies.
Figure 36B:
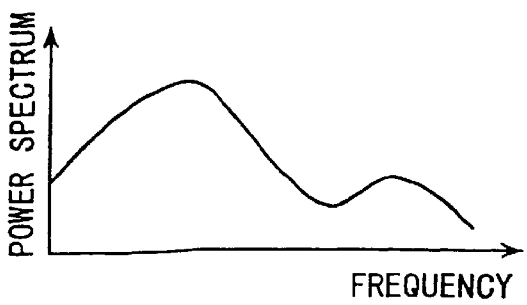
Figure 36C:
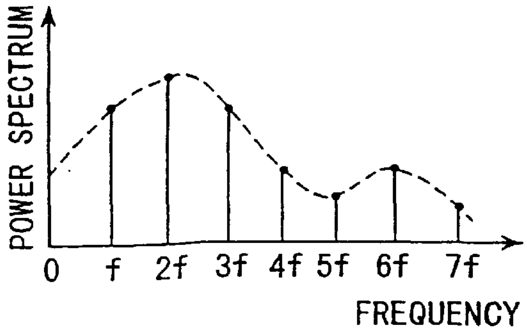

Suppose that the LPC coefficients to be stored in the LPC coefficient storage are obtained by analyzing a speech having the spectrum shown in FIG. 35B and finding the spectrum envelope. In the case of a speech signal, it is not possible, in principle, to obtain the real spectral envelope shown in FIG. 35A from the discrete spectrum shown in FIG. 35B. Although the spectrum envelope obtained by analyzing the speech may be equal to the real spectrum envelope at discrete points, as indicated by the broken line in FIG. 36A, an error may occur at other frequencies. There is a case in which a formant of the obtained envelope may become obtuse, as compared to the real spectrum envelope, as shown in FIG. 36B. In this case, the spectrum of the synthesis speech obtained by performing speech synthesis at a fundamental frequency f' different from f, as shown in FIG. 36C, is obtuse, as compared to the spectrum of a natural speech as shown in FIG. 35C, resulting in degradation in clearness of a synthesis speech.

Figure 37A:
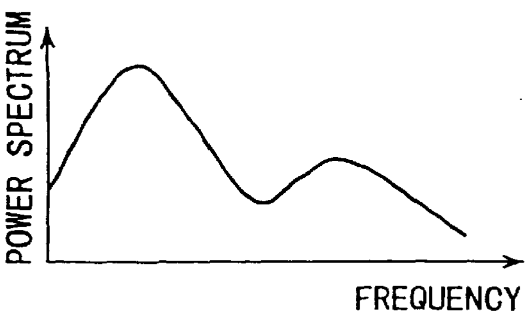
FIG. 37A to FIG. 37C illustrate relationships between frequency characteristics of two synthesis filters and frequency characteristics of filters obtained by interpolating the former frequency characteristics.
Figure 37B:
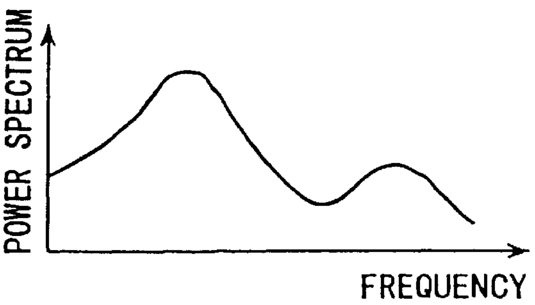
Figure 37C:
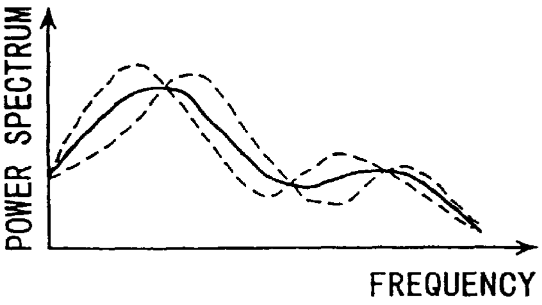

In addition, when speech synthesis units are connected, parameters such as filtering coefficients are interpolated, with the result that irregularity of a spectrum is averaged and the spectrum becomes obtuse. Suppose that, for example, LPC coefficients of two consecutive speech synthesis units have frequency characteristics as shown in FIGS. 37A and 37B. If the two filtering coefficients are interpolated, the filtering frequency characteristics, as shown in FIG. 37C, are obtained. That is, the irregularity of the spectrum is averaged and the spectrum becomes obtuse. This, too, is a factor of degradation of clarity of the synthesis speech.

Figure 38:
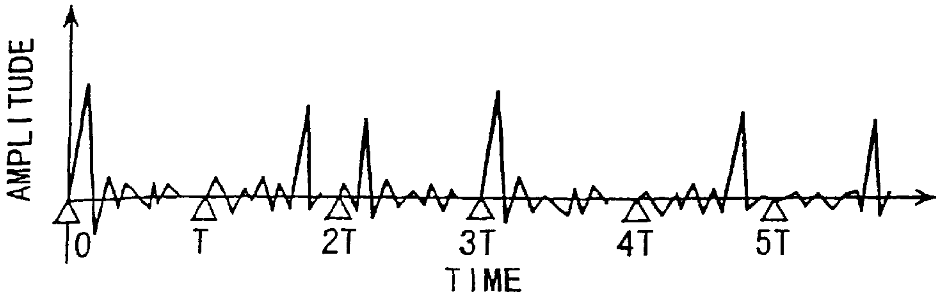
FIG. 38 illustrates a disturbance of a pitch of a voiced speech source signal.

Besides, if the position of a peak of a residual waveform varies from frame to frame, the pitch of a voiced speech source is disturbed. For example, even if residual waveforms are arranged at regular intervals T, as shown in FIG. 38, harmonics of a pitch of a synthesis speech signal are disturbed due to a variance in position of peak of each residual waveform. As a result, the quality of sound deteriorates.

Embodiments of the invention, which have been attained in consideration of the above problems, will now be described with reference to FIGS. 23 to 34.

Figure 23:
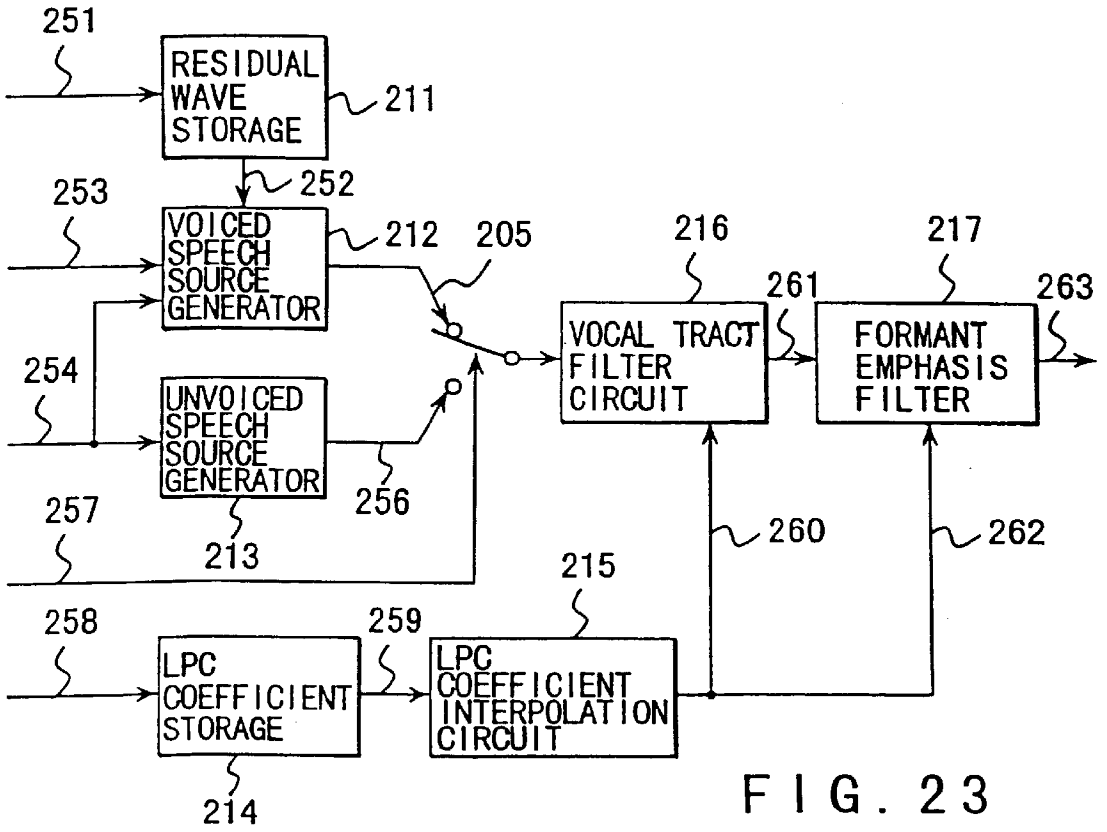
FIG. 23 is a block diagram showing a speech synthesis apparatus according to a tenth embodiment of the invention.

FIG. 23 shows the structure of a speech synthesis apparatus according to a tenth embodiment of the invention to which the speech synthesis method of this invention is applied. This speech synthesis apparatus comprises a residual wave storage 211, a voiced speech source generator 212, an unvoiced speech source generator 213, an LPC coefficient storage 214, an LPC coefficient interpolation circuit 215, a vocal tract filter 216, and a formant emphasis filter 217 which is originally adopted in the present invention.

The residual wave storage 211 prestores, as information of speech synthesis units, residual waves of a 1-pitch period on which vocal tract filter drive signals are based. One 1-pitch period residual wave 252 is selected from the prestored residual waves in accordance with wave selection information 251, and the selected 1-pitch period residual wave 252 is output. The voiced speech source generator 212 repeats the 1-pitch period residual wave 252 at a frame average pitch 253. The repeated wave is multiplied with a frame average power 254, thereby generating a voiced speech source signal 255. The voiced speech source signal 255 is output during a voiced speech period determined by voiced/unvoiced speech determination information 257. The voiced speech source signal is input to the vocal tract filter 216. The unvoiced speech source generator 213 outputs an unvoiced speech source signal 256 expressed as white noise, on the basis of the frame average power 254. The unvoiced speech source signal 256 is output during an unvoiced speech period determined by the voiced/unvoiced speech determination information 257. The unvoiced speech source signal is input to the vocal tract filter 216.

The LPC coefficient storage 214 prestores, as information of other speech synthesis units, LPC coefficients obtained by subjecting natural speeches to linear prediction analysis (LPC analysis). One of LPC coefficients 259 is selectively output in accordance with LPC coefficient selection information 258. The residual wave storage 211 stores the 1-pitch period waves extracted from residual waves obtained by performing inverse filtering with use of the LPC coefficients. The LPC coefficient interpolation circuit 215 interpolates the previous-frame LPC coefficient and the present-frame LPC coefficient 259 so as not to make the LPC coefficients discontinuous between the frames, and outputs the interpolated LPC coefficient 260. The vocal tract filter in the vocal tract filter circuit 216 is driven by the input voiced speech source signal 255 or unvoiced speech source signal 256 and performs vocal tract filtering, with the LPC coefficient 260 used as filtering coefficient, thus outputting a synthesis speech signal 261.

The formant emphasis filter 217 filters the synthesis speech signal 261 by using the filtering coefficient determined by the LPC coefficient 262. Thus, the formant emphasis filter 217 emphasizes the formant of the spectrum and outputs a phoneme symbol 263. Specifically, the filtering coefficient according to the speech spectrum parameter is required in the formant emphasis filter. The filtering coefficient of the formant emphasis filter 217 is set in accordance with the LPC coefficient 262 output from the LPC coefficient interpolation circuit 215, with attention paid to the fact that the filtering coefficient of the vocal tract filter 216 is set in accordance with the spectrum parameter or LPC coefficient in this type of speech synthesis apparatus.

Since the formant of the synthesis speech signal 261 is emphasized by the formant emphasis filter 217, the spectrum which becomes obtuse due to the factors described with reference to FIGS. 13 and 14 can be shaped and a clear synthesis speech can be obtained.

Figure 24:
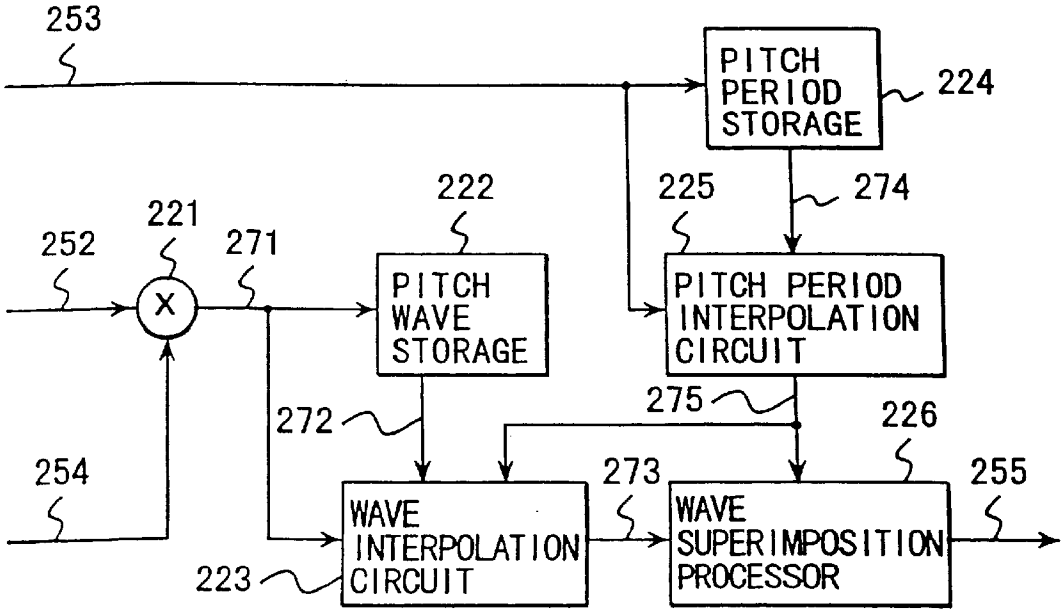
FIG. 24 is a block diagram of a speech synthesis apparatus showing an example of the structure of a voiced speech source generator in the present invention.

FIG. 24 shows another example of the structure of the voiced speech source generator 212. In FIG. 24, a pitch period storage 224 stores a frame average pitch 253, and outputs a frame average pitch 274 of the previous frame. A pitch period interpolation circuit 225 interpolates the pitch periods so that the pitch period of the previous-frame frame average pitch 274 smoothly changes to the pitch period of the present-frame frame average pitch 253, thereby outputting a wave superimposition position designation information 275. A multiplier 221 multiplies the 1-pitch period residual wave 252 with the frame average power 254, and outputs a 1-pitch period residual wave 271. A pitch wave storage 212 stores the 1-pitch period residual wave 271 and outputs a 1-pitch period residual wave 272 of the previous frame. A wave interpolation circuit 223 interpolates the 1-pitch residual wave 272 and the 1-pitch period residual wave 271 with a weight determined by the wave superimposition position designation information 275. The wave interpolation circuit 223 outputs an interpolated 1-pitch period residual wave 273. The wave superimposition processor 226 superimposes the 1-pitch period residual wave 273 at the wave superimposition position designated by the wave superimposition position designation information 275. Thus, the voiced speech source signal 255 is generated.

Examples of the structure of the formant emphasis filter 217 will now be described. In a first example, the formant emphasis filter is constituted by all-pole filters. The transmission function of the formant emphasis filter is given by $$Q_1(z) = \frac{1}{1 - \sum_{i=1}^{N} \beta^i \alpha_i z^{-1}} \quad (11)$$

where

α=a LPC coefficient,

N=the degree of filter, and

β=a constant of 0<β<1.

If the transmission function of the vocal track filter is H(z), $Q_1(z)=H(z/\beta)$. Accordingly, Q(z) is obtained by substituting β pi (i=1, . . . , N) for the pole pi(i=1, . . . , N) of H(z). In other words, with the function $Q_1(z)$, all poles of H(z) are made closer to the original point at a fixed rate β. As compared to H(z), the frequency spectrum of $Q_1(z)$ becomes obtuse. Therefore, the greater the value β, the higher the degree of formant emphasis.

In a second example of the structure of formant stress filter 217, a pole-zero filter is cascade-connected to a first-order high-pass filter having fixed characteristics. The transmission function of this formant emphasis filter is given by $$Q_1(z) = \frac{1 - \sum_{i=1}^{N} \gamma^i \alpha_i z^{-1}}{1 - \sum_{i=1}^{N} \beta^i \alpha_i z^{-1}} 1 - \mu z^{-1} \quad (12)$$

where

γ=a constant of 0<γ<β, and

μ=a constant of 0<μ<1.

In this case, formant emphasis is performed by the pole-zero filter, and an excess spectrum tilt of frequency characteristics of the pole-zero filter is corrected by a first-order high-pass filter.

The structure of formant emphasis filter 217 is not limited to the above two examples. The positions of the vocal tract filter circuit 216 and formant emphasis filter 217 may be reversed. Since both the vocal tract filter circuit 216 and formant emphasis filter 217 are linear systems, the same advantage is obtained even if their positions are interchanged.

According to the speech synthesis apparatus of this embodiment, the vocal tract filter circuit 216 is cascade-connected to the formant emphasis filter 217, and the filtering coefficient of the latter is set in accordance with the LPC coefficient. Thereby, the spectrum which becomes obtuse due to the factors described with reference to FIGS. 13 and 14 can be shaped and a clear synthesis speech can be obtained.

Figure 25:
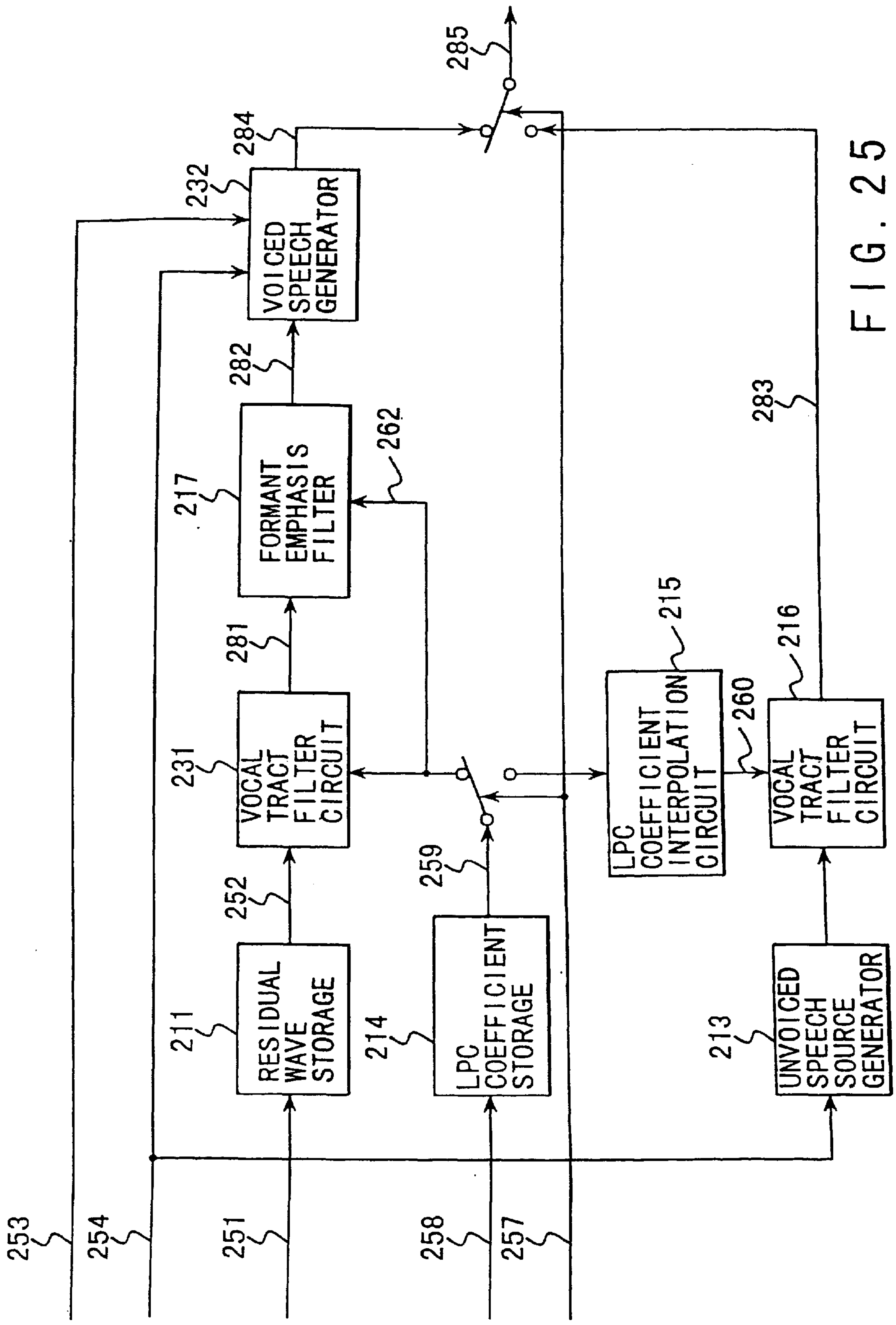
FIG. 25 is a block diagram of a speech synthesis apparatus according to an eleventh embodiment of the present invention.

FIG. 25 shows the structure of a speech synthesis apparatus according to an eleventh embodiment of the invention. In FIG. 25, the parts common to those shown in FIG. 23 are denoted by like reference numerals and have the same functions, and thus a description thereof is omitted.

In the eleventh embodiment, like the tenth embodiment, in the unvoiced period determined by the voiced/unvoiced speech determination information 257, the vocal tract filter in the vocal tract filter circuit 216 is driven by the unvoiced speech source signal generated from the unvoiced speech source generator 213, with the LPC coefficient 260 output from the LPC interporation circuit 215 being used as the filtering coefficient. Thus, the vocal tract filter circuit 216 outputs a synthesized unvoiced speech signal 283. On the other hand, in the voiced period determined by the voiced/unvoiced speech determination information 257, the processing procedure different from that of the tenth embodiment will be carried out, as described below.

The vocal tract filter circuit 231 receives as a vocal tract filter drive signal the 1-pitch period residual wave 252 output from the residual wave storage 211 and also receives the LPC coefficient 259 output from the LPC coefficient storage 214 as filtering coefficient. Thus, the vocal tract filter circuit 231 synthesizes and outputs a 1-pitch period speech wave 281. The formant emphasis filter 217 receives the LPC coefficient 259 as filtering coefficient 262 and filters the 1-pitch period speech wave 281 to emphasize the formant of the 1-pitch period speech wave 281. Thus, the formant emphasis filter 217 outputs a 1-pitch period speech wave 282. This 1-pitch period speech wave 282 is input to a voiced speech generator 232.

The voiced speech generator 232 can be constituted with the same structure as the voiced speech source generator 212 shown in FIG. 24. In this case, however, while the 1-pitch period residual wave 252 is input to the voiced speech source generator 212, the 1-pitch period speech wave 282 is input to the voiced speech generator 232. Thus, not the voiced speech source signal 255 but a voiced speech signal 284 is output from the voiced speech generator 232. The unvoiced speech signal 283 is selected in the unvoiced speech period determined by the voiced/unvoiced speech determination information 257, and the voiced speech signal 284 is selected in the voiced speech period. Thus, a synthesis speech signal 285 is output.

According to this embodiment, when the voiced speech signal is synthesized, the filtering time in the vocal tract filter circuit 231 and formant emphasis filter 217 may be the 1-pitch period per frame, and the interpolation of LPC coefficients is not needed. Therefore, as compared to the tenth embodiment, the same advantage is obtained with a less quantity of calculations.

In this embodiment, only the voiced speech signal is subjected to formant emphasis. Like the voiced speech signal, the unvoiced speech signal 283 may be subjected to formant emphasis by providing an additional formant emphasis filter.

In this eleventh embodiment, too, the positions of the formant emphasis filter 217 and vocal tract filter circuit 231 may be reversed.

Figure 26:
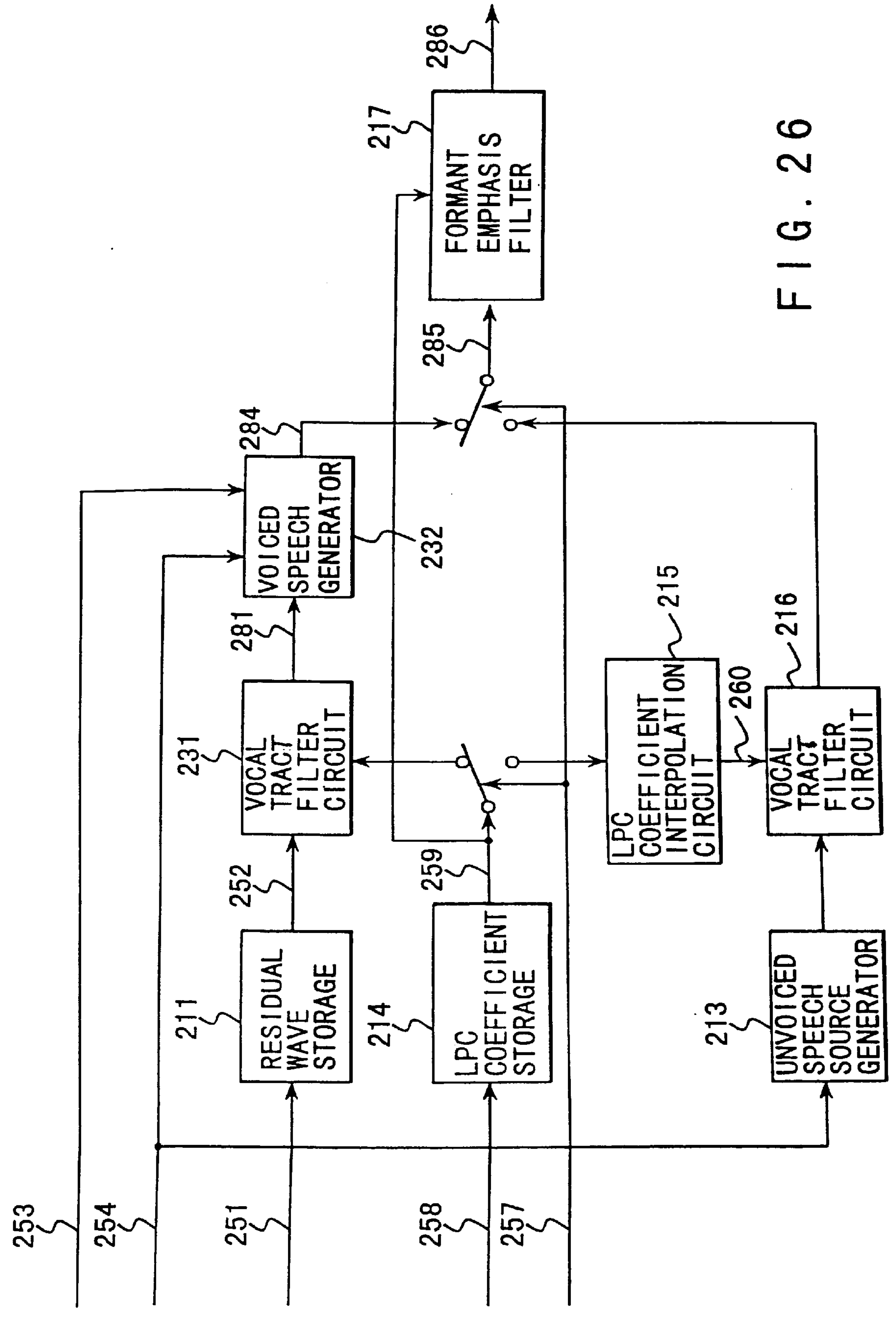
FIG. 26 is a block diagram of a speech synthesis apparatus according to a twelfth embodiment of the present invention.

FIG. 26 shows the structure of a speech synthesis apparatus according to a twelfth embodiment of the invention. In FIG. 26, the structural parts common to those shown in FIG. 25 are denoted by like reference numerals and have the same functions. A description thereof, therefore, may be omitted.

In the eleventh embodiment shown in FIG. 25, the 1-pitch period speech waveform 281 is subjected to formant emphasis. The twelfth embodiment differs from the eleventh embodiment in that the synthesis speech signal 285 is subjected to formant emphasis. The same advantage as with the eleventh embodiment can be obtained by the twelfth embodiment.

Figure 27:
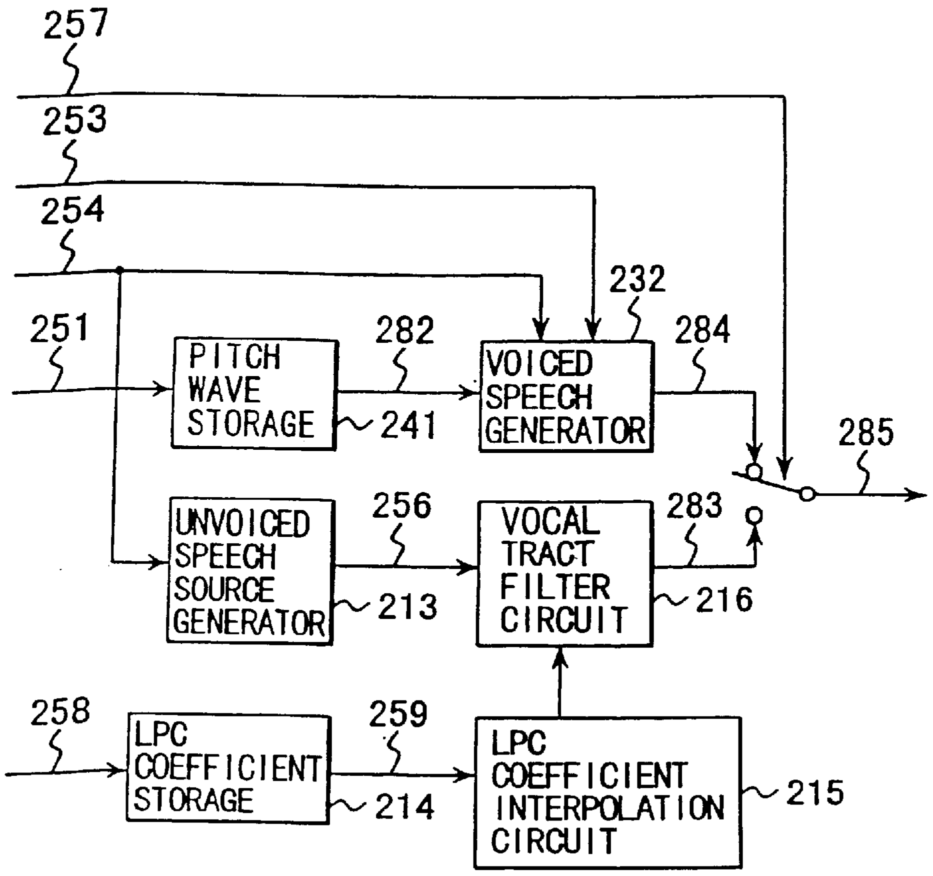
FIG. 27 is a block diagram of a speech synthesis apparatus according to a 13th embodiment of the present invention.

FIG. 27 shows the structure of a speech synthesis apparatus according to a 13th embodiment of the invention. In FIG. 27, the structural parts common to those shown in FIG. 25 are denoted by like reference numerals and have the same functions. A description thereof, therefore, may be omitted.

In this embodiment, a pitch wave storage 241 stores 1-pitch period speech waves. In accordance with the wave selection information 251, a 1-pitch period speech wave 282 is selected from the stored 1-pitch period speech waves and output. The 1-pitch period speech waves stored in the pitch wave storage 241 have already been formant-emphasized by the process illustrated in FIG. 28.

Figure 28:
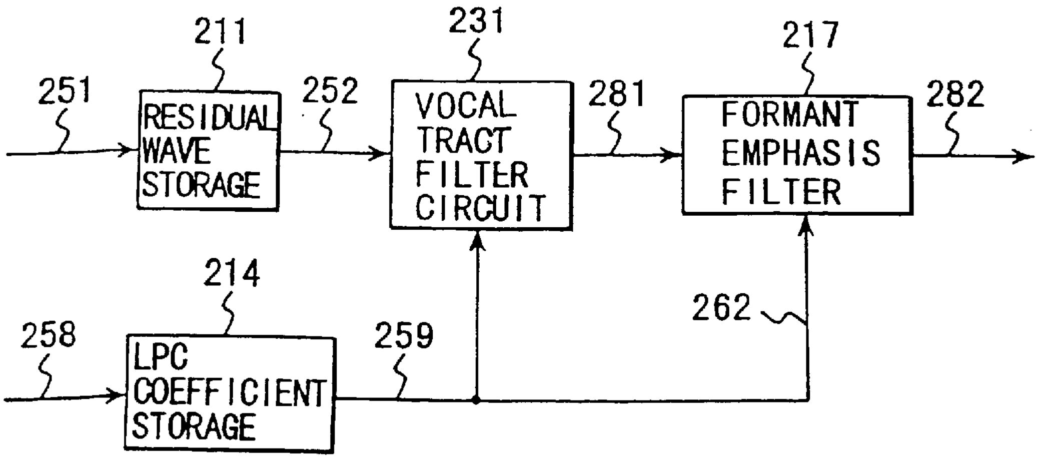
FIG. 28 is a block diagram of a speech synthesis apparatus, illustrating an example of a process of generating a 1-pitch period speech wave in the present invention.

Specifically, in the present embodiment, the process carried out in an on-line manner in the structure shown in FIG. 25 is carried out in advance in an on-line manner in the structure shown in FIG. 28. The formant emphasis filter 217 formant-emphasizes the synthesis speech signal 281 synthesized in the vocal tract filter circuit 231 on the basis of the residual wave output from the residual wave storage 211 and LPC coefficient storage 214 and the LPC coefficient. The 1-pitch period speech waves of all speech synthesis units are found and stored in the pitch wave storage 241. According to this embodiment, the amount of calculations necessary for the synthesis of 1-pitch period speech waves and the formant emphasis can be reduced.

Figure 29:
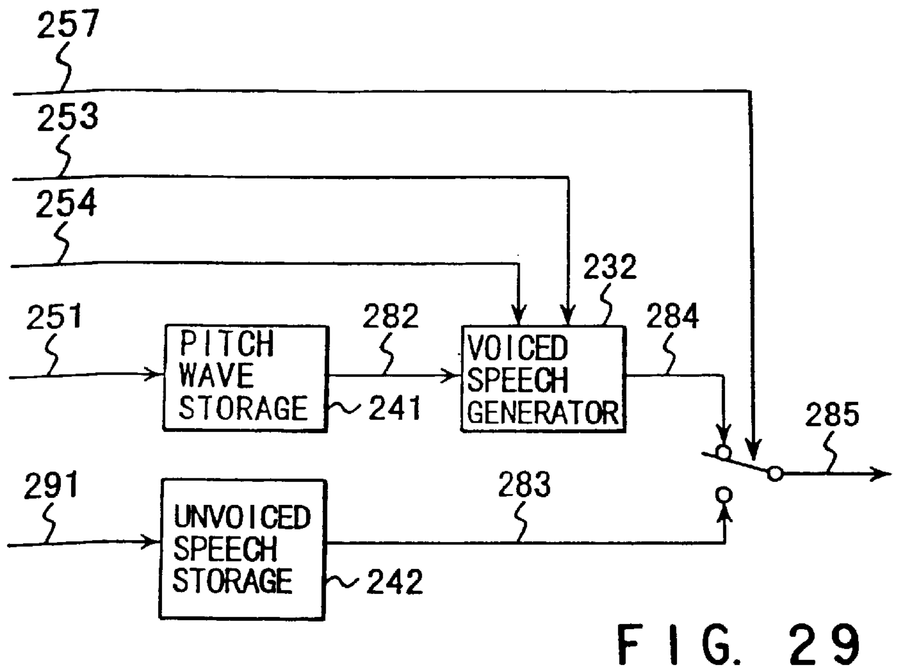
FIG. 29 is a block diagram of a speech synthesis apparatus according to a 14th embodiment of the present invention.

FIG. 29 shows the structure of a speech synthesis apparatus according to a 14th embodiment of the invention. In FIG. 29, the structural parts common to those shown in FIG. 27 are denoted by the same reference numerals and have the same functions. A description thereof, therefore, may be omitted. In the 14th embodiment, an unvoiced speech 283 is selected from unvoiced speeches stored in an unvoiced speech storage 242 in accordance with unvoiced speech selection information 291 and is output. In the $14^{th}$ embodiment, as compared to the 13th embodiment shown in FIG. 27, the filtering by the vocal tract filter is not needed when the unvoiced speech signal is synthesized. Therefore, the amount of calculations is further reduced.

Figure 30:
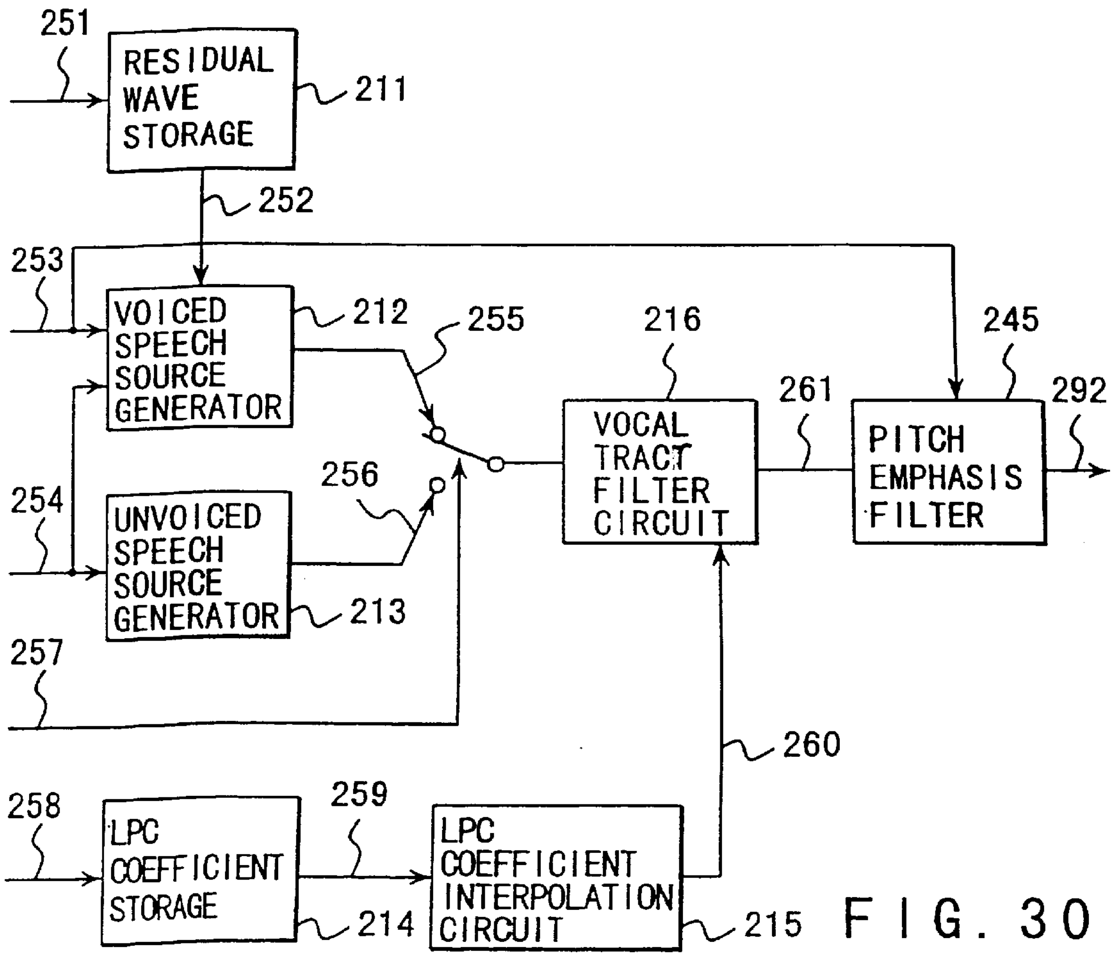
FIG. 30 is a block diagram of a speech synthesis apparatus according to a 15th embodiment of the present invention.

FIG. 30 shows the structure of a speech synthesis apparatus according to a 15th embodiment of the invention. The speech synthesis apparatus of the 15th embodiment comprises a residual wave storage 211, a voiced speech source generator 212, an unvoiced speech source generator 213, an LPC coefficient storage 214, an LPC coefficient interpolation circuit 215, a vocal tract filter circuit 216, and a pitch emphasis filter 251.

The residual wave storage 211 prestores residual waves as information of speech synthesis units. A 1-pitch period residual wave 252 is selected from the stored residual waves in accordance with the wave selection information 251 and is output to the voiced speech source generator 212. The voiced speech source generator 212 repeats the 1-pitch period residual wave 252 in a cycle of the frame average pitch 253. The repeated wave is multiplied with the frame average power 254, and thus a voiced speech source signal 255 is generated. The voiced speech source signal 255 is output in the voiced speed-period determined by the voiced/unvoiced speech determination information 257 and is delivered to the vocal tract filter circuit 216. The unvoiced speech source generator 213 outputs an unvoiced speech source signal 256 expressed as white noise, on the basis of the frame average power 254. The unvoiced speech source signal 256 is output during the unvoiced speech period determined by the voiced/unvoiced speech determination information 257. The unvoiced speech source signal is input to the vocal tract filter circuit 216.

The LPC coefficient storage 214 prestores LPC coefficients as information of other speech synthesis units. One of LPC coefficients 259 is selectively output in accordance with LPC coefficient selection information 258. The LPC coefficient interpolation circuit 215 interpolates the previous-frame LPC coefficient and the present-frame LPC coefficient 259 so as not to make the LPC coefficients discontinuous between the frames, and outputs the interpolated LPC coefficient 260.

The vocal tract filter in the vocal tract filter circuit 216 is driven by the input voiced speech source signal 255 or unvoiced speech source signal 256 and performs vocal tract filtering, with the LPC coefficient 260 used as filtering coefficient, thus outputting a synthesis speech signal 261.

In this speech synthesis apparatus, the LPC coefficient storage 214 stores various LPC coefficients obtained in advance by subjecting natural speeches to linear prediction analysis. The residual wave storage 211 stores the 1-pitch period waves extracted from residual waves obtained by performing inverse filtering with use of the LPC coefficients. Since the parameters such as LPC coefficients obtained by analyzing natural speeches are. applied to the vocal tract filter or speech source signals, the precision of modeling is high and synthesis speeches relatively close to natural speeches can be obtained.

The pitch emphasis filter 251 filters the synthesis speech signal 261 with use of the coefficient determined by the frame average pitch 253, and outputs a synthesis speech signal 292 with the emphasized pitch. The pitch emphasis filter 251 is constituted by a filter having the following transmission function:

$$R(z) = Cg\frac{1+\gamma z^{-p}}{1-\lambda z^{-p}} \tag{13}$$

The symbol p is the pitch period, and γ and λ are calculated on the basis of a pitch gain according to the following equations:

$$\gamma = C_z f(x) \tag{14}$$

$$\lambda = C_p f(x) \tag{15}$$

Symbols $C_z$ and $C_p$ are constants for controlling the degree of pitch emphasis, which are empirically determined. In addition, f(x) is a control factor which is used to avoid unnecessary pitch emphasis when an unvoiced speech signal including no periodicity is to be processed. Symbol x corresponds to a pitch gain. When x is lower than a threshold (typically 0.6), a processed signal is determined to be an unvoiced speech signal, and the factor is set at f(x)=0. When x is not lower than the threshold, the factor is set at f(x)=x. If x exceeds 1, the factor f(x) is set at f(x)=1 in order to maintain stability. The parameter Cg is used to cancel a variation in filtering gain between the unvoiced speech and voiced speech and is expressed by $$C_g = \frac{1-\lambda/x}{1-\gamma/x} \tag{16}$$

According to this embodiment, the pitch emphasis filter 251 is newly provided. In the preceding embodiments, the obtuse spectrum is shaped by formant emphasis to clarify the synthesis speech. In addition to this advantage, a disturbance of harmonics of pitch of the synthesis speech signal due to the factors described with reference to FIG. 37 is improved. Therefore, a synthesis speech with higher quality can be obtained.

Figure 31:
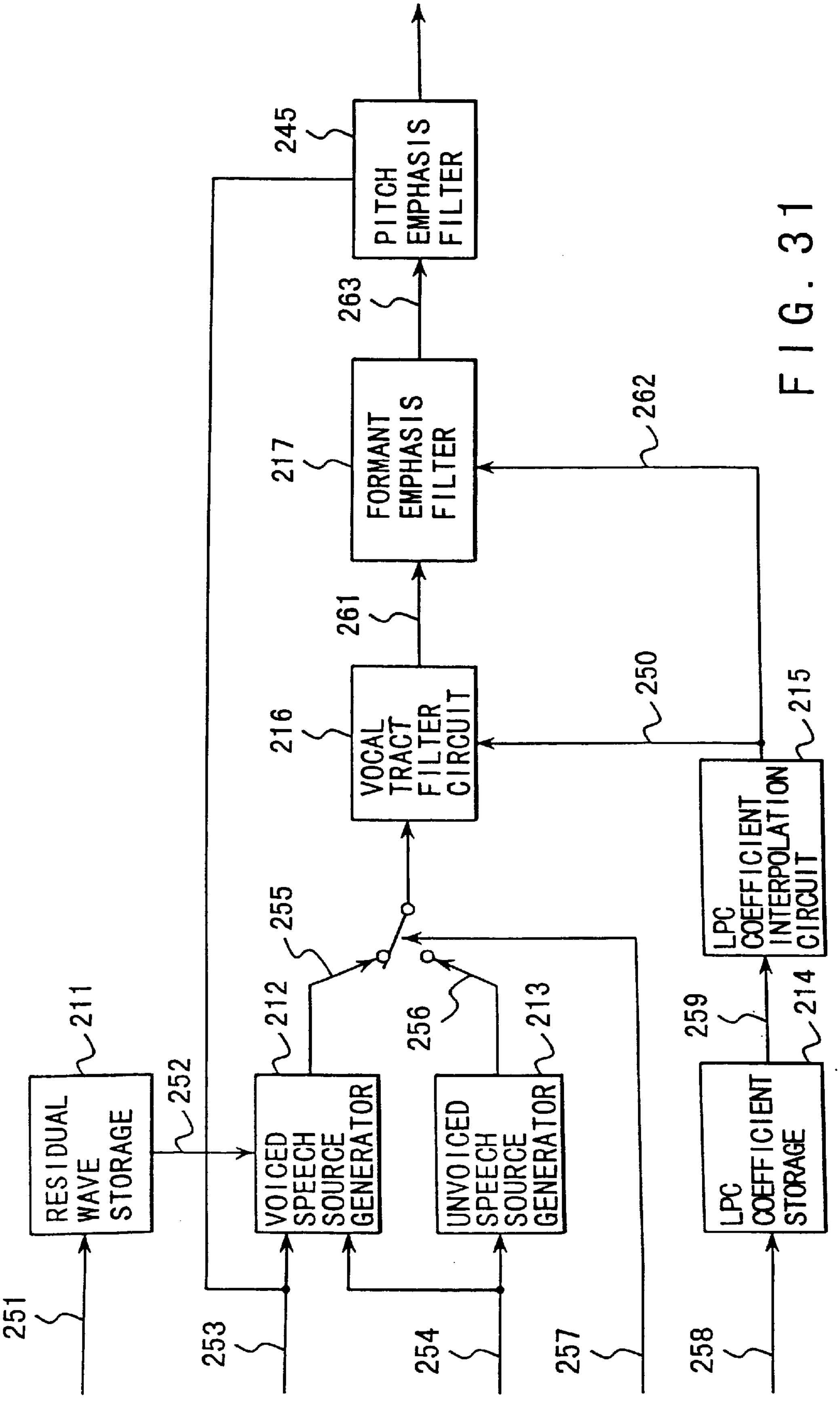
FIG. 31 is a block diagram of a speech synthesis apparatus according to a 16th embodiment of the present invention.

FIG. 31 shows the structure of a speech synthesis apparatus according to a 16th embodiment of the invention. In this embodiment, the pitch emphasis filter 251 provided in the 15th embodiment is added to the speech synthesis apparatus of the 10th embodiment shown in FIG. 23.

Figure 32:
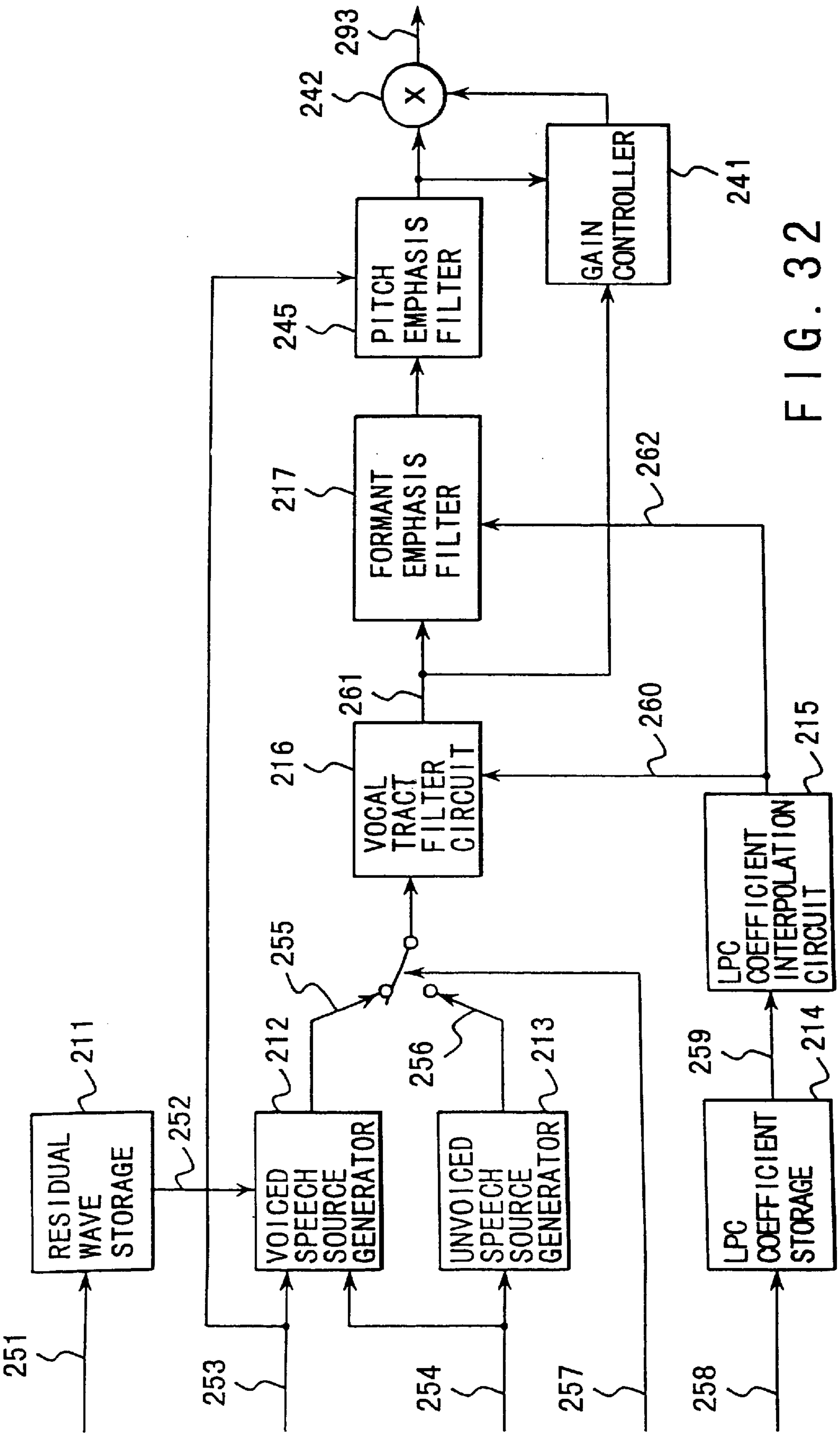
FIG. 32 is a block diagram of a speech synthesis apparatus according to a 17th embodiment of the present invention.

FIG. 32 shows the structure of a speech synthesis apparatus according to a 17th embodiment of the invention. In FIG. 32, the structural parts common to those shown in FIG. 31 are denoted by like reference numerals and have the same functions. A description thereof, therefore, may be omitted.

In the 17th embodiment, a gain controller 241 is added to the speech synthesis apparatus according to the 16th embodiment shown in FIG. 31. The gain controller 241 corrects the total gain of the formant emphasis filter 217 and pitch emphasis filter 251. The output signal from the pitch emphasis filter 251 is multiplied with a predetermined gain in a multiplier 242 so that the power of the synthesis speech signal 293 or the final output may be equal to the power of the synthesis speech signal 261 output from the vocal tract filter circuit 216.

Figure 33:
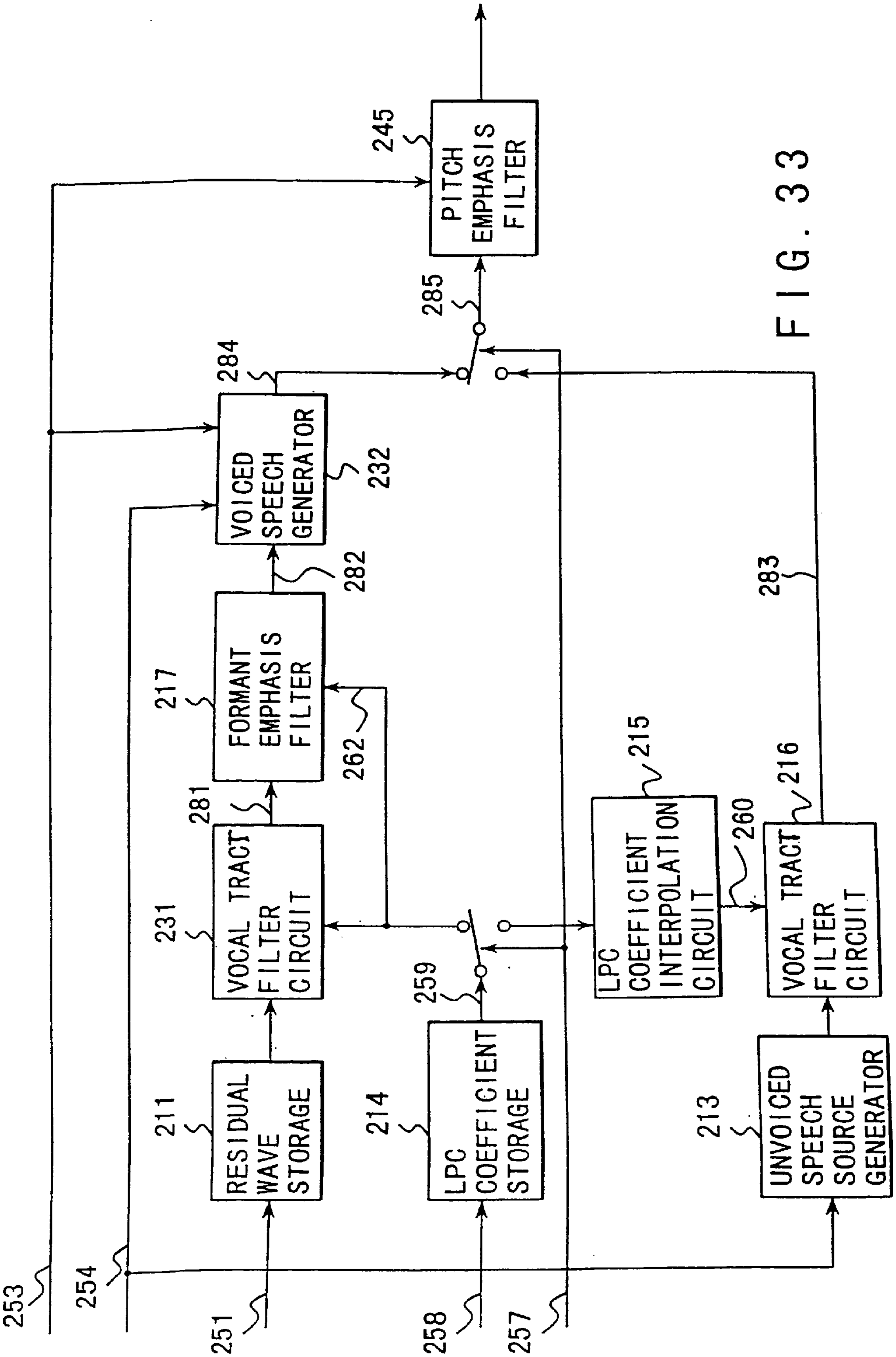
FIG. 33 is a block diagram of a speech synthesis apparatus according to an 18th embodiment of the present invention.

FIG. 33 shows the structure of a speech synthesis apparatus according to an 18th embodiment of the invention. In this embodiment, the pitch emphasis filter 251 is added to the speech synthesis apparatus of the eleventh embodiment shown in FIG. 25.

Figure 34:
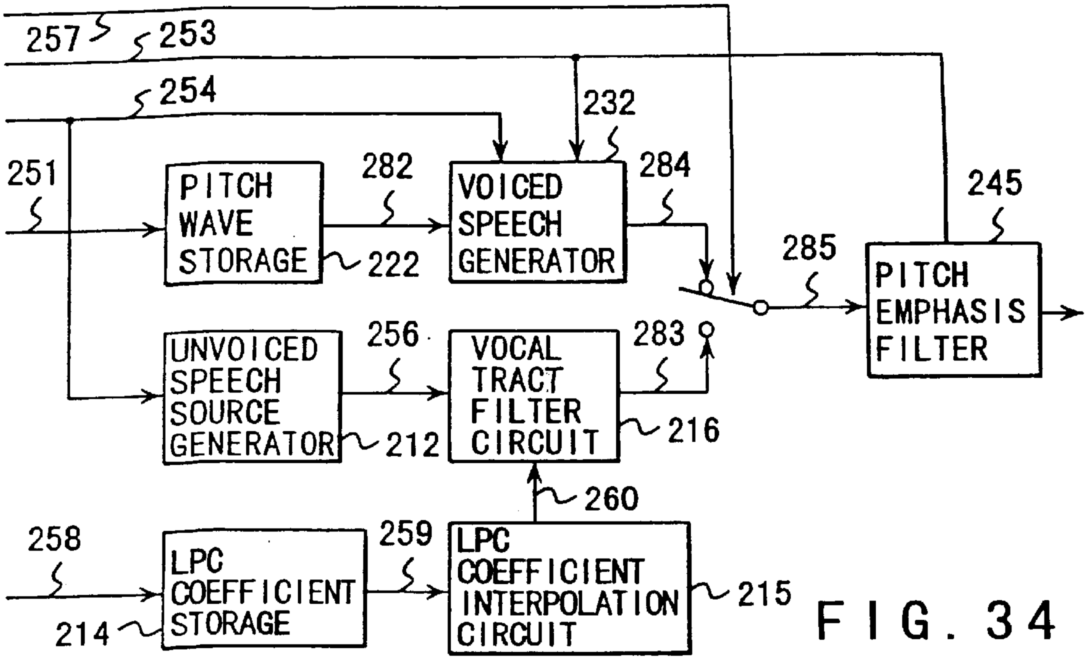
FIG. 34 is a block diagram of a speech synthesis apparatus according to a 19th embodiment of the present invention.

FIG. 34 shows the structure of a speech synthesis apparatus according to an 19th embodiment of the invention. In this embodiment, the pitch emphasis filter 251 is added to the speech synthesis apparatus of the 14th embodiment shown in FIG. 27.

Figure 39:
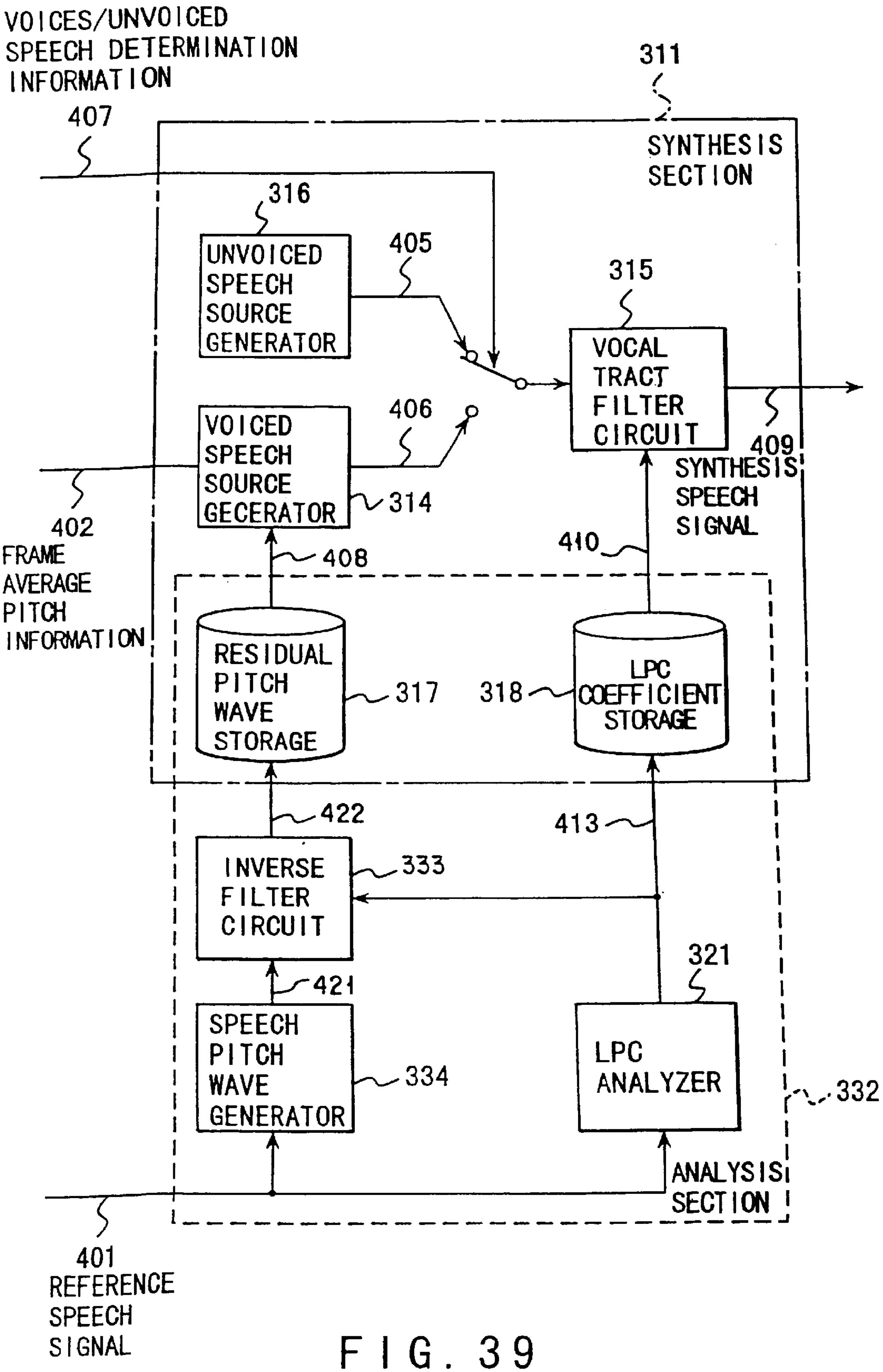
FIG. 39 is a block diagram of a speech synthesis apparatus according to a twentieth embodiment of the invention.

FIG. 39 shows the structure of a speech synthesizer operated by a speech synthesis method according to a 20th embodiment of the invention. The speech synthesizer comprises a synthesis section 311 and an analysis section 332.

The synthesis section 311 comprises a voiced speech source generator 314, a vocal tract filter circuit 315, an unvoiced speech source generator 316, a residual pitch wave storage 317 and an LPC coefficient storage 318.

Specifically, in the voiced period determined by the voiced/unvoiced speech determination information 407, the voiced speech source generator 314 repeats a residual pitch wave 408 read out from the residual pitch wave storage 317 in the cycle of frame average pitch 402, thereby generating a voiced speech signal 406. In the unvoiced period determined by the voiced/unvoiced speech determination information 407, the unvoiced speech source generator 316 outputs an unvoiced speech signal 405 produced by, e.g. white noise. In the vocal tract filter circuit 315, a synthesis filter is driven by the voiced speech source signal 406 or unvoiced speech source signal 405 with an LPC coefficient 410 read out from the LPC coefficient storage 318 used as filtering coefficient, thereby outputting a synthesis speech signal 409.

On the other hand, the analysis section 332 comprises an LPC analyzer 321, a speech pitch wave generator 334, an inverse filter circuit 333, the residual pitch wave storage 317 and the LPC coefficient storage 318. The LPC analyzer 321 PLC-analyzes a reference speech signal 401 and generates an LPC coefficient 413 or a kind of spectrum parameter of the reference speech signal 401. The LPC coefficient 413 is stored in the LPC coefficient storage 318.

When the reference speech signal 401 is a voiced speech, the speech pitch wave generator 334 extracts a typical speech pitch wave 421 from the reference speech signal 401 and outputs the typical speech pitch wave 421. In the inverse filter circuit 333, a linear prediction inverse filter, whose characteristics are determined by the LPC coefficient 413, filters the speech pitch wave 401 and generates a residual pitch wave 422. The residual pitch wave 422 is stored in the residual pitch wave storage 317.

The structure and operation of the speech pitch wave generator 334 will now be described in detail.

In the speech pitch wave generator 334, the reference speech signal 401 is windowed to generate the speech pitch wave 421. Various functions may be used as window function. A function of a Hanning window or a Hamming window having a relatively small side lobe is proper. The window length is determined in accordance with the pitch period of the reference speech signal 401, and is set at, for example, double the pitch period. The position of the window may be set at a point where the local peak of the speech wave of reference speech signal 401 coincides with the center of the window. Alternatively, the position of the window may be searched by the power or spectrum of the extracted speech pitch wave.

A process of searching the position of the window on the basis of the spectrum of the speech pitch wave will now be described by way of example. The power spectrum of the speech pitch wave must express an envelope of the power spectrum of reference speech signal 401. If the position of the window is not proper, a valley will form at an odd-number of times of the f/2 of the power spectrum of speech pitch wave, where f is the fundamental frequency of reference speech signal 101. To obviate this drawback, the speech pitch wave is extracted by searching the position of the window where the amplitude at an odd-number of times of the f/2 frequency of the power spectrum of speech pitch wave increases.

Various methods, other than the above, may be used for generating the speech pitch wave. For example, a discrete spectrum obtained by subjecting the reference speech signal 401 to Fourier transform or Fourier series expansion is interpolated to generate a consecutive spectrum. The consecutive spectrum is subjected to inverse Fourier transform, thereby generating a speech pitch wave.

The inverse filter 333 may subject the generated residual pitch wave to a phasing process such as zero phasing or minimum phasing. Thereby, the length of the wave to be stored can be reduced. In addition, the disturbance of the voiced speech source signal can be decreased.

Figure 40A:
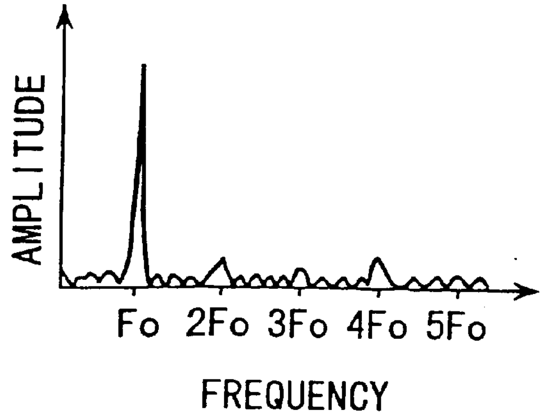
FIG. 40A to FIG. 40F show examples of spectra of signals at respective parts in the twentieth embodiment.
Figure 40B:
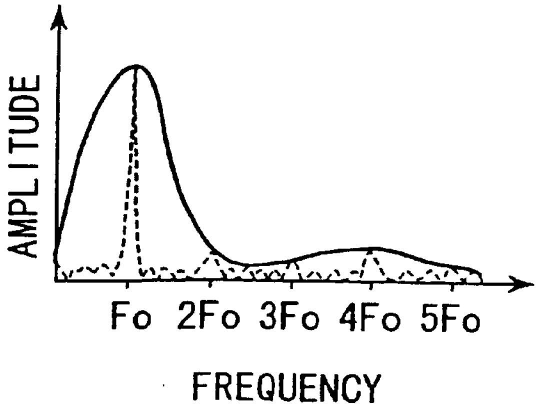
Figure 40C:
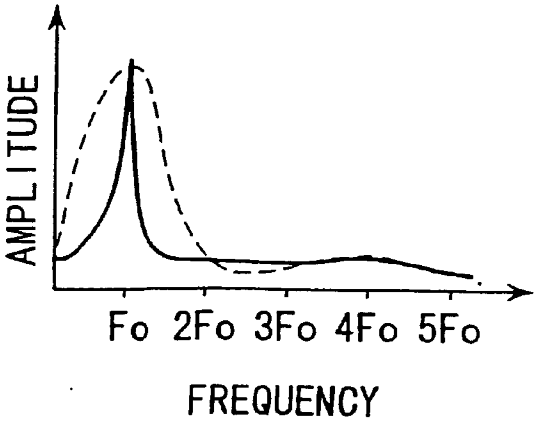
Figure 40D:
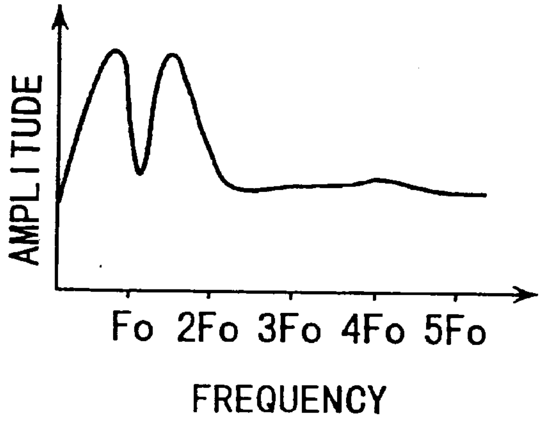
Figure 40E:
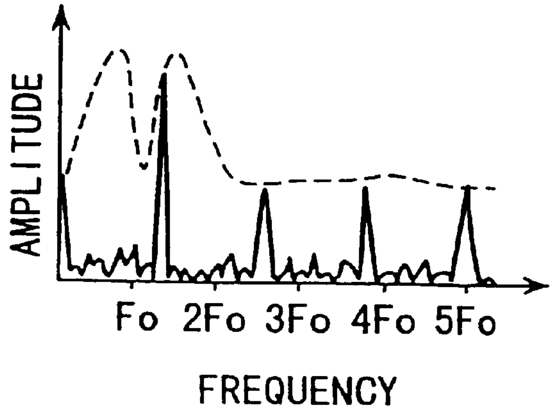
Figure 40F:
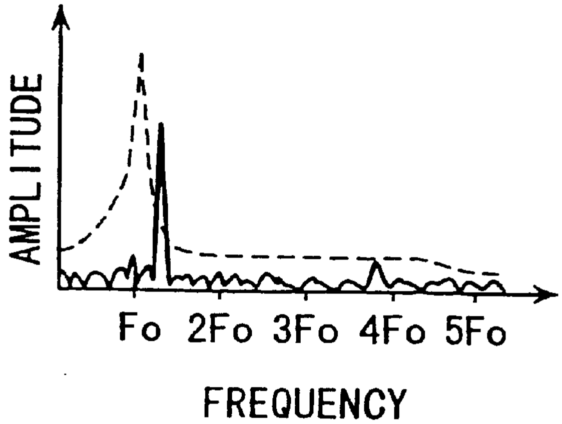

FIGS. 40A to 40F show examples of frequency spectra of signals at the respective parts shown in FIG. 39 in the case where analysis and synthesis are carried out by the speech synthesizer of this embodiment in the voiced period of the reference speech signal 401. FIG. 40A shows a spectrum of reference speech signal 401 having a fundamental frequency Fo. FIG. 40B shows a spectrum of speech pitch wave 421 (a broken line indicating the spectrum of FIG. 40A). FIG. 40C shows a spectrum of LPC coefficient 413, 410 (a broken line indicating the spectrum of FIG. 40B). FIG. 40D shows a spectrum of residual pitch wave 422, 408. FIG. 40E shows a spectrum of voiced speech source signal 406 generated at a fundamental frequency F'o (F'o=1.25 Fo) (a broken line indicating the spectrum of FIG. 40D. FIG. 40F shows a spectrum of synthesis speech signal 409 (a broken line indicating the spectrum of FIG. 40C).

It is understood, from FIGS. 40A to 40F, that the spectrum (FIG. 40F) of synthesis speech signal 409 generated by altering the fundamental frequency Fo of reference speech signal 401 to F'o has a less distortion than the spectrum of a synthesis speech signal synthesized by a conventional speech synthesizer. The reason is as follows.

In the present embodiment, the residual pitch wave 422 is obtained from the speech pitch wave 421. Thus, even if the width of the spectrum (FIG. 40C) at the formant frequency (e.g. first formant frequency Fo) of LPC coefficient 413 obtained by LPC analysis is small, this spectrum can be compensated by the spectrum (FIG. 40D) of residual pitch wave 422.

Specifically, in the present embodiment, the inverse filter 333 generates the residual pitch wave 422 from the speech pitch wave 421 extracted from the reference speech signal 401, by using the LPC coefficient 413. In this case, the spectrum of residual pitch wave 422, as shown in FIG. 40D, is complementary to the spectrum of the LPC coefficient 413 shown in FIG. 40C in the vicinity of a first formant frequency Fo of the spectrum of LPC coefficient 413. As a result, the spectrum of the voiced speech source signal 406 generated by the voiced speech source generator 314 in accordance with the information of the residual pitch wave 408 read out from the residual pitch wave storage 317 is emphasized near the first formant frequency Fo, as shown in FIG. 40E.

Accordingly, even if the discrete spectrum of voiced speech source signal 406 departs from the peak of the spectrum envelope of LPC coefficient 410, as shown in FIG. 40E, due to change of the fundamental frequency, the amplitude of the formant component of the spectrum of synthesis speech signal 409 output from the vocal tract filter circuit 315 does not become extremely narrow, as shown in FIG. 40F, as compared to the spectrum of reference speech signal 401 shown in FIG. 40A.

According to this embodiment, the synthesis speech signal 409 with a less spectrum distortion due to change of the fundamental frequency can be generated.

Figure 41:
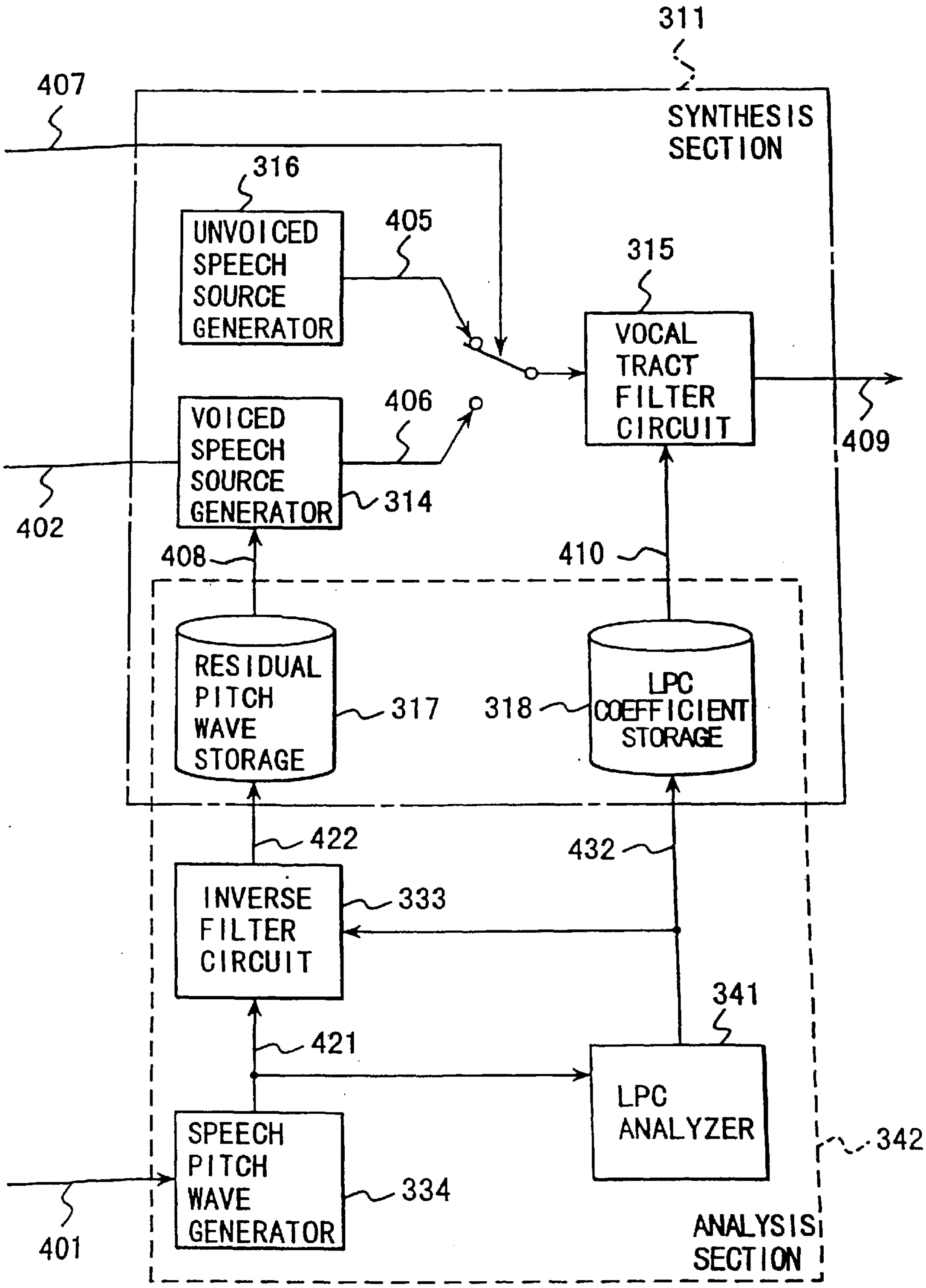
FIG. 41 is a block diagram of a speech synthesis apparatus according to a 21st embodiment of the present invention.

FIG. 41 shows the structure of a speech synthesizer according to a 21st embodiment of the invention. The speech synthesizer comprises a synthesis section 311 and an analysis section 342. The speech pitch wave generator 334 and inverse filter 333 in the synthesis section 311 and analysis section 342 have the same structures as those of the speech synthesizer according to the 20th embodiment shown in FIG. 39. Thus, the speech pitch wave generator 334 and inverse filter 333 are denoted by like reference numerals and a description thereof is omitted.

In this embodiment, the LPC analyzer 321 of the 20th embodiment is replaced with an LPC analyzer 341 which performs pitch synchronization linear prediction analysis in synchronism with the pitch of reference speech signal 401. Specifically, the LPC analyzer 341 LPC-analyzes the speech pitch wave 421 generated by the speech pitch wave generator 334, and generates an LPC coefficient 432. The LPC coefficient 432 is stored in the LPC coefficient storage 318 and input to the inverse filter 333. In the inverse filter 333, a linear prediction inverse filter filters the speech pitch wave 421 by using the LPC coefficient 432 as filtering coefficient, thereby outputting the residual pitch wave 422.

While the spectrum of reference speech signal 401 is discrete, the spectrum of speech pitch wave 421 is a consecutive spectrum. This consecutive wave is obtained by smoothing the discrete spectrum. Accordingly, unlike the prior art, the spectrum width of the LPC coefficient 432 obtained by subjecting the speech pitch wave 401 to LPC analysis in the LPC analyzer 341 according to the present embodiment does not become too small at the formant frequency. Therefore, the spectrum distortion of the synthesis speech signal 409 due to the narrowing of the spectrum width is reduced.

Figure 42A:
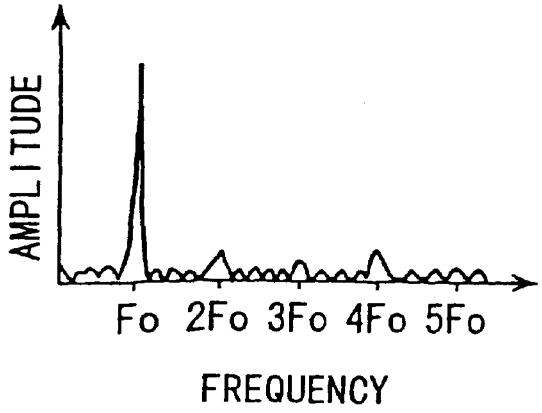
FIG. 42A to FIG. 42F show examples of spectra of signals at respective parts in the 21st embodiment.
Figure 42B:
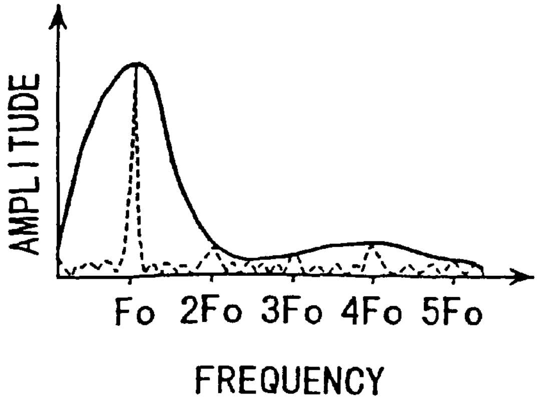
Figure 42C:
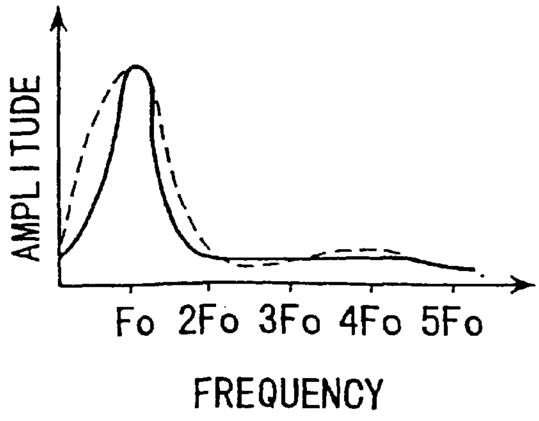
Figure 42D:
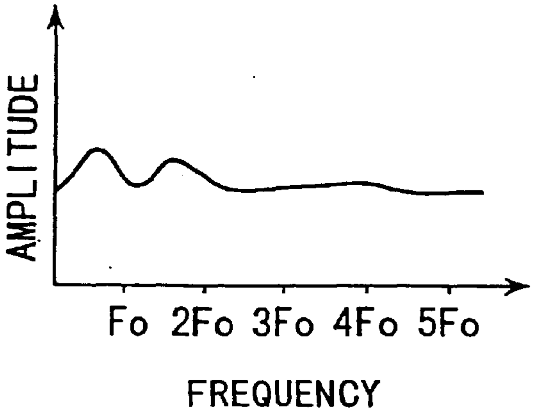
Figure 42E:
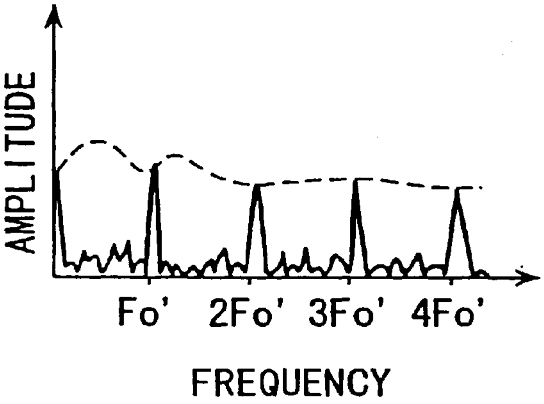
Figure 42F:
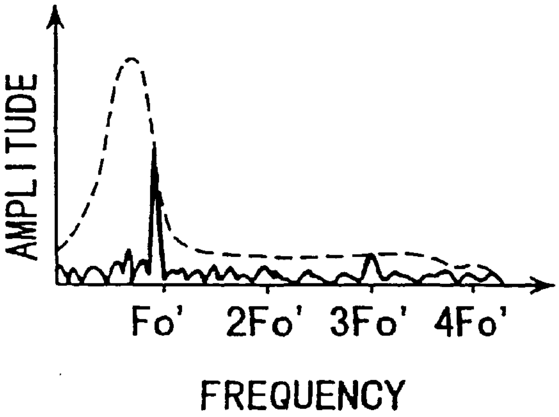

The advantage of the 21st embodiment will now be described with reference to FIGS. 42A to 42F. FIGS. 42A to 42F show examples of frequency spectra of signals at the respective parts shown in FIG. 41 in the case where analysis and synthesis of the reference speech signal of a voiced speech are carried out by the speech synthesizer of this embodiment. FIG. 42A shows a spectrum of reference speech signal 401 having a fundamental frequency Fo. FIG. 42B shows a spectrum of speech pitch wave 421 (a broken line indicating the spectrum of FIG. 42A). FIG. 42C shows a spectrum of LPC coefficient 432, 410 (a broken line indicating the spectrum of FIG. 42B). FIG. 42D shows a spectrum of residual pitch wave 422, 408. FIG. 42E shows a spectrum of voiced speech source signal 406 generated at a fundamental frequency F'o (F'o=1.25 Fo) (a broken line indicating the spectrum of FIG. 42D). FIG. 42F shows a spectrum of synthesis speech signal 409 (a broken line indicating the spectrum of FIG. 42C). As compared to FIGS. 40A to 40F relating to the 20th embodiment, FIGS. 42C, 42D, 42E and 42F are different.

Specifically, as is shown in FIG. 42C, in the present embodiment the spectrum width of the LPC coefficient 432 at the first formant frequency Fo is wider than the spectrum width shown in FIG. 40C. Accordingly, the fundamental frequency of synthesis speech signal 409 is changed to F'o in relation to the fundamental frequency Fo of reference speech signal 401. Thereby, even if the spectrum of voiced speech source signal 406 departs, as shown in FIG. 42D, from the peak of the spectrum of LPC coefficient 432 shown in FIG. 42C, the amplitude of the formant component of the spectrum of synthesis speech signal 409 at the formant frequency Fo does not become extremely narrow, as shown in FIG. 42F, as compared to the spectrum of reference speech signal 401. Thus, the spectrum distortion at the synthesis speech signal 409 can be reduced.

Figure 43:
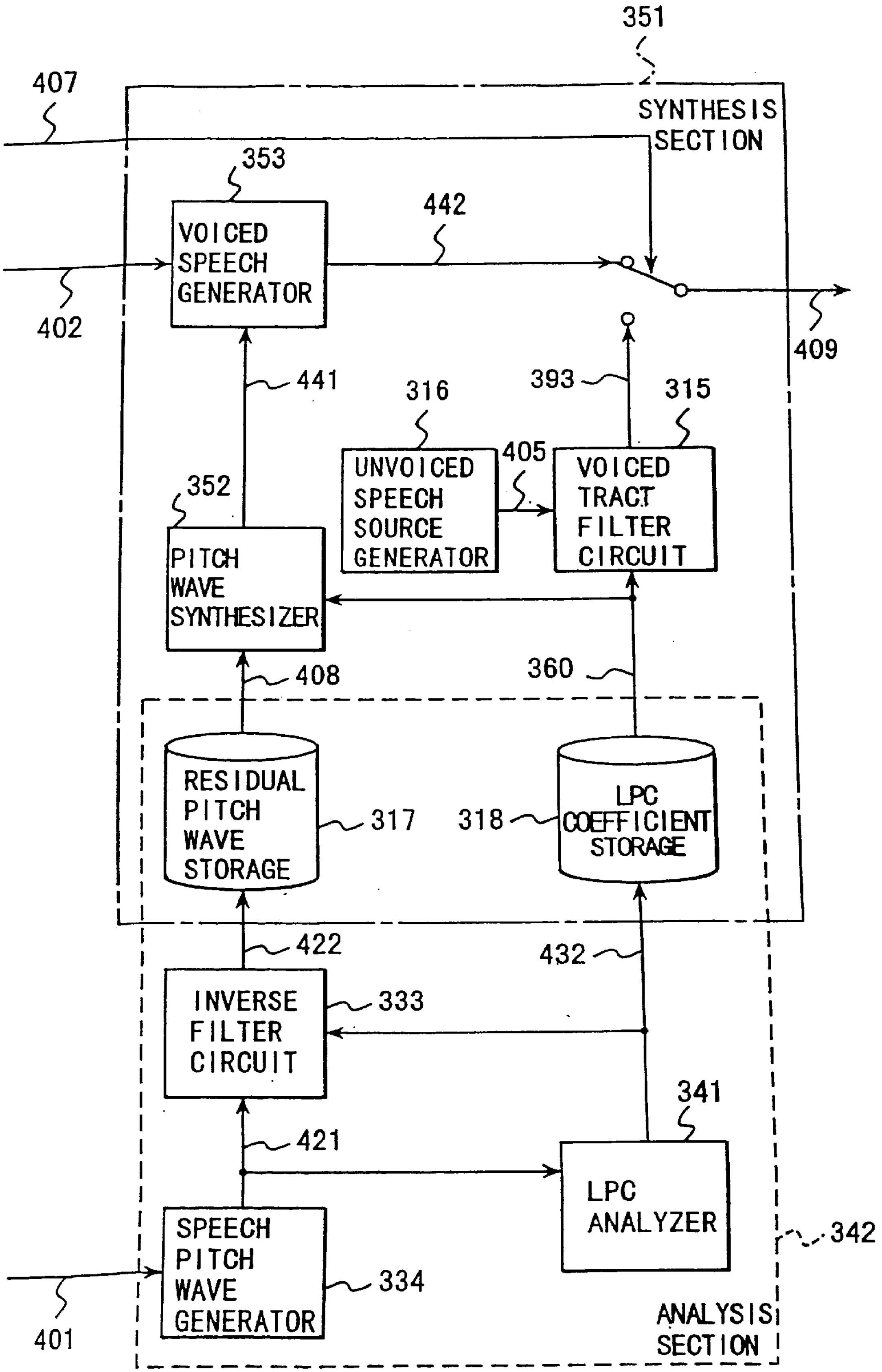
FIG. 43 is a block diagram of a speech synthesis apparatus according to a 22nd embodiment of the present invention.

FIG. 43 shows the structure of a speech synthesizer according to a 22nd embodiment of the invention. The speech synthesizer comprises a synthesis section 351 and an analysis section 342. Since the structure of the analysis section 42 is the same as that of the speech synthesizer according to the 21st embodiment shown in FIG. 41, the common parts are denoted by like reference numerals and a description thereof is omitted.

In this embodiment, the synthesis section 351 comprises an unvoiced speech source generator 316, a voiced speech generator 353, a pitch wave synthesizer 352, a vocal tract filter 315, a residual pitch wave storage 317 and an LPC coefficient storage 318.

In the pitch wave synthesizer 352, a synthesis filter synthesizes, in the voiced period determined by the voiced/unvoiced speech determination information 407, the residual pitch wave 408 read out from the residual pitch wave storage 317, with the LPC coefficient 410 read out from the LPC coefficient storage 318 used as the filtering coefficient. Thus, the pitch wave synthesizer 352 outputs a speech pitch wave 441.

The voiced speech generator 353 generates and outputs a voiced speech signal 442 on the basis of the frame average pitch 402 and voiced pitch wave 441.

In the unvoiced period determined by the voiced/unvoiced speech determination information 407, the unvoiced speech source generator 316 outputs an unvoiced speech source signal 405 expressed as, e.g. white noise.

In the vocal tract filter 315, a synthesis filter is driven by the unvoiced speech source signal 405, with the LPC coefficient 410 read out from the LPC coefficient storage 318 used as filtering coefficient. Thus, the vocal tract filter 315 outputs an unvoiced speech signal 443. The unvoiced speech signal 443 is output as synthesis speech signal 409 in the unvoiced period determined by the voiced/unvoiced speech determination information 407, and the voiced speech signal 442 is output as synthesis speech signal 409 in the voiced period determined.

In the voiced speech generator 353, pitch waves obtained by interpolating the speech pitch wave of the present frame and the speech pitch wave of the previous frame are superimposed at intervals of pitch period 402. Thus, the voiced speech signal 442 is generated. The weight coefficient for interpolation is varied for each pitch wave, so that the phonemes may vary smoothly.

In the present embodiment, the same advantage as with the 21st embodiment can be obtained.

Figure 44:
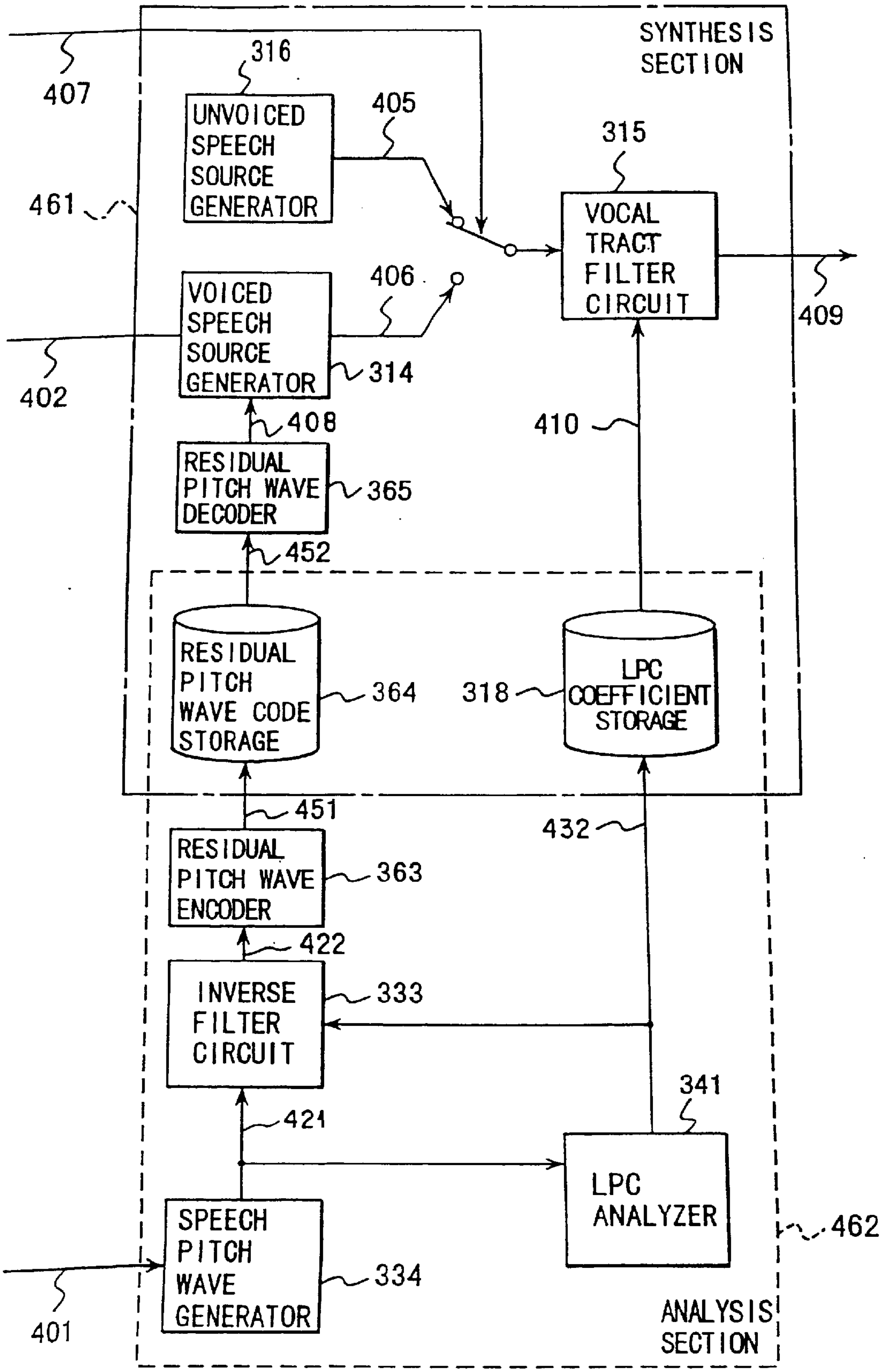
FIG. 44 is a block diagram of a speech synthesis apparatus according to a 23rd embodiment of the present invention.

FIG. 44 shows the structure of a speech synthesizer according to a 23rd embodiment of the invention. The speech analyzer comprises a synthesis section 361 and an analysis section 362. The structure of this speech analyzer is the same as the structure of the speech analyzer according to the 21st embodiment shown in FIG. 41, except for a residual pitch wave decoder 365, a residual pitch wave code storage, and a residual pitch wave encoder 363. Thus, the common parts are denoted by like reference numerals, and a description thereof is omitted.

In this embodiment, the reference speech signal 401 is analyzed to generate a residual pitch wave. The residual pitch wave is compression-encoded to form a code, and the code is decoded for speech synthesis. Specifically, the residual pitch wave encoder 363 compression-encodes the residual pitch wave 422, thereby generating the residual pitch wave code 451. The residual pitch wave code 451 is stored in the residual pitch wave code storage 364. The residual pitch wave decoder 365 decodes the residual pitch wave code 452 read out from the residual pitch wave code storage 364. Thus, the residual pitch wave decoder 365 outputs the residual pitch wave 408.

Figure 45:
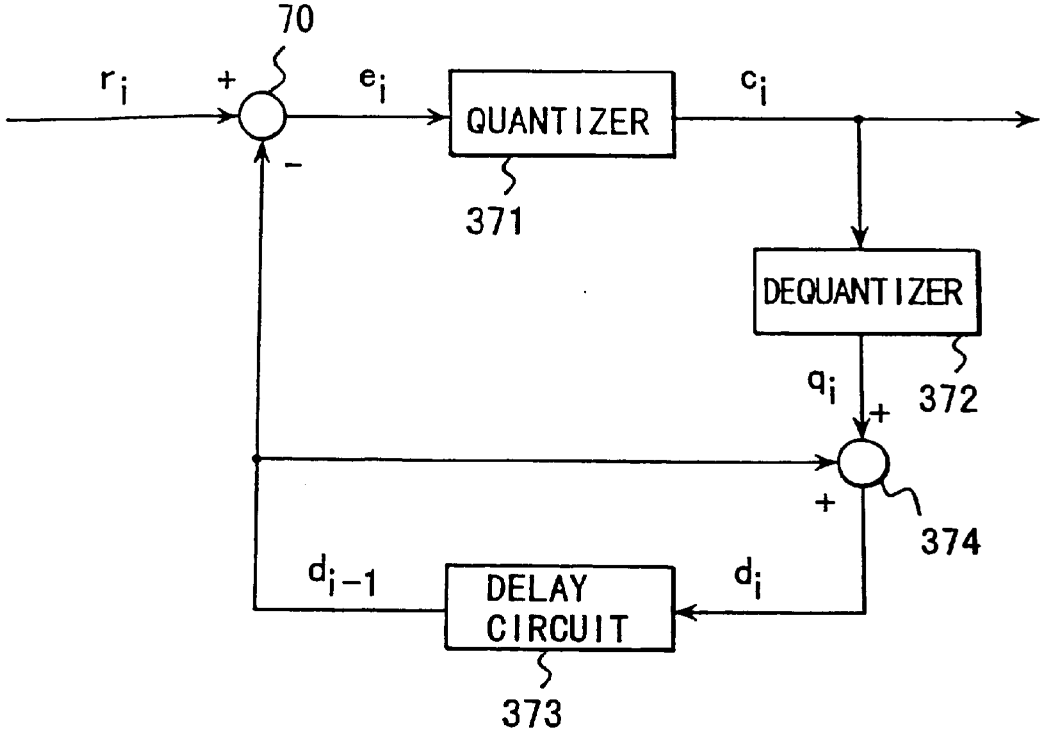
FIG. 45 is a block diagram showing an example of the structure of a residual pitch wave encoder in the 23rd embodiment.
Figure 46:
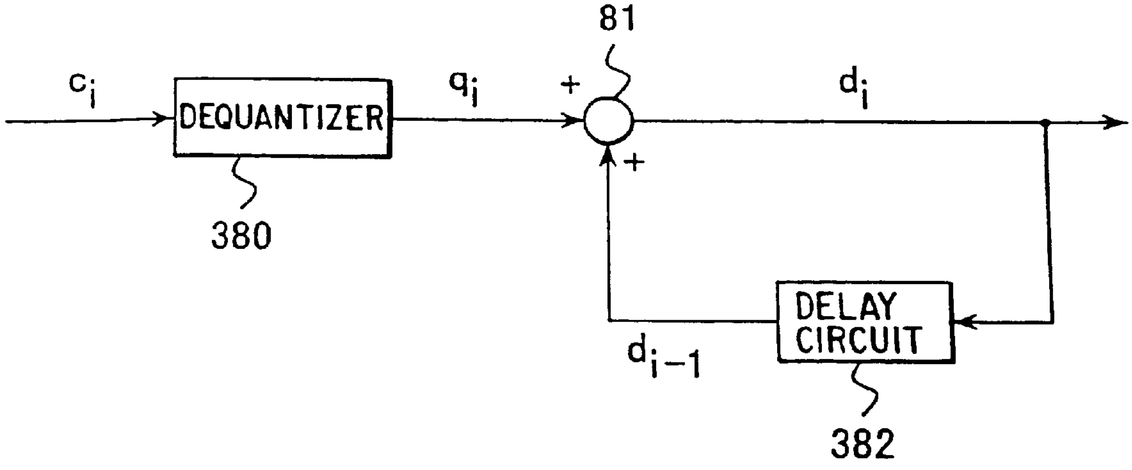
FIG. 46 is a block diagram showing an example of the structure of a residual pitch wave decoder in the 23rd embodiment.

In this embodiment, inter-frame prediction encoding is adopted as compression-encoding for compression-encoding the residual pitch wave. FIG. 45 shows a detailed structure of the residual pitch wave encoder 363 using the inter-frame prediction encoding, and FIG. 46 shows a detailed structure of the associated residual pitch wave decoder 365. The speech synthesis unit is a plurality of frames, and the encoding and decoding are performed in speech synthesis units. The symbols in FIGS. 45 and 46 denote the following:

$T_i$: the residual pitch wave of an i-th frame, $e_i$: the inter-frame error of the i-th frame, $c_i$: the code of the i-th frame, $q_i$: the inter-frame error of the i-th frame obtained by dequantizing, $d_i$: the decoded residual pitch wave of the i-th frame, and $d_{i-1}$: the decoded residual pitch wave of the (i-1)-th frame.

The operation of the residual pitch wave encoder 363 shown in FIG. 45 will now be described. In FIG. 45, a quantizer 371 quantizes an inter-frame error $e_i$ output from a subtracter 370 and outputs a code $c_i$. An dequantizer 372 dequantizes the code $c_i$ and finds an inter-frame error $q_i$. A delay circuit 373 receives and stores from an adder 374 a decoded residual pitch wave $d_i$ which is a sum of a decoded residual pitch wave $d_{i-1}$ of the previous frame and the inter-frame error $q_i$. The decoded residual pitch wave $d_i$ is delayed by one frame and outputs $d_{i-1}$. The initial values of all outputs from the delay circuit 373, i.e. $d_0$ are zero. If the number of frames of speech synthesis unit is N, pairs of codes $(c_1, c_2, \ldots, c_N)$ are output as residual pitch waves 422. The quantization in the quantizer 371 may be either of scalar quantization or vector quantization.

The operation of the residual pitch wave decoder 365 shown in FIG. 46 will now be described. In FIG. 46, a dequantizer 380 dequantizes a code $c_i$ and generates an inter-frame error $q_i$. A sum of the inter-frame error $q_i$ and a decoded residual pitch wave $d_{i-1}$ of the previous frame is output from an adder 381 as a decoded residual pitch wave $d_i$. A delay circuit 382 stores the decoded residual pitch wave $d_i$, and delays it by one frame and outputs $d_{i-1}$. The initial values of all outputs from the delay circuit 382, i.e. $d_0$ are zero.

Since the residual pitch wave represents a high degree of relationship between frames and the power of the inter-frame error $e_i$ is smaller than the power of residual pitch wave $r_i$, the residual pitch wave can be efficiently compressed by the inter-frame prediction coding.

The residual pitch wave can be encoded by various compression coding methods such as vector quantization and transform coding, in addition to the inter-frame prediction coding.

According to the present embodiment, the residual pitch wave is compression-encoded by inter-frame encoding or the like, and the encoded residual pitch wave is stored in the residual pitch wave code storage 364. At the time of speech synthesis, the codes read out from the storage 364 is decoded. Thereby, the memory capacity necessary for storing the residual pitch waves can be reduced. If the memory capacity is limited under some condition, more information of residual pitch waves can be stored.

As has been described above, according to the speech synthesis method of the present invention, at least one of the pitch and duration of the input speech segment is altered, and the distortion of the generated synthesis speech with reference to the natural speech is evaluated. Based on the evaluated result, the speech segment selected from the input speech segments is used as synthesis unit. Thus, in consideration of the characteristics of the speech synthesis apparatus, the synthesis units can be generated. The synthesis units are connected for speech synthesis, and a high-quality synthesis speech close to the natural speech can be generated.

In the present invention, the speech synthesized by connecting synthesis units is spectrum-shaped, and the synthesis speech segments are similarly spectrum-shaped. Thereby, it is possible to generate the synthesis units, which will have less distortion with reference to natural speeches when they become the final spectrum-shaped synthesis speech signals. Therefore, "modulated" clear synthesis speeches can be generated.

The synthesis units are selected and connected according to the segment selection rule based on phonetic contexts. Thereby, smooth and natural synthesis speeches can be generated.

There is a case of storing information of combinations of coefficients (e.g. LPC coefficients) of a synthesis filter for receiving speech source signals (e.g. prediction residual signals) as synthesis units and generating synthesis speech signals. In this case, the information can be quantized and thereby the number of speech source signals stored as synthesis units and the number of coefficients of the synthesis filter can be reduced. Accordingly, the calculation time necessary for learning synthesis units can be reduced, and the memory capacity for use in the speech synthesis section can be reduced.

Furthermore, good synthesis speeches can be obtained even if at least one of the number of speech source signals stored as information of synthesis units and the number of coefficients of the synthesis filter is less than the total number (e.g. the total number of CV and VC syllables) of speech synthesis units or the number of phonetic environment clusters.

The present invention can provide a speech synthesis method whereby formant-emphasized or pitch-emphasized synthesis speech signals can be generated and clear, high-quality reproduced speeches can be obtained.

Besides, according to the speech synthesis method of this invention, when the fundamental frequency is altered with respect to the fundamental frequency of reference speech signals used for analysis, the spectrum distortion is small and the high-quality synthesis speeches can be obtained.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

What is claimed is:

1. A speech synthesis method comprising:

generating a representative speech pitch wave from a reference speech signal by subjecting the reference speech signal to one of Fourier transform and Fourier series expansion to produce a discrete spectrum, interpolating the discrete spectrum to generate a consecutive spectrum, and subjecting the consecutive spectrum to inverse Fourier transform;

generating a linear prediction coefficient by subjecting the reference speech signal to a linear prediction analysis;

subjecting the representative speech pitch wave to inverse-filtering based on the linear prediction coefficient to produce a residual pitch wave;

storing information on the residual pitch wave and the linear prediction coefficient in a storage;

generating a voiced speech source signal based on the residual pitch wave from the storage;

generating an unvoiced speech source signal; and driving a vocal tract filter having the linear prediction coefficient by the voiced speech source signal or the unvoiced speech source signal to generate a synthesis speech.

* * * * *